(12) United States Patent
Yoon et al.

(10) Patent No.: US 12,395,584 B2
(45) Date of Patent: Aug. 19, 2025

(54) ELECTRONIC DEVICE FOR PROVIDING BOTH SHARED SCREEN AND PRIVATE SCREEN, AND CONTROL METHOD THEREFOR

(71) Applicant: SAMSUNG ELECTRONICS CO., LTD., Suwon-si (KR)

(72) Inventors: Yeojun Yoon, Suwon-si (KR); Kawon Cheon, Suwon-si (KR); Soojung Lee, Suwon-si (KR); Joayoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 421 days.

(21) Appl. No.: 18/099,415

(22) Filed: Jan. 20, 2023

(65) Prior Publication Data

US 2023/0164262 A1 May 25, 2023

Related U.S. Application Data

(63) Continuation of application No. PCT/KR2021/009380, filed on Jul. 21, 2021.

(30) Foreign Application Priority Data

Jul. 22, 2020 (KR) .................. 10-2020-0091298

(51) Int. Cl.
*H04W 48/18* (2009.01)
*G06F 1/16* (2006.01)
(Continued)

(52) U.S. Cl.
CPC ...... *H04M 1/72484* (2021.01); *G06F 1/1624* (2013.01); *G06F 1/1652* (2013.01); *H04M 1/72469* (2021.01)

(58) Field of Classification Search
CPC .... G06F 1/1677; G06F 3/0443; G06F 3/0412; G06F 1/1652; B64D 11/0015; B64D 45/00; G01N 27/02; G01N 27/046
See application file for complete search history.

(56) References Cited

U.S. PATENT DOCUMENTS

| 9,612,621 | B2 | 4/2017 | Lee et al. |
| 2014/0218321 | A1 | 8/2014 | Lee et al. |

(Continued)

FOREIGN PATENT DOCUMENTS

| KR | 10-2013-0037330 | 4/2013 |
| KR | 10-2015-0076701 | 7/2015 |

(Continued)

OTHER PUBLICATIONS

International Search Report dated Oct. 26, 2021 issued in PCT/KR2021/009380 (3 pages).

(Continued)

*Primary Examiner* — Phuoc H Doan
(74) *Attorney, Agent, or Firm* — Nixon & Vanderhye, P.C.

(57) ABSTRACT

Disclosed are an electronic device for providing both a shared screen and a private screen, and a control method therefor. The electronic device, according to an embodiment of the present disclosure, may be configured to: display a first screen on a flexible display in a state where the electronic device and an external electronic device are operably connected via a communication module; display a second screen corresponding to the first screen on the external electronic device; detect the occurrence of a first event for expanding the flexible display; according to the detection of the occurrence of the first event, display, along with the first screen, a third screen different from the first screen on the expanded flexible display; and control the (Continued)

external electronic device so that only the second screen is displayed on the external electronic device.

15 Claims, 62 Drawing Sheets

(51) Int. Cl.
*H04M 1/72469* (2021.01)
*H04M 1/72484* (2021.01)

(56) References Cited

U.S. PATENT DOCUMENTS

| | | |
|---|---|---|
| 2015/0097757 A1 | 4/2015 | Bang et al. |
| 2016/0249006 A1 | 8/2016 | Park et al. |
| 2016/0378270 A1 | 12/2016 | Lee et al. |
| 2017/0061932 A1 | 3/2017 | Kwon et al. |
| 2017/0255442 A1 | 9/2017 | Kim et al. |
| 2018/0024806 A1 | 1/2018 | Fujino et al. |
| 2018/0121663 A1 | 5/2018 | Hassan et al. |
| 2019/0261519 A1 | 8/2019 | Park et al. |
| 2020/0130839 A1* | 4/2020 | Hahn ..................... G06F 3/0443 |
| 2021/0377647 A1* | 12/2021 | Reece ..................... G06F 3/162 |

FOREIGN PATENT DOCUMENTS

| | | |
|---|---|---|
| KR | 10-2016-0073205 | 6/2016 |
| KR | 10-2017-0000553 | 1/2017 |
| KR | 10-2017-0024942 | 3/2017 |
| KR | 10-2017-0048007 | 5/2017 |
| KR | 10-2017-0102634 | 9/2017 |
| KR | 10-2019-0101184 | 8/2019 |

OTHER PUBLICATIONS

Written Opinion of ISA dated Oct. 26, 2022 issued in PCT/KR2021/009380 (4 pages).
Extended European Search Report dated Nov. 22, 2023 issued in European Patent Application No. 21845656.4.
Korean Office Action issued Mar. 13, 2025 in corresponding Korean Patent Application No. 10-2020-0091298.

\* cited by examiner

ELECTRONIC DEVICE FOR PROVIDING BOTH SHARED SCREEN AND PRIVATE SCREEN, AND CONTROL METHOD THEREFOR

CROSS-REFERENCE TO RELATED APPLICATIONS

This application is a continuation of International Patent Application No. PCT/KR2021/009380 designating the United States, filed on Jul. 21, 2021, in the Korean Intellectual Property Receiving Office and claiming priority to Korean Patent Application No. 10-2020-0091298, filed on Jul. 22, 2020, in the Korean Intellectual Property Office, the disclosures of which are incorporated by reference herein in their entireties.

BACKGROUND

Field

The disclosure relates to an electronic device for providing both a shared screen and a non-shared screen and a method for controlling the same.

Description of Related Art

More and more services and additional functions are being provided through electronic devices, e.g., smartphones, or other portable electronic devices. To meet the needs of various users and raise use efficiency of electronic devices, communication service carriers or device manufacturers are developing electronic devices with differentiated and diversified functionalities. Accordingly, various functions that are provided through electronic devices are evolving more and more.

Mirroring (which may be referred to herein as a "first mode" for convenience of description) is used to share the screen displayed on an electronic device (e.g., smartphone) by several people. It is also available to enable the screen displayed on a smartphone to be shared by several people or to allow the user of the smartphone to conveniently control the smartphone on a relatively larger screen by displaying a screen with changed attributes (e.g., resolution, number of screens, position of displayed object on the screen, brightness of screen, color of object, shape of object, contrast, or screen size), as displayed on the smartphone, through another display device (this may be referred to herein as a "second mode" or Dex mode" for convenience of description). Various types of electronic devices with a flexible display are recently coming out, but no technical consideration is taken into what screen is being displayed on an electronic device (e.g., smartphone) and an external electronic device (e.g., monitor) when the first mode or second mode is used by the user through the various types of electronic devices. Nor is there any technical consideration as to how a notification event, such as reception of a text message, is handled when the notification event occurs while the user shares the screen with other users through the first mode or second mode.

SUMMARY

Embodiments of the disclosure provide an electronic device and method that take into technical consideration what screen is being displayed on an electronic device and an external electronic device when the first mode or second mode is provided through various types of electronic devices using a flexible display.

Embodiments of the disclosure provide an electronic device and method that take into technical consideration how a generated notification event is processed when the first mode or second mode is provided through various types of electronic devices using a flexible display.

According to an example embodiment of the disclosure, an electronic device may comprise: a communication module comprising communication circuitry, a flexible display, and at least one processor configured to: control the display to display a first screen on the flexible display and a second screen corresponding to the first screen on an external electronic device in a state in which the electronic device and the external electronic device are operably connected to each other through the communication module, detect an occurrence of a first event to extend the flexible display, and control the display to display both the first screen and a third screen different from the first screen on the extended flexible display and control the external electronic device to display only the second screen on the external electronic device, according to the detection of the occurrence of the first event.

According to an example embodiment of the disclosure, an electronic device may comprise: a communication module comprising communication circuitry, a flexible display, and at least one processor configured to: control the display to display a first screen on the flexible display and a second screen corresponding to the first screen on an external electronic device in a state in which the electronic device and the external electronic device are operably connected to each other through the communication module, detect an occurrence of a first event to extend the flexible display, and control the display to display at least two or more screens among a third screen different from the first screen, the first screen, and a fourth screen on the extended flexible display and control the external electronic device to display only the second screen on the external electronic device, according to the detection of the occurrence of the first event.

According to an example embodiment of the disclosure, a method for controlling an electronic device may comprise: displaying a first screen on a flexible display of the electronic device and a second screen corresponding to the first screen on an external electronic device in a state in which the electronic device and the external electronic device are operably connected to each other through a communication module of the electronic device, detecting an occurrence of a first event to extend the flexible display, and displaying both the first screen and a third screen different from the first screen on the extended flexible display and controlling the external electronic device to display only the second screen on the external electronic device, according to the detection of the occurrence of the first event.

According to various example embodiments of the disclosure, an electronic device may take into technical consideration what screen is being displayed on an electronic device and an external electronic device when the first mode or second mode is provided through various types of electronic devices using a flexible display.

According to various example embodiments of the disclosure, an electronic device and method may take into technical consideration how a generated notification event is processed when the first mode or second mode is provided through various types of electronic devices using a flexible display.

The effects set forth herein are not limited thereto, and it is apparent to one of ordinary skill in the art that various effects may be disclosed herein.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
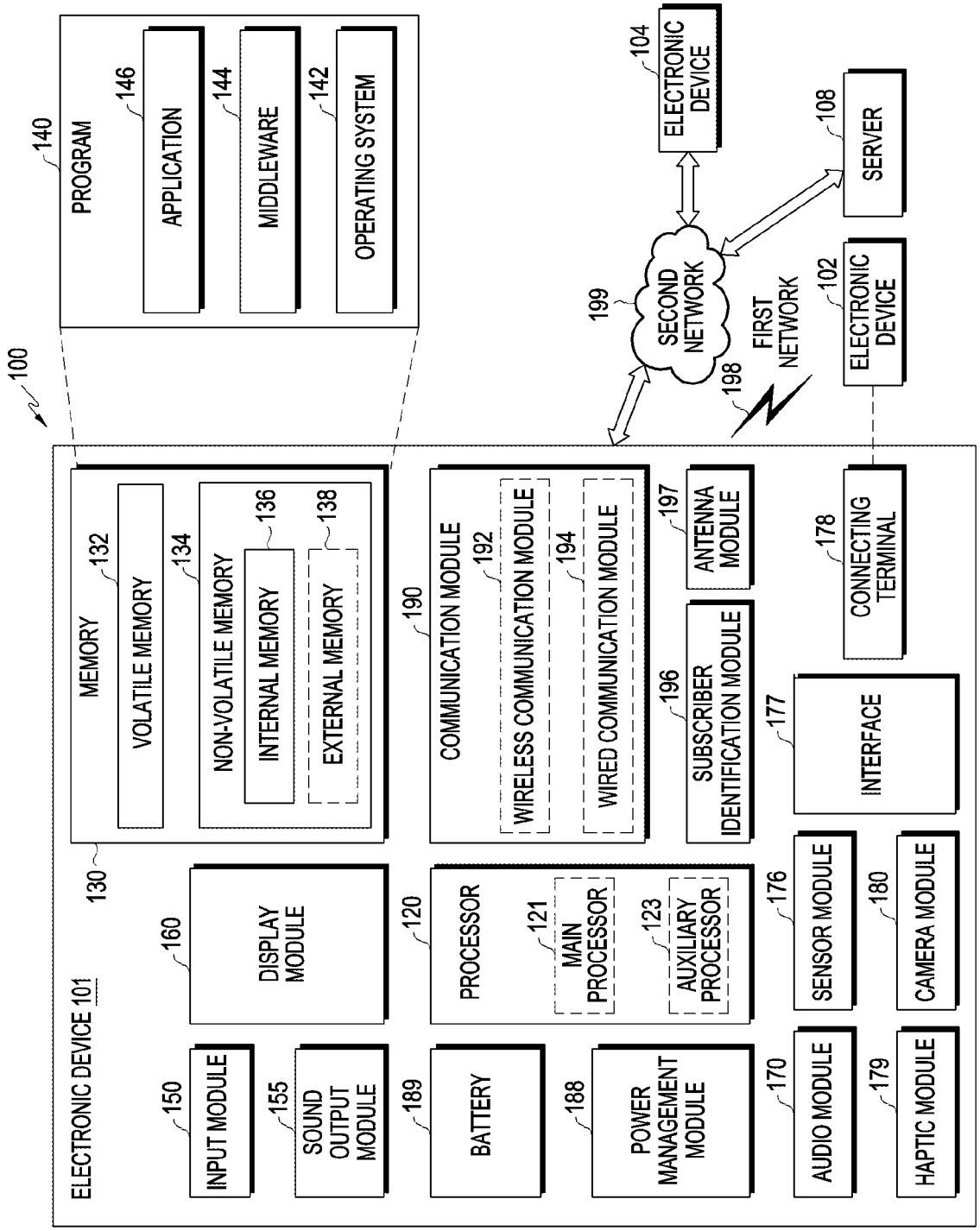
FIG. 1 is a diagram illustrating an example electronic device according to various embodiments.

FIG. 1 is a diagram illustrating an example electronic device according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
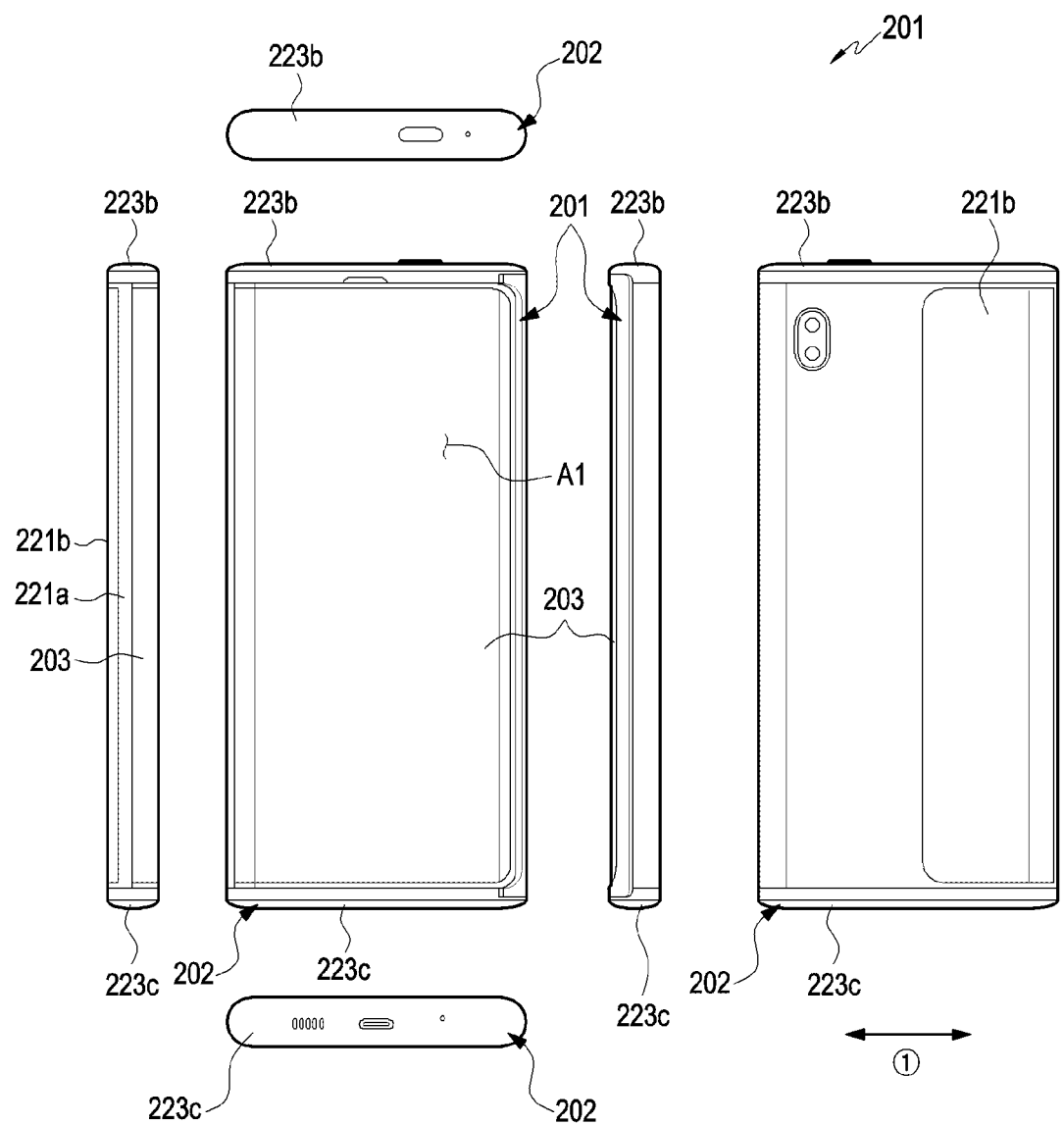
FIG. 2A is a diagram illustrating an electronic device, wherein a portion of a flexible display is received in a second structure according to various embodiments.
Figure 2B:
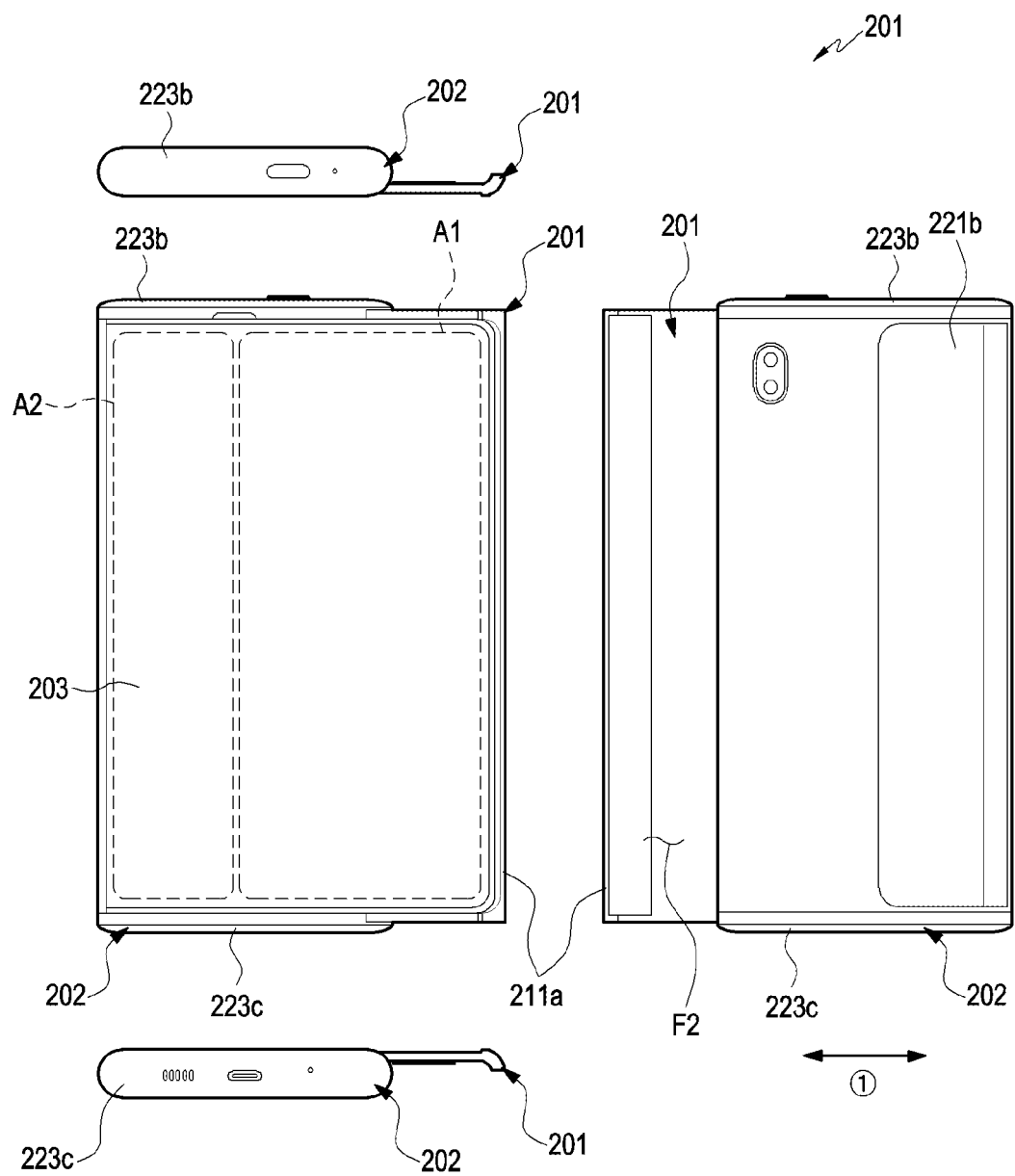
FIG. 2B is a diagram illustrating an electronic device, wherein most of a flexible display is exposed to the outside of a second structure according to various embodiments.

FIG. 2A is a diagram illustrating an electronic device, wherein a portion of a flexible display (e.g., the display module 160 of FIG. 1 or the display 203) is received in a second structure according to various embodiments. FIG. 2B is a diagram illustrating an electronic device, wherein most of a flexible display is exposed (e.g., visible) to the outside of a second structure according to various embodiments. In the disclosure, the type of the electronic device 101 illustrated in FIGS. 2A and 2B may be referred to as a "slidable electronic device". Further, the term "exposed" as used herein may be used interchangeably with the term "visible" or "viewable" and is intended to include a display including a cover or protective layer or glass.

The state shown in FIG. 2A may refer, for example, to a first structure 201 being closed with respect to a second structure 202, and the state shown in FIG. 2B may refer, for example, to the first structure 201 being opened with respect to the second structure 202. According to an embodiment, the "closed state" or "opened state" may be defined as a closed or open state of the electronic device.

Referring to FIGS. 2A and 2B, an electronic device 101 may include a first structure 201 and a second structure 202 disposed to be movable in the first structure 201. According to an embodiment, the electronic device 101 may be interpreted as having a structure in which the first structure 201 is slidably disposed on the second structure 202. According to an embodiment, the first structure 201 may be disposed to perform reciprocating motion by a predetermined distance in a predetermined direction with respect to the second structure 202, for example, a direction indicated by an arrow. ①.

According to an embodiment, the first structure 201 may be referred to as, for example, a first housing, a slide unit, or a slide housing, and may be disposed to reciprocate on the second structure 202. According to an embodiment, the second structure 202 may be referred to as, for example, a second housing, a main part, or a main housing, and may receive various electric or electronic components such as a main circuit board or a battery. A portion (e.g., the first area A1) of the display 203 may be seated on the first structure 201. According to an embodiment, another portion (e.g., the second area A2) of the display 203 may be received (e.g., slide-in) into the inside of the second structure 202 or exposed (e.g., slide-out) to the outside of the second structure 202 as the first structure 201 moves (e.g., slides) relative to the second structure 202.

According to various embodiments, the first structure 201 may include a first plate 211a (e.g., a slide plate) and may include a first surface formed with at least a portion of the first plate 211a and a second surface F2 facing away from the first surface. According to an embodiment, the second structure 202 may include a second plate 221a (e.g., a rear case), a first sidewall 223a extending from the second plate 221a, a second sidewall 223b extending from the first sidewall 223a and the second plate 121a, a third sidewall 223c extending from the first sidewall 223a and the second plate 221a and positioned parallel to the second sidewall 223b, and/or a rear plate 221b (e.g., a rear window). According to an embodiment, the second sidewall 223b and the third sidewall 223c may be formed to be perpendicular to the first sidewall 223a. According to an embodiment, the second plate 221a, the first sidewall 223a, the second sidewall 223b, and the third sidewall 223c may be formed to have an opening (e.g., in the front face) to receive (or surround) at least a portion of the first structure 201. For example, the first structure 201 may be coupled to the second structure 202 in a state in which it is at least partially surrounded, and the first structure 201 may be guided by the second structure 202 to slide in a direction parallel to the first surface or the second surface F2, for example, direction indicated with the arrow ①.

According to an embodiment, the display 203 may include the first area A1 and the second area A2. The second area A2 may extend from the first area A1 and be inserted or received into the inside of the second structure 202 (e.g., housing) or be exposed to the outside of the structure 202 as the first structure 201 slides. The second area A2 may be moved while being substantially guided by a roller mounted on the second structure 202 and may thus be received into the inside of or exposed (e.g., visible or viewable) to the outside of the second structure 202. For example, while the first structure 201 slides, a portion of the second area A2 may be deformed into a curved shape in a position corresponding to the roller 251.

Figure 3A:
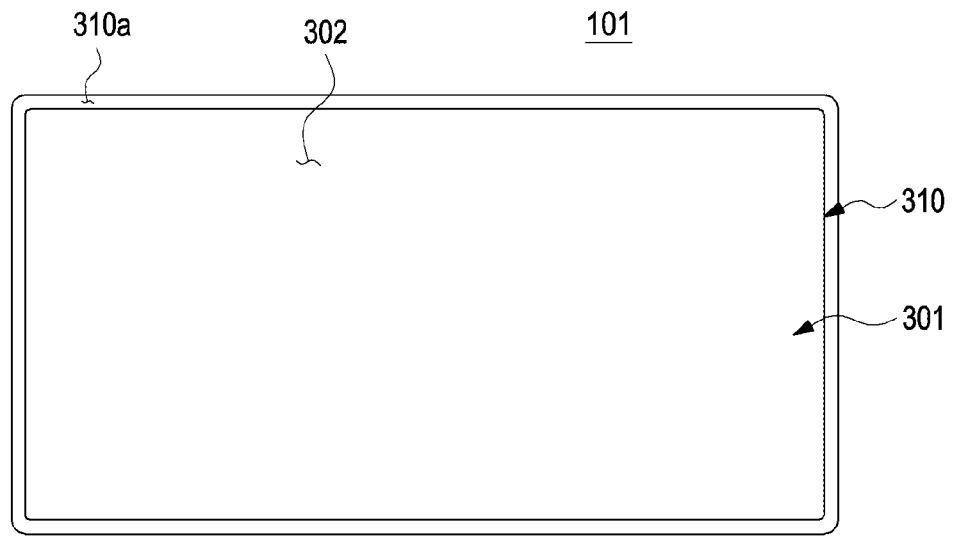
FIG. 3A is a diagram illustrating a front view of an electronic device according to various embodiments.
Figure 3B:
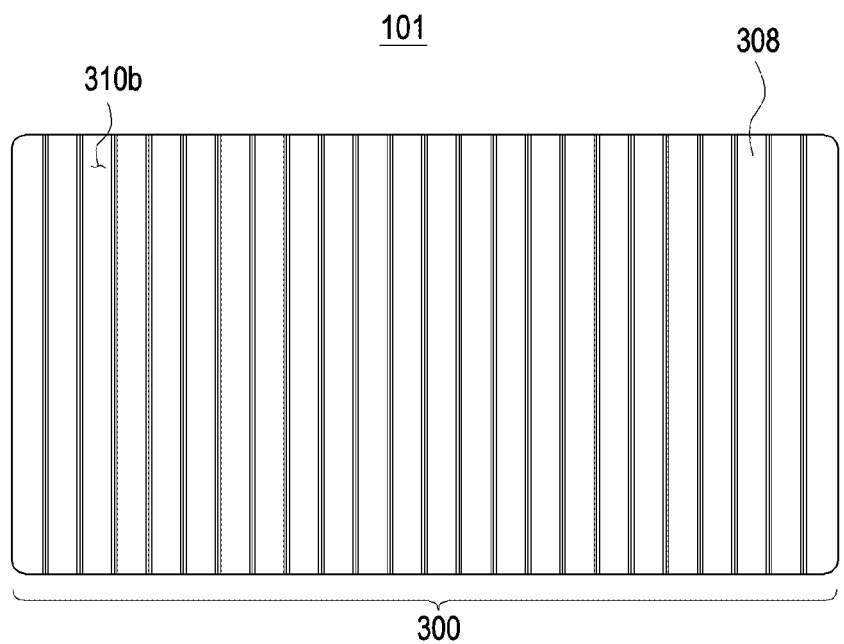
FIG. 3B is a diagram illustrating a rear view of an electronic device according to various embodiments.
Figure 3C:
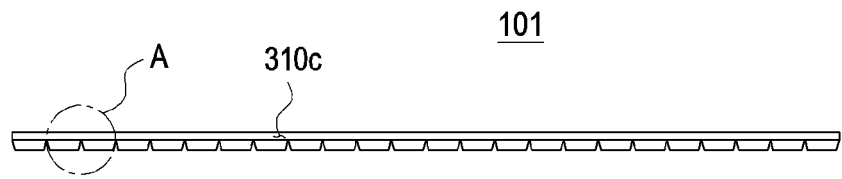
FIG. 3C is a diagram illustrating a side view of an electronic device according to various embodiments.
Figure 3D:
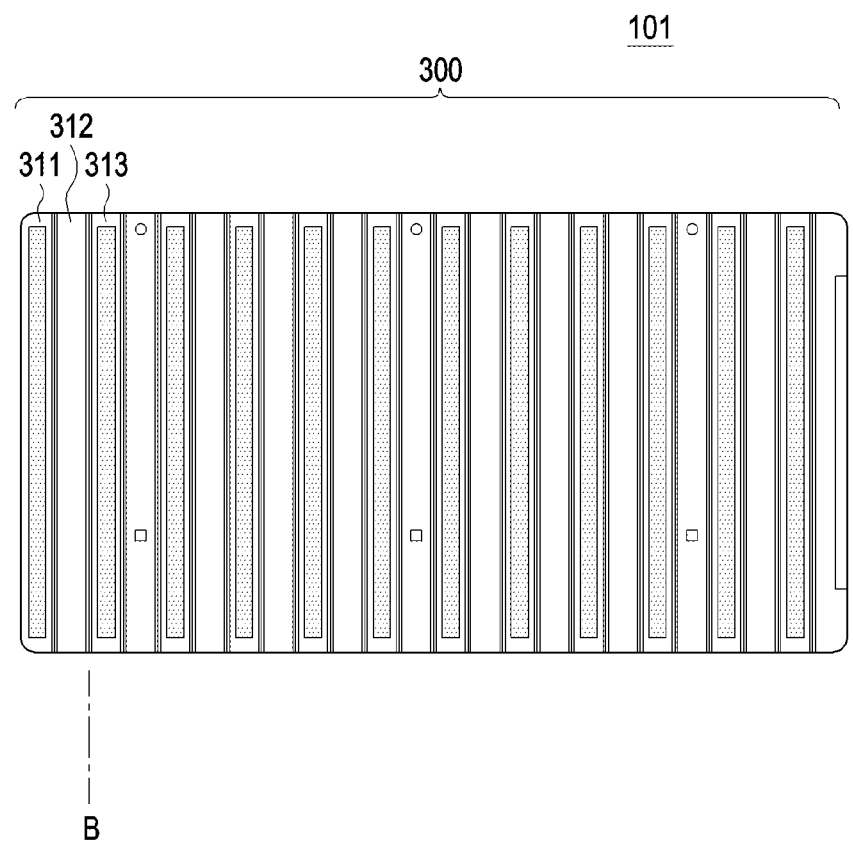
FIG. 3D is a diagram illustrating a rear, see-through view of an electronic device in an unfolded state according to various embodiments.

FIG. 3A is a diagram illustrating a front view of an electronic device according to various embodiments. FIG. 3B is a diagram illustrating rear view of an electronic device according to various embodiments. FIG. 3C is a diagram illustrating side view of an electronic device according to various embodiments. FIG. 3D is diagram illustrating a rear, see-through view of an electronic device in an unfolded state according to various embodiments. In the disclosure, the type of the electronic device 101 illustrated in FIGS. 3A, 3B, 3C and 3D (which may be referred to as FIGS. 3A to 3D) may be referred to as a "rollable electronic device".

Referring to FIGS. 3A to 3D, according to an embodiment, an electronic device 101 may include a housing 310 with a first surface (or front surface) 310a, a second surface (or rear surface) 310b, and a side surface 310c surrounding a space between the first surface 310a and the second surface 310b. According to an embodiment (not shown), the housing may denote a structure forming part of the first surface 310a, the second surface 310b, and the side surfaces 310c of FIGS. 3A to 3D. According to an embodiment, the first surface 310a may be formed by a front plate 302 (e.g., a glass plate or polymer plate with various laminated layers) at least part of which is substantially transparent. The second surface 310b may be formed by a rear plate 308 that is substantially opaque. The rear plate 308 may be formed of, e.g., laminated or colored glass, ceramic, polymer, metal (e.g., aluminum, stainless steel (STS), or magnesium), or a combination of at least two thereof. The side surface 310c may be formed by a side bezel structure (or a "side member") that couples to the front plate 302 and the rear plate 308 and includes a metal and/or polymer. According to an embodiment, the rear plate 308 and the side bezel plate may be integrally formed together and include the same material (e.g., a metal, such as aluminum).

According to various embodiments, the housing 310 may include a plurality of body portions 300. The plurality of body portions 300 may be segmented from each other and be rotatably connected through hinge structures disposed therebetween. For example, the plurality of body portions 300 may include at least three or more body portions and provide a folding state of the electronic device 101, together with the display 301. According to an embodiment, the plurality of body portions 300 may dispose and support the display 301 on one surface (e.g., an upper surface) thereof. Various electronic components may be mounted in the inner space of the plurality of body portions 300 and be electrically connected to each other.

According to various embodiments, the display 301 may be exposed (e.g., visible or viewable) through, e.g., a majority portion of the front plate 302. According to an embodiment, at least a portion of the display 301 may be exposed through the front plate forming the first surface 310a and a partial area of the side surface 310c. According to an embodiment, the edge of the display 301 may be formed to be substantially the same in shape as an adjacent outer edge of the front plate 302. According to an embodiment (not shown), the interval between the outer edge of the display 301 and the outer edge of the front plate 302 may remain substantially even to give a larger area of exposure the display 301. For example, when viewed from above the front plate 302, the screen display area of the display 301 may be 90% or more of the area of the first surface 310a. According to an embodiment, a recess or an opening may be formed in a portion of the screen display area of the display 301, and other electronic components, e.g., a camera module or an unshown sensor module (e.g., proximity sensor or illuminance sensor, may be included which are aligned with the recess or the opening.

The plurality of body portions 300 may include a total of N body portions which may include a first body portion 311, a second body portion 312 connected to one end of the first body portion 311, a third body portion 313 connected to one end of the second body portion 312, . . . , an nth body connected to one end of an n−1th body. As another example, the plurality of body portions 300 may include a total of 24 body portions, and a hinge structure may be disposed between two adjacent ones thereof. One body (e.g., the second body portion 302) of the plurality of body portions 300 may rotate within a designated angle with respect to the bodies disposed on two opposite sides thereof. The housing 310 may change from a flat unfolded state to a rolled state. For example, the plurality of body portions 300, together with the display 301, may be changed into a folded state by being rolled inward (in-rolling) or rolling outward (out-rolling).

Figure 4A:
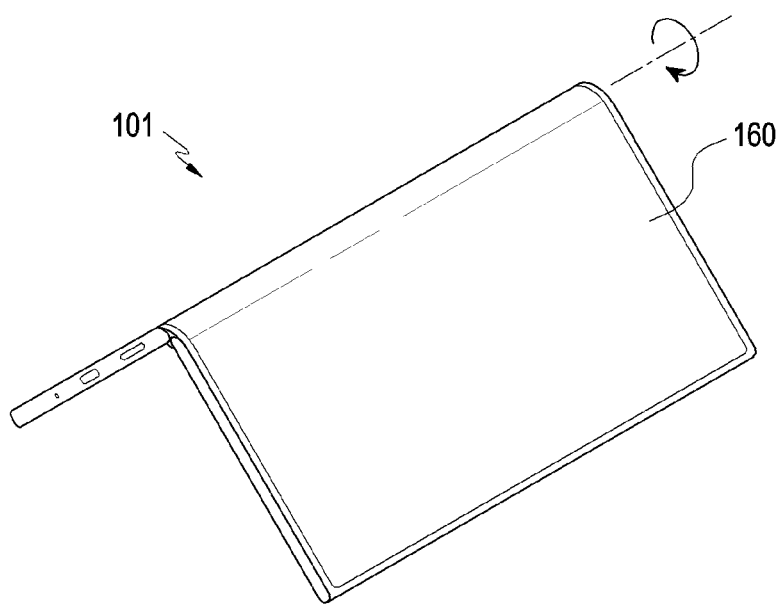
FIG. 4A is a perspective view illustrating an electronic device illustrating a folding of the electronic device according to various embodiments.
Figure 4B:
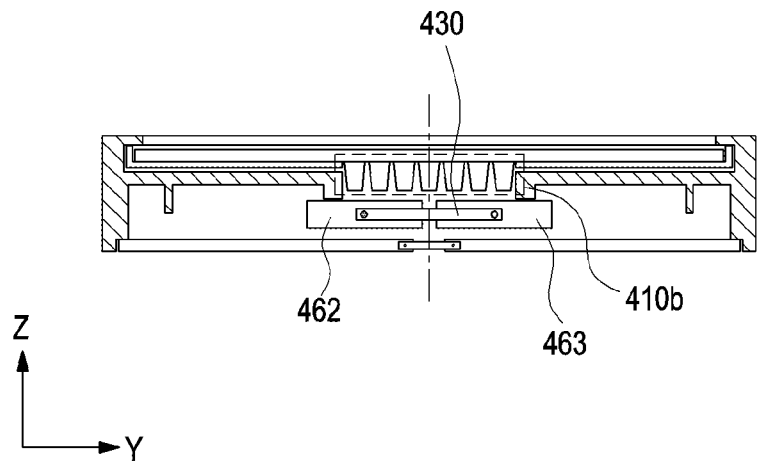
FIG. 4B is a side, cross-sectional view illustrating an electronic device according various embodiments.
Figure 4C:
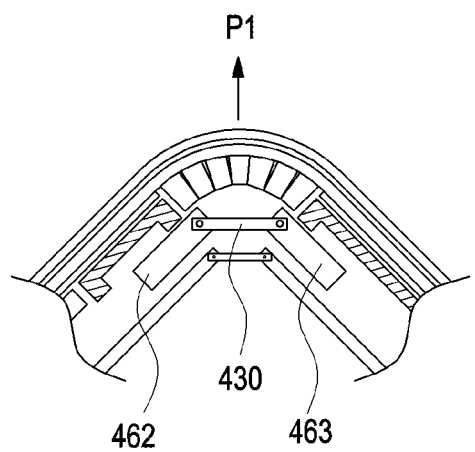
FIG. 4C is an partial cross-sectional view illustrating an internal structure of an electronic device in a folding state according to various embodiments.

FIG. 4A is a perspective view illustrating a folding of the electronic device according to various embodiments. FIG. 4B is a side, cross-sectional view illustrating an electronic device according to various embodiments. FIG. 4C is partial cross-sectional view illustrating an internal structure of an electronic device in a folding state according to various embodiments. In the disclosure, the type of the electronic device 101 illustrated in FIGS. 4A, 4B and 4C (which may be referred to as FIGS. 4A to 4C) may be referred to as an "out-folding electronic device".

Referring to FIGS. 4A to 4C, according to an embodiment of the disclosure, the electronic device 101 may be folded on the center line of the flexible display. According to various embodiments of the disclosure, a first main circuit board 462 and a second main circuit board 463 may be connected via a connecting member 430. According to various embodiments of the disclosure, the connecting member 430 may fix the first main circuit board 462 and the second main circuit board 463 to be rotatable. According to various embodiments of the disclosure, if a folding event occurs on the electronic device 101, the first main circuit board 462 and second main circuit board 463 may push up the hinge structure 410b in a first direction (e.g., the P1 direction) as shown in FIG. 4C. According to various embodiments of the disclosure, as the first main circuit board 462 and the second main circuit board 463 push up the hinge structure 410b, the hinge structure 410b may be folded. According to an embodiment, there may be included another structure in which the connecting member 430 is alternatively/interchangeably connected to the circuit board (e.g., the first main circuit board 462 or second main circuit board 463).

Figure 5A:
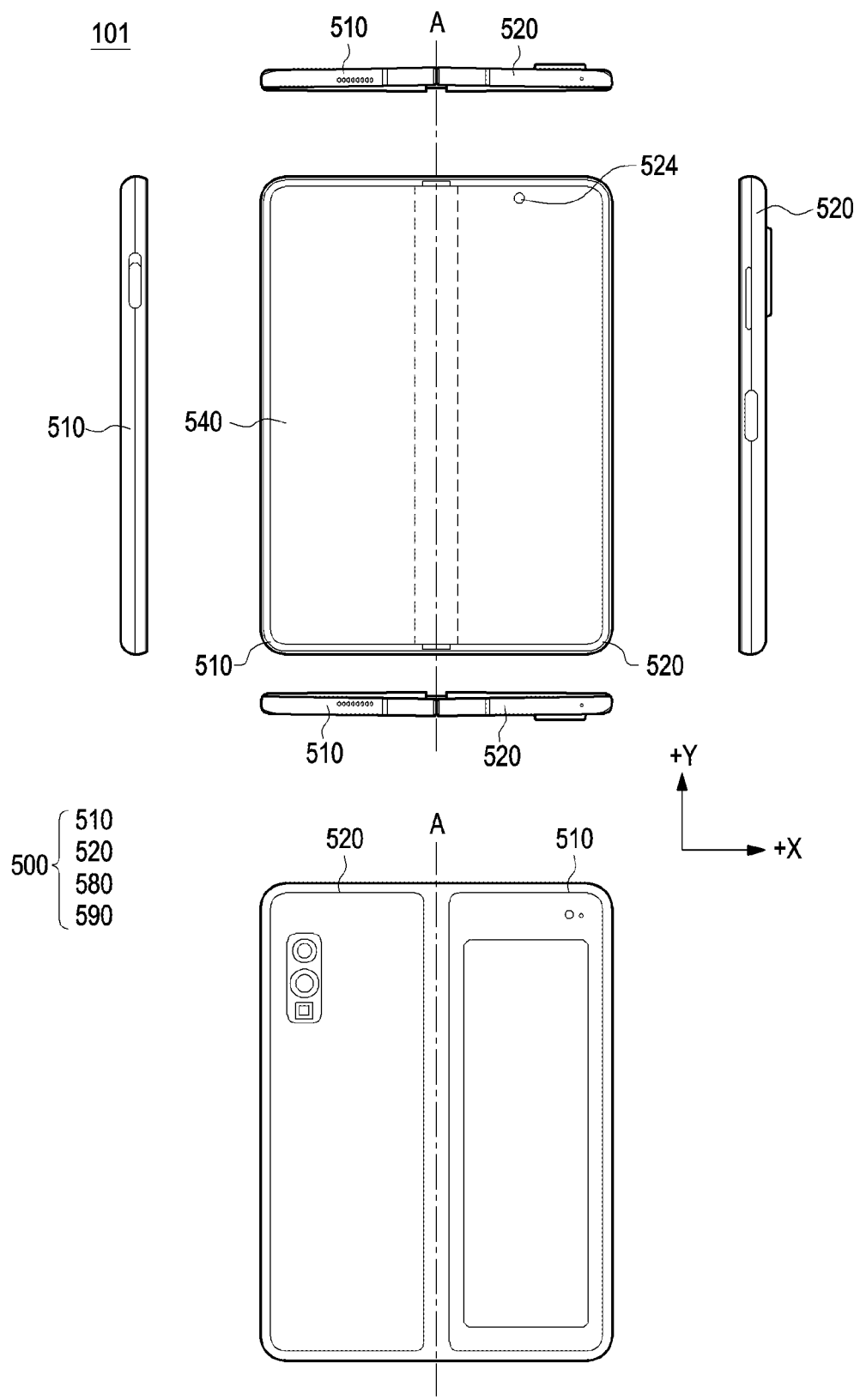
FIG. 5A is a diagram illustrating an electronic device in an unfolded state according to various embodiments.
Figure 5B:
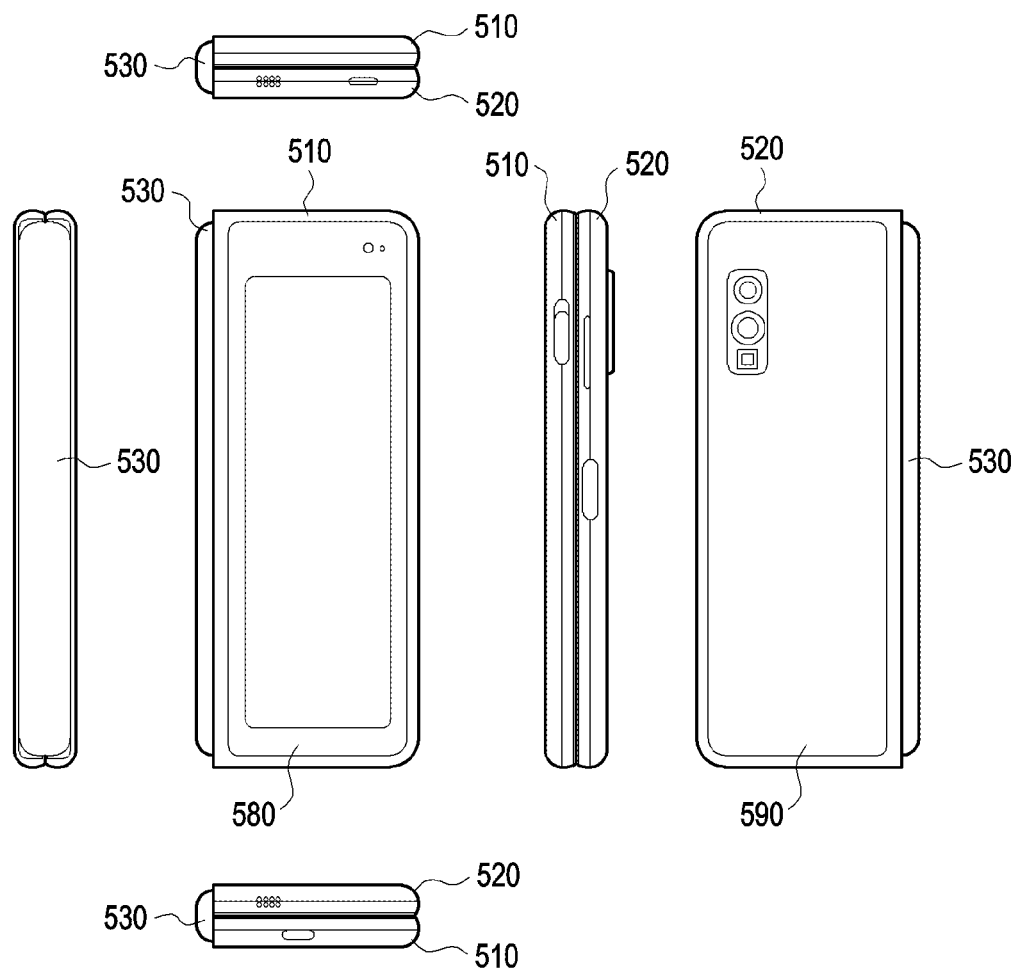
FIG. 5B is an diagram illustrating an electronic device in a folded state according to various embodiments.

FIG. 5A is a diagram illustrating an electronic device in an unfolded state according to various embodiments. FIG. 5B is a diagram illustrating an electronic device in a folded state according to various embodiments. In the disclosure, the type of the electronic device illustrated in FIGS. 5A and 5B may be referred to as an "in-folding electronic device".

Referring to FIGS. 5A and 5B, according to an embodiment, an electronic device 101 may include a foldable housing 500, a hinge cover 530 covering a foldable portion of the foldable housing 500, and a flexible or foldable display 540 disposed in a space formed by the foldable housing 500. According to various embodiments, the foldable housing 500 may include a first housing structure 510, a second housing structure 520 including a sensor area 524, a first rear cover 580, and a second rear cover 590. According to various embodiments, the first housing structure 510 may be connected to the hinge structure and may include a first surface facing in a first direction and a second surface facing in a second direction opposite to the first direction. The second housing structure 520 may be connected to the hinge structure and may include a third surface facing in a third direction and a fourth surface facing in a fourth direction opposite to the third direction, and may rotate from the first housing structure 510 on the hinge structure. Thus, the electronic device 101 may turn into a folded state or unfolded state. In the folded state of the electronic device 101, the first surface may face the third surface and, in the unfolded state, the third direction may be identical to the first direction.

According to various embodiments, the first housing structure 510 and the second housing structure 520 may be positioned on opposite sides of a folding axis (axis A), and they may be overall symmetrical in shape with each other with respect to the folding axis A. As is described below, the angle or distance between the first housing structure 510 and the second housing structure 520 may be varied depending on whether the electronic device 101 is in the unfolded state, the folded state, or the partially unfolded intermediate state.

FIGS. 6A, 6B, 6C, 6D, 6E, 6F, 6G, 6H, and 6I include a flowchart and example views illustrating an example operation of displaying a screen on an electronic device and an external electronic device when a sliding event for the electronic device occurs in a state in which the electronic device and the external electronic device are connected, with a reference line set to a first setting state in a first mode according to various embodiments.

Figure 6A:
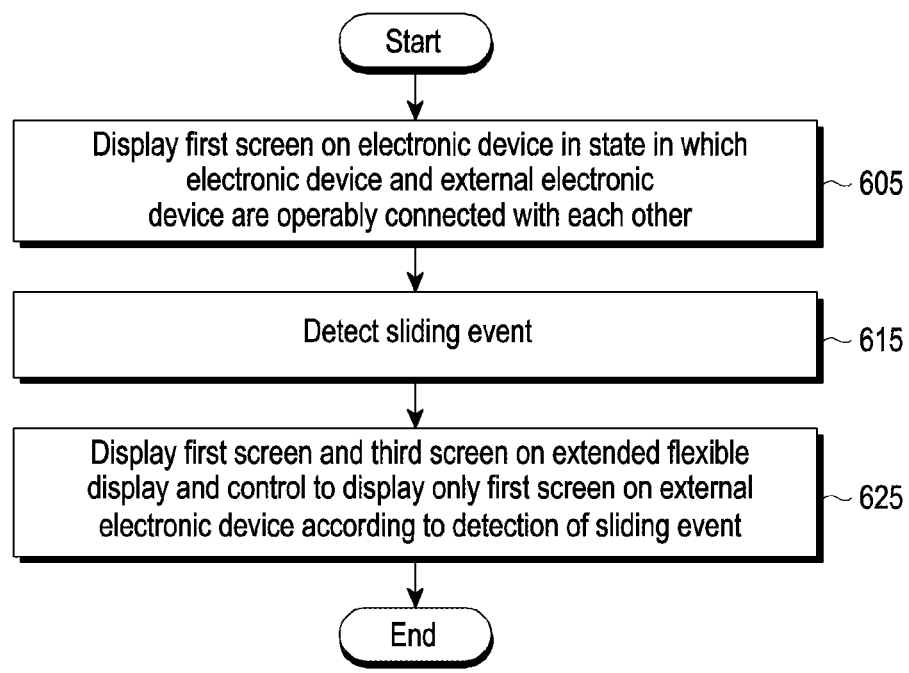
FIGS. 6A, 6B, 6C, 6D, 6E, 6F, 6G, 6H, and 6I include a flowchart and example views illustrating an example operation of displaying a screen on an electronic device and an external electronic device when a sliding event for the electronic device occurs in a state in which the electronic device and the external electronic device are connected, with a reference line set to a first setting state in a first mode according to various embodiments.
Figure 6B:
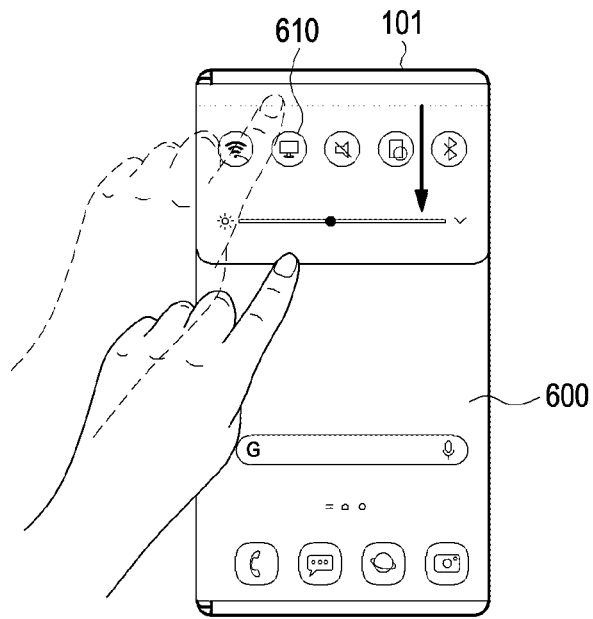
Figure 6C:
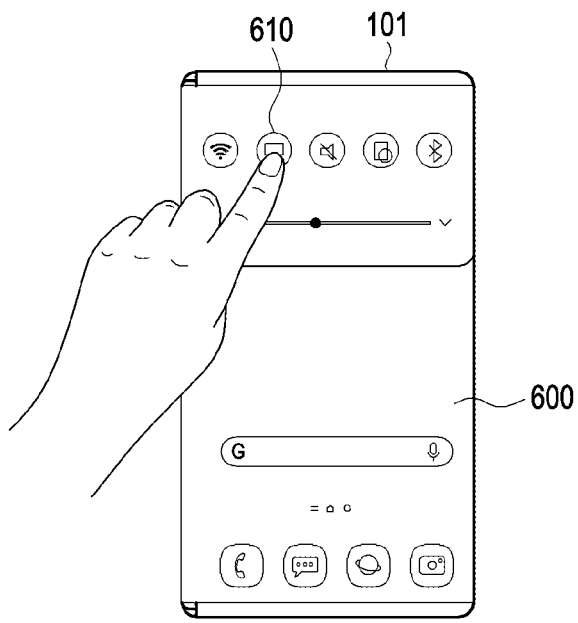
Figure 6D:
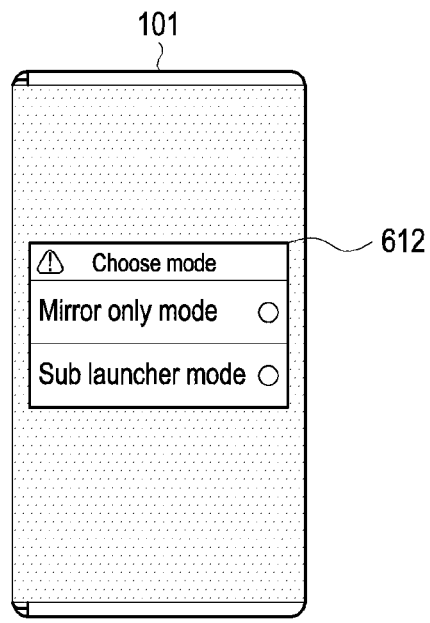
Figure 6E:
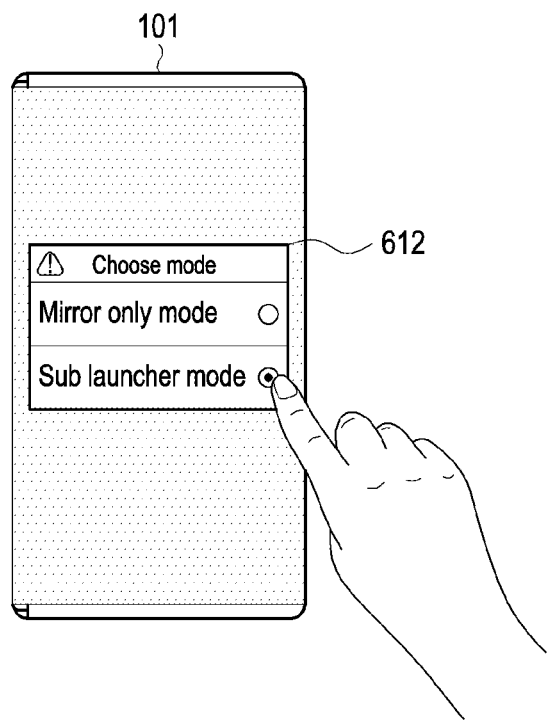
Figure 6F:
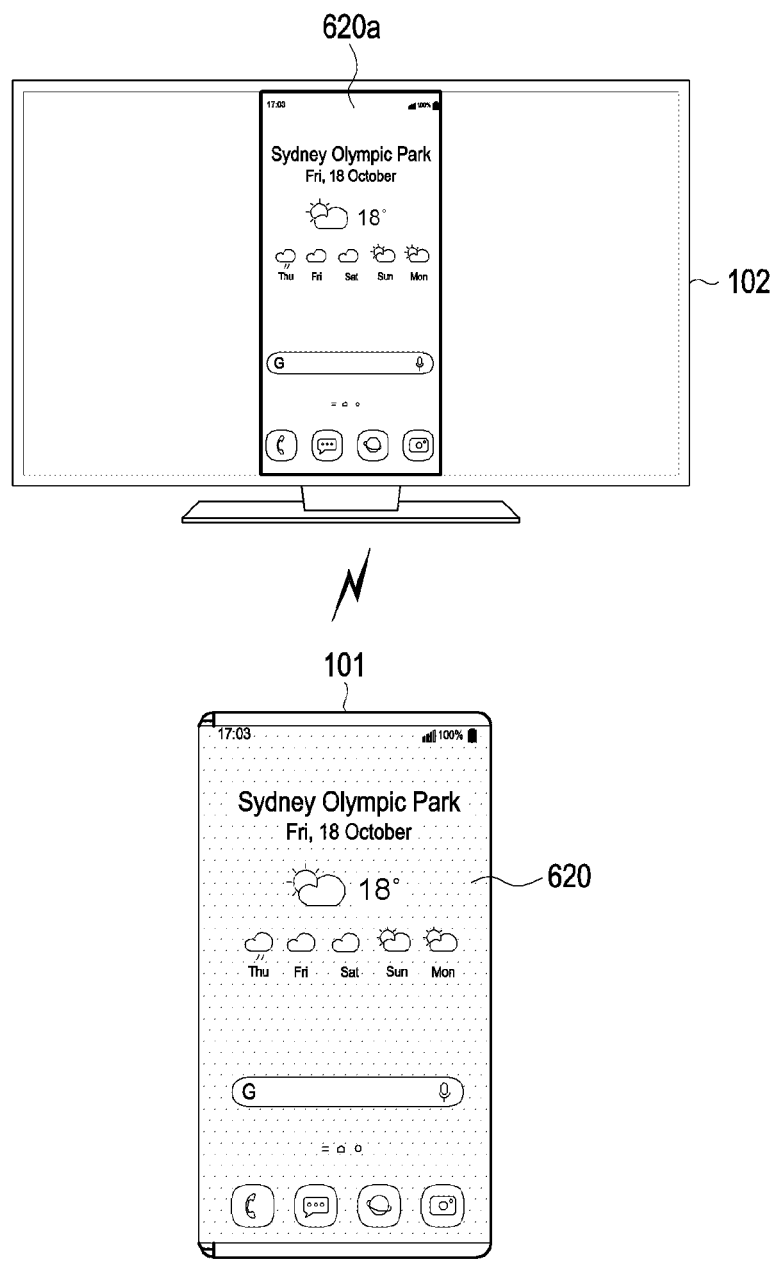

Referring to FIG. 6A, according to an embodiment of the disclosure, in operation 605, the electronic device 101 may display a first screen 620 on the electronic device 101 in a state in which the electronic device 101 and an external electronic device 102 are operably connected with each other. According to an embodiment of the disclosure, the electronic device 101 may display the first screen 620 on the electronic device and a second screen 620a corresponding to the first screen 620 on the external electronic device, as shown in FIG. 6F. According to an embodiment of the disclosure, the second screen 620a may be a mirrored screen of the first screen. Or, according to an embodiment of the disclosure, the second screen 620a may include a screen in which the attribute (e.g., resolution, number of screens, direction of screen, position of displayed obtain on screen, brightness of screen, color of object, shape of object, contrast, or screen size) of the first screen has been changed. According to an embodiment of the disclosure, the electronic device 101 may receive a user input to select a mode for mirroring or a mode for displaying both a main launcher (e.g., the first screen 620) and a sub launcher (e.g., the third screen 630) on the electronic device 101, as shown in FIGS. 6A to 6E. Referring to FIG. 6B, according to an embodiment of the disclosure, the electronic device 101 may receive a user input for displaying a quick panel. According to an embodiment of the disclosure, the user input for displaying the quick panel may include a drag or swipe input downward from an upper edge area of the electronic device 101. According to an embodiment of the disclosure, the quick panel may be displayed while covering the home screen 600. According to an embodiment of the disclosure, the quick panel may include various icons including an icon 610 for selecting a mode (e.g., mirror mode or sub launcher mode). Referring to FIG. 6C, according to an embodiment of the disclosure, the electronic device 101 may receive a selection input on the icon 610 for selecting a mode on the quick panel. Referring to FIG. 6D, according to an embodiment of the disclosure, the electronic device 101 may display a menu 612 to receive selection of a mode for mirroring or a mode for displaying both a main launcher (e.g., the first screen 620) and a sub launcher (e.g., the third screen 630) on the electronic device 101. Referring to FIG. 6E, according to an embodiment of the disclosure, the electronic device 101 may receive a user input to select any one of a mode for mirroring or a mode for displaying both a main launcher (e.g., the first screen 620) and a sub launcher (e.g., the third screen 630) on the electronic device 101. FIGS. 6A to 6I illustrate an example case in which the user selects the mode for displaying both the main launcher (e.g., the first screen 620) and the sub launcher (e.g., the third screen 630) on the electronic device 101.

Figure 6G:
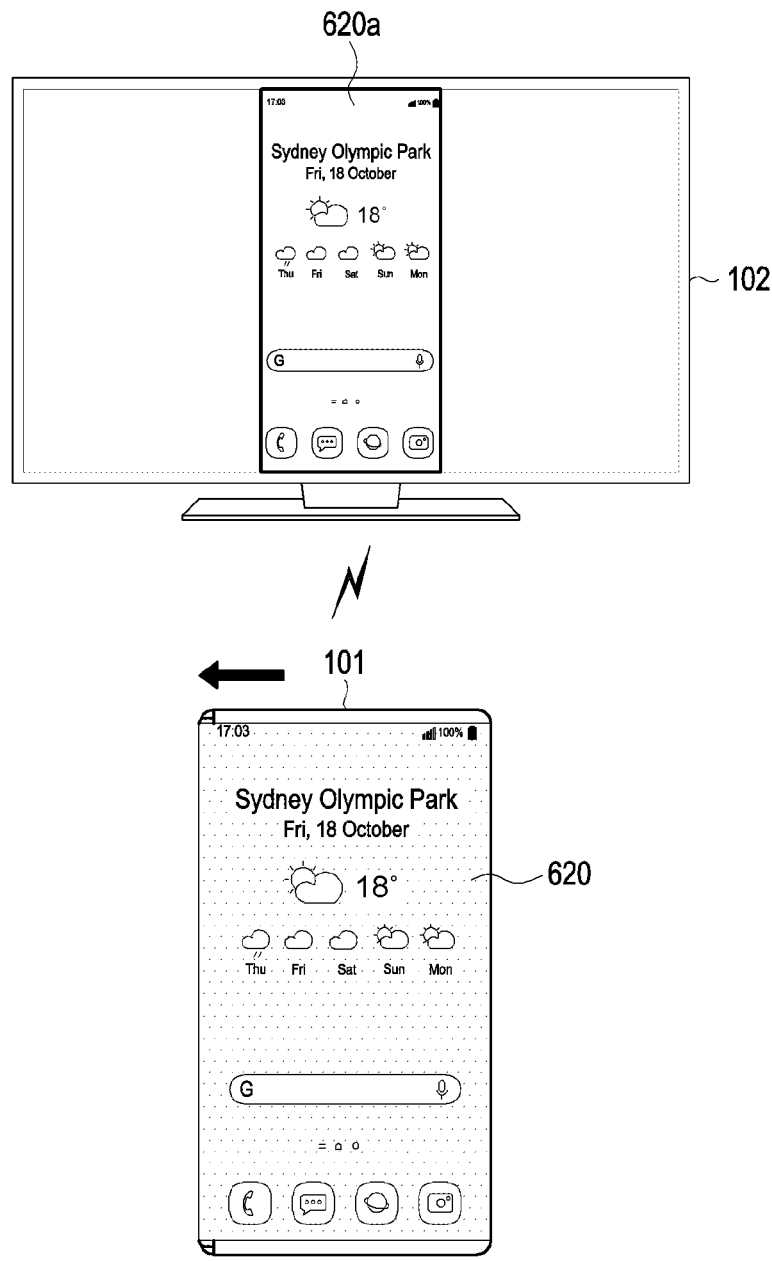

According to an embodiment of the disclosure, in operation 615, the electronic device 101 may detect a sliding event to extend the flexible display (e.g., the display module 160 of FIG. 1). For example, as shown in FIG. 6G, the electronic device 101 may detect an event of sliding the display to the left.

Figure 6H:
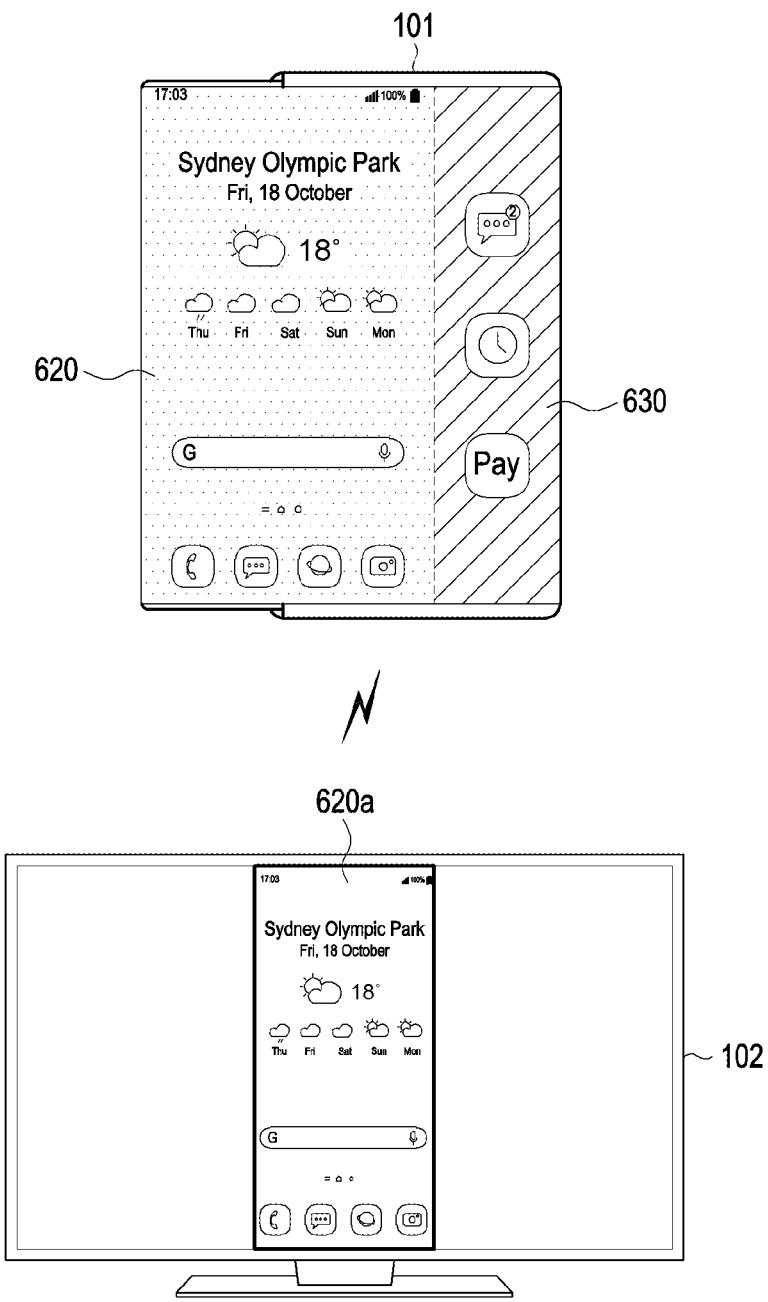
Figure 6I:
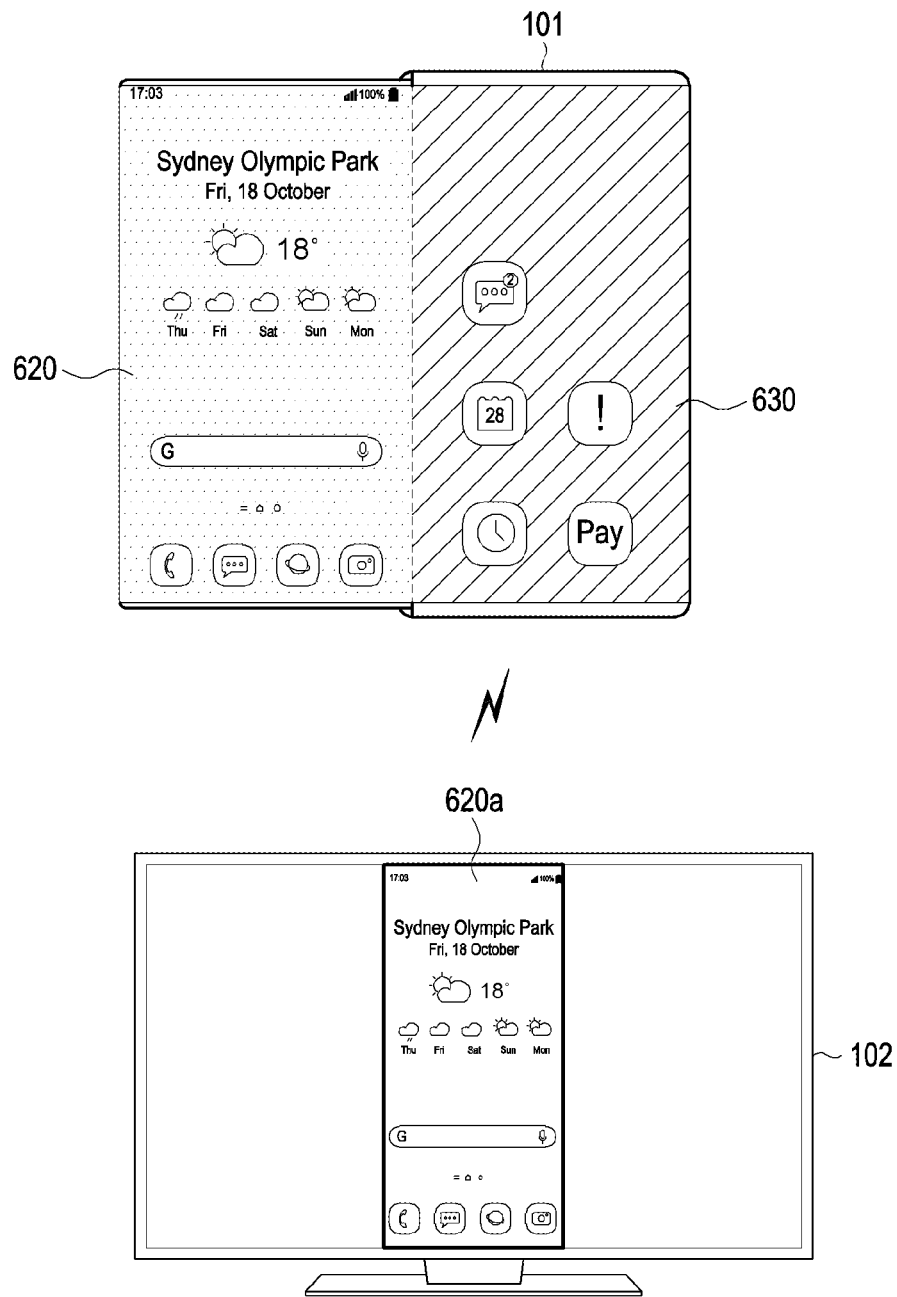

According to an embodiment of the disclosure, in operation 625, the electronic device 101 may display the first screen 620 and the third screen 360 on the flexible display extended according to detection of the sliding event and control to display the second screen 620a alone on the external electronic device 102. Referring to FIG. 6H, according to an embodiment of the disclosure, the electronic device 101 may display a second screen 630 including at least one icon in the area extended to be newly displayed on the front surface or upper surface (e.g., the surface facing the user) according to the sliding event. According to an embodiment of the disclosure, the electronic device 101 may display the first screen 620 in the left (or right) area of a preset virtual reference line and display the third screen 630 in the right (or left) area. FIGS. 6A to 6I illustrate an example state (e.g., first setting state) in which a reference line is predesignated to minimize and/or reduce the area in which the flexible display is exposed to the front surface or upper surface (e.g., towards the user). Referring to FIG. 6I, according to an embodiment of the disclosure, the electronic device 101 may continuously display the third screen 630 in the area continuously extended according to the sliding event. According to an embodiment of the disclosure, the electronic device 101 may control the external electronic device 102 to display only the second screen 620a corresponding to the first screen 620 although the third screen 630 is displayed on the electronic device 101. According to an embodiment of the disclosure, the electronic device 101 may store information about the area in which the first screen 620 is displayed according to the reference line 710 set by the user. According to an embodiment of the disclosure, when the electronic device 101 is slid in a size equal to or larger than the area in which the first screen 620 is displayed according to the user's sliding event, the electronic device 101 may determine that the virtual reference line is positioned on the flexible display exposed to the front surface or upper surface. Or, according to an embodiment of the disclosure, the electronic device 101 may identify whether the reference line is exposed to the front surface or upper surface using, e.g., the amount of rotation of the roller according to the sliding event. For example, if the reference line is set to a first setting state, the reference line may be determined to be exposed to the outside although the relative value of the amount of rotation of the roller is 1 (e.g., when the roller is rotated once).

FIGS. 7A, 7B, 7C, and 7D include a flowchart and example views illustrating an example function or operation of displaying a screen on an electronic device and an external electronic device when a sliding event for the electronic device occurs in a state in which the electronic device and the external electronic device are connected, with a reference line set to a second setting state in a first mode according to various embodiments.

According to an embodiment of the disclosure, in operation 705, the electronic device 101 may display a first screen 620 on the electronic device 101 in a state in which the electronic device 101 and an external electronic device are operably connected with each other. According to an embodiment of the disclosure, the electronic device 101 may display the first screen 620 on the electronic device 101 as shown in FIG. 6F.

According to an embodiment of the disclosure, in operation 715, the electronic device 101 may detect a sliding event to extend the flexible display. For example, as shown in FIG. 6G, the electronic device 101 may detect an event of sliding the display to the left.

According to an embodiment of the disclosure, in operation 725, the electronic device 101 may determine whether at least a portion of the flexible display exposed (e.g., visible or viewable) to the front surface or upper surface according to the sliding event includes the area for displaying the third screen 630. According to an embodiment of the disclosure, the electronic device 101 may determine whether the area for displaying the third screen is included based on whether the virtual reference line is positioned on the flexible display exposed to the front surface or upper surface. According to an embodiment of the disclosure, the reference line 710 may be predesignated as described above, or may be set by the user as shown in FIG. 7B. In the disclosure, the state in which the reference line 710 is set by the user may be referred to as a second setting state. According to an embodiment of the disclosure, the electronic device 101 may display the set reference line and may set a reference line according to a user input (e.g., drag input) for a reference line to be set.

Figure 7A:
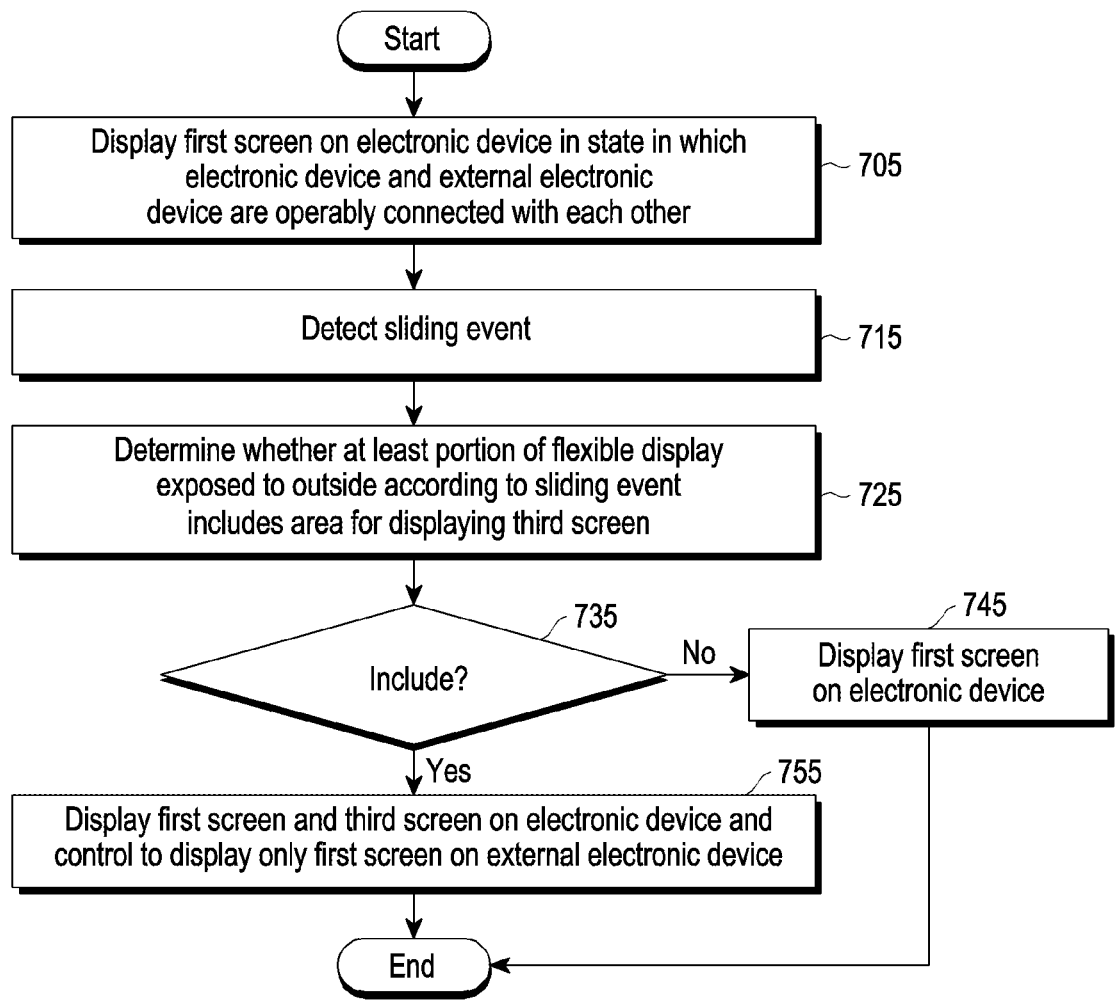
FIGS. 7A, 7B, 7C, and 7D include a flowchart and example views illustrating an example function or operation of displaying a screen on an electronic device and an external electronic device when a sliding event for the electronic device occurs in a state in which the electronic device and the external electronic device are connected, with a reference line set to a second setting state in a first mode according to various embodiments.
Figure 7B:
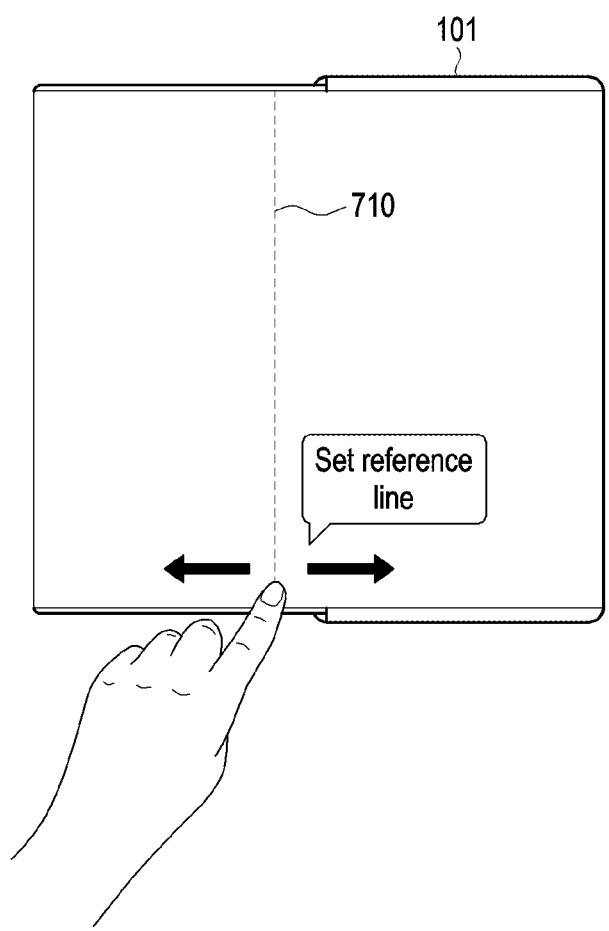
Figure 7C:
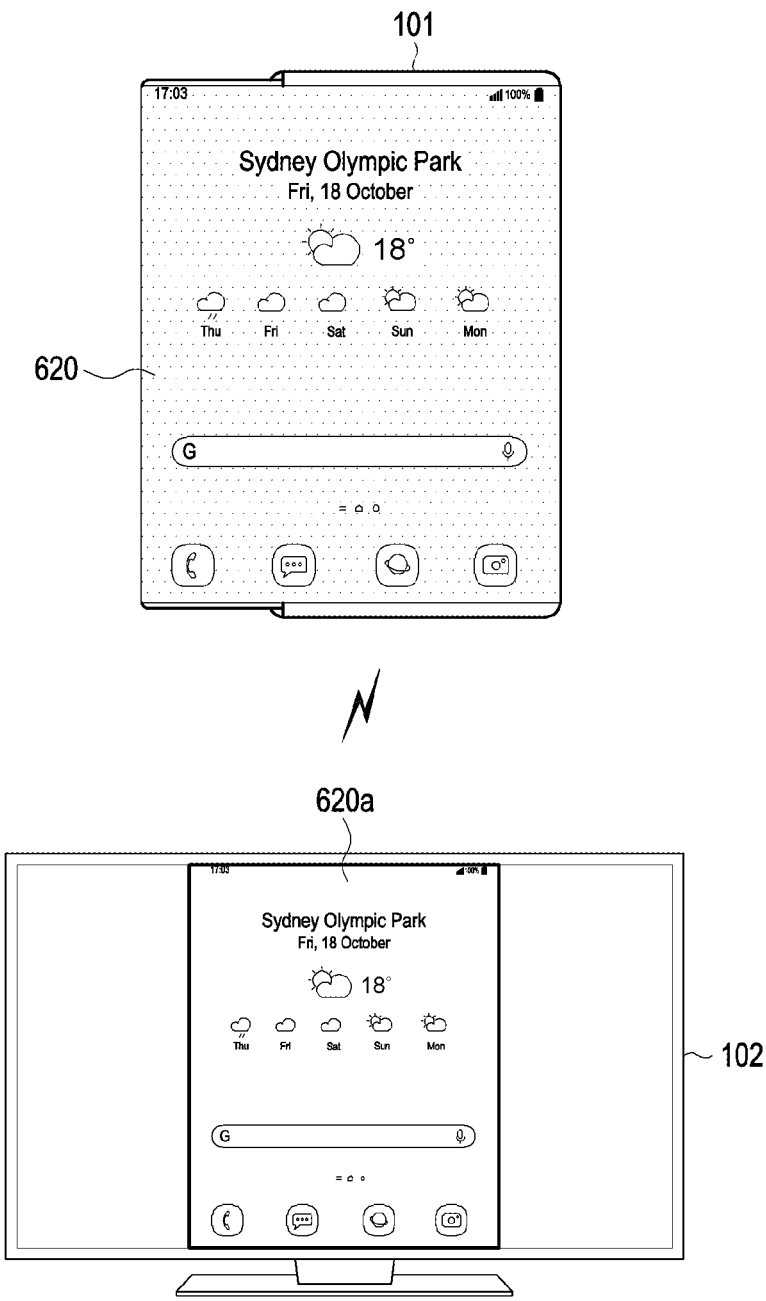
Figure 7D:
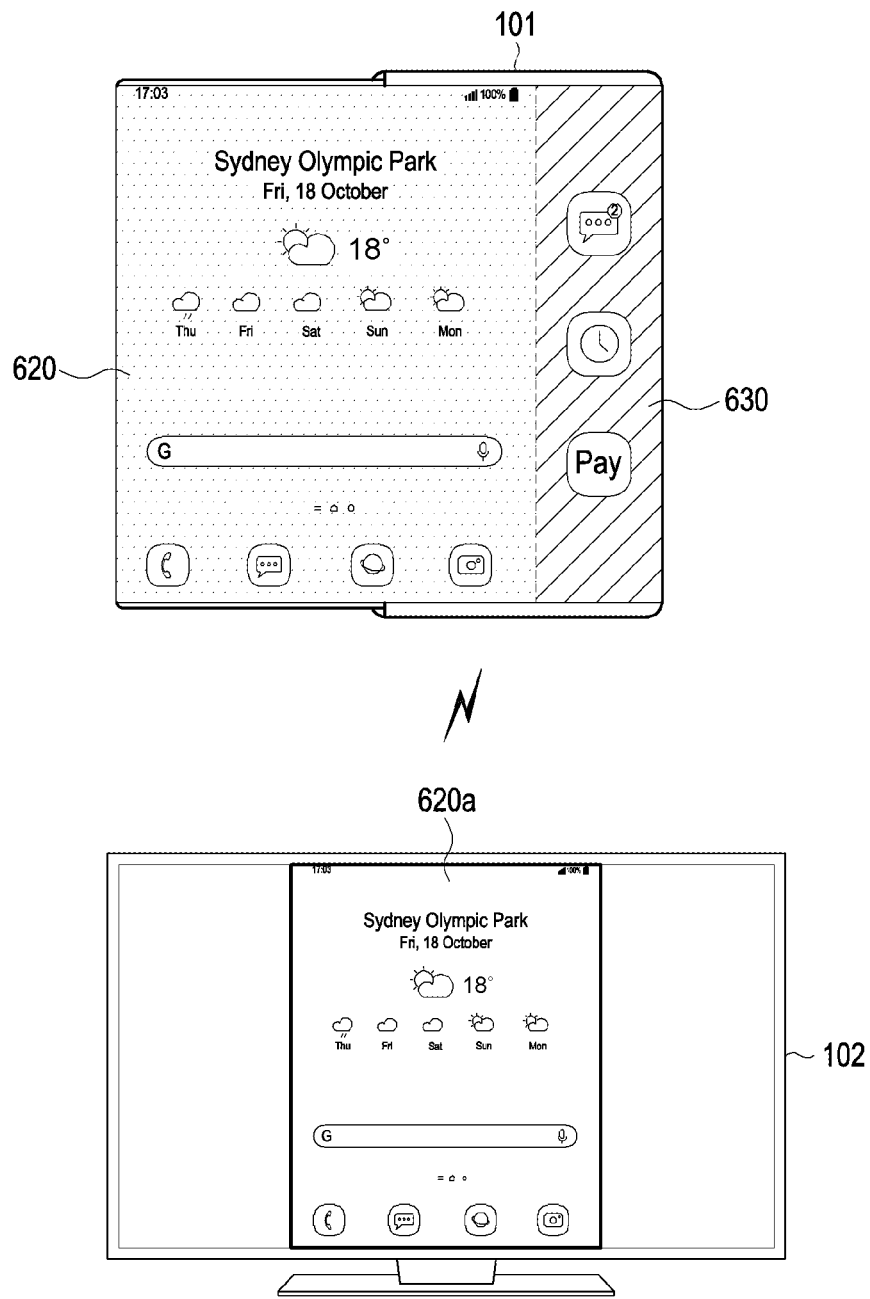

According to an embodiment of the disclosure, in operation 755 (yes in operation 735), when at least a portion of the flexible display exposed (e.g., visible or viewable) to the front surface or upper surface according to the sliding event includes the area for displaying the third screen 630, the electronic device 101 may display the first screen 620 and the third screen 630 on the electronic device 101 and control to display only the screen 620a corresponding to the first screen 620 on the external electronic device. Referring to FIGS. 7C and 7D, the electronic device 101 may extend and display the first screen 620 according to the detected sliding event. According to an embodiment of the disclosure, the electronic device 101 may display the extended first screen 620 on the external electronic device 102. According to an embodiment of the disclosure, when the reference line 710 is positioned on the front surface or upper surface according to the sliding event, the electronic device 101 may display the first screen 620 on one side (e.g., left side) of the reference line 710 and third screen 630 on the other side (e.g., right side) of the reference line 710. In this case, only the second screen 620a corresponding to the first screen may be displayed on the external electronic device 101 as shown in FIG. 7D. According to an embodiment of the disclosure, in operation 745 (no in operation 735), when at least a portion of the flexible display exposed (e.g., visible or viewable) to the front surface according to the sliding event does not include the area for displaying the third screen 630, the electronic device 101 may display the first screen 620 on the electronic device 101.

Figure 8A:
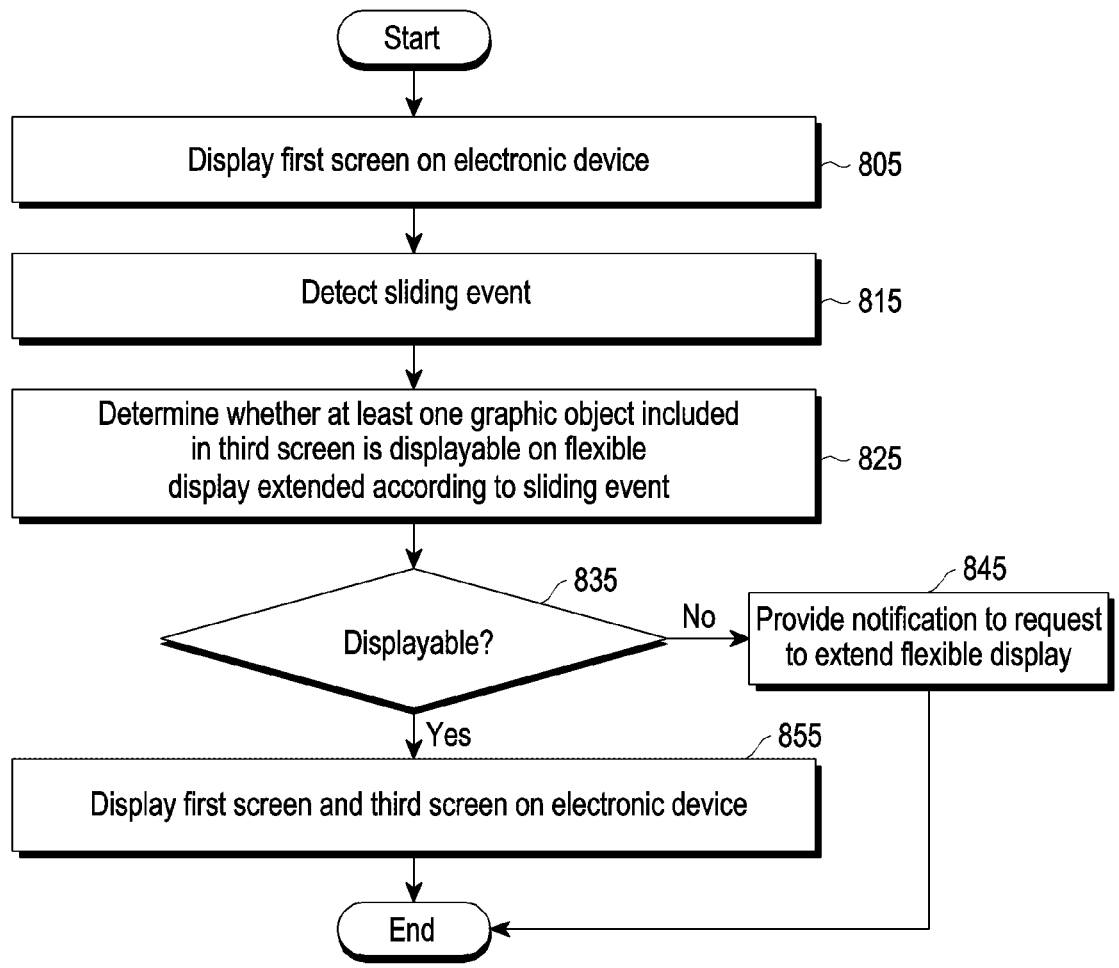
FIGS. 8A, 8B, and 8C include a flowchart and example views illustrating an example function or operation of providing a notification to a user when a space where an icon included in a second screen in a first mode is displayed is insufficient according to various embodiments.
Figure 8B:
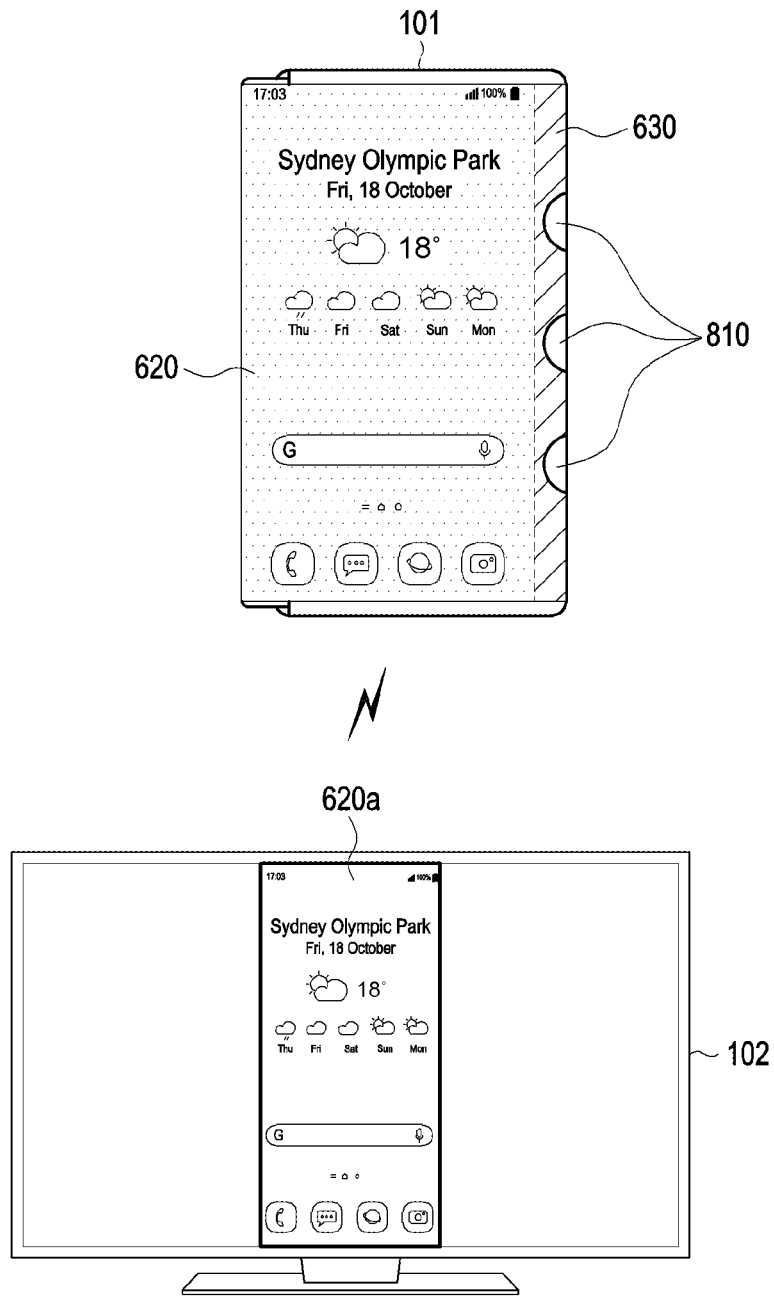
Figure 8C:
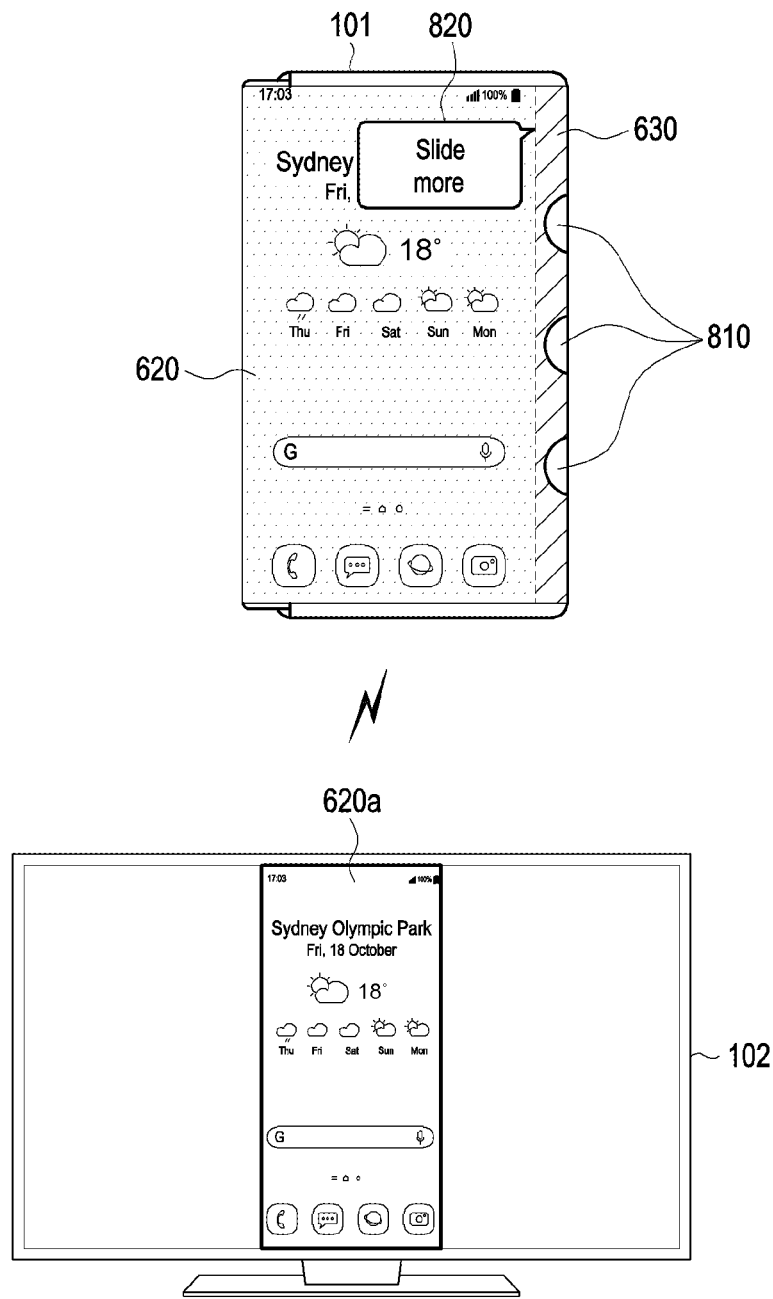

FIGS. 8A, 8B, and 8C include a flowchart and example views illustrating an example function or operation of providing a notification to a user when a space where an icon included in a second screen in a first mode is displayed is insufficient according to various embodiments.

Referring to FIG. 8A, according to an embodiment of the disclosure, in operation 805, the electronic device 101 may display the first screen 620 on the electronic device 101. According to an embodiment of the disclosure, the electronic device 101 may display the first screen 620 on the electronic device and a second screen 620a corresponding to the first screen 620 on the external electronic device, as shown in FIG. 6F.

According to an embodiment of the disclosure, in operation 815, the electronic device 101 may detect a sliding event. For example, as shown in FIG. 6G, the electronic device 101 may detect an event of sliding the display to the left.

According to an embodiment of the disclosure, in operation 825, the electronic device 101 may determine whether at least one graphic object (e.g., icon) included in the third screen 630 may be displayed on the flexible display extended according to the sliding event. According to an embodiment of the disclosure, when at least a portion of the area where the icon is displayed is not included in the third screen 630, the electronic device 101 may determine that the icon may not be displayed on the extended flexible display.

According to an embodiment of the disclosure, in operation 855 (yes in operation 835), when at least one graphic object (e.g., icon) included in the third screen 630 may be displayed on the flexible display extended according to the sliding event, the electronic device 101 may display the first screen 620 and the third screen 630 on the electronic device 101. However, according to an embodiment of the disclosure, in operation 845 (no in operation 835), as shown in FIG. 8B, when at least one graphic object (e.g., icon) included in the third screen 630 may not be displayed on the flexible display extended according to the sliding event, the electronic device 101 may provide a notification 820 to request to extend the flexible display as shown in FIG. 8C. According to an embodiment of the disclosure, the notification 820 to request to extend the flexible display may be continuously displayed until at least one graphic object 810 may be displayed on the third screen 630.

Figure 9A:
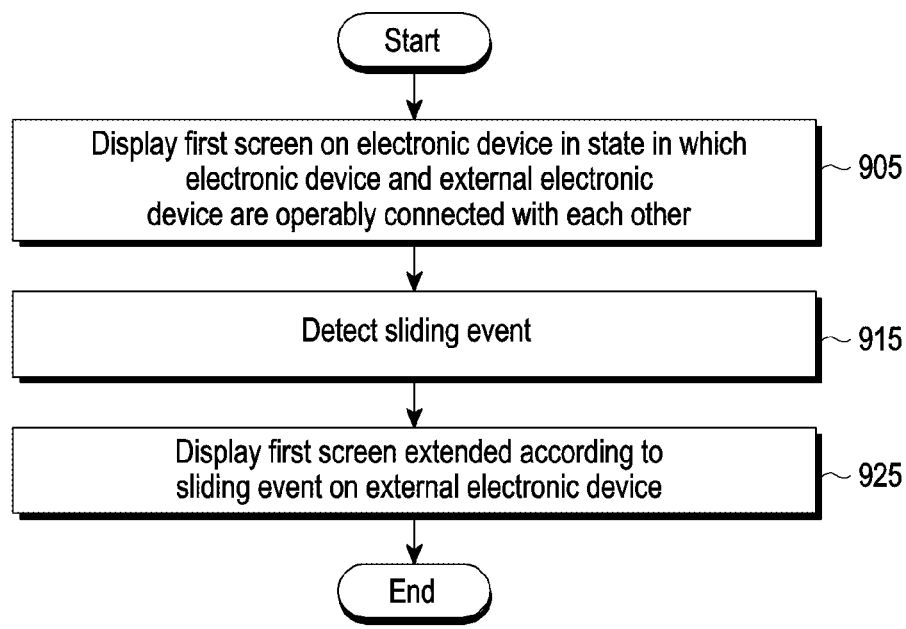
FIGS. 9A and 9B include a flowchart and example views illustrating a screen displayed on an external electronic device when only a first screen is set to be displayed on an electronic device in a first mode according to various embodiments.
Figure 9B:
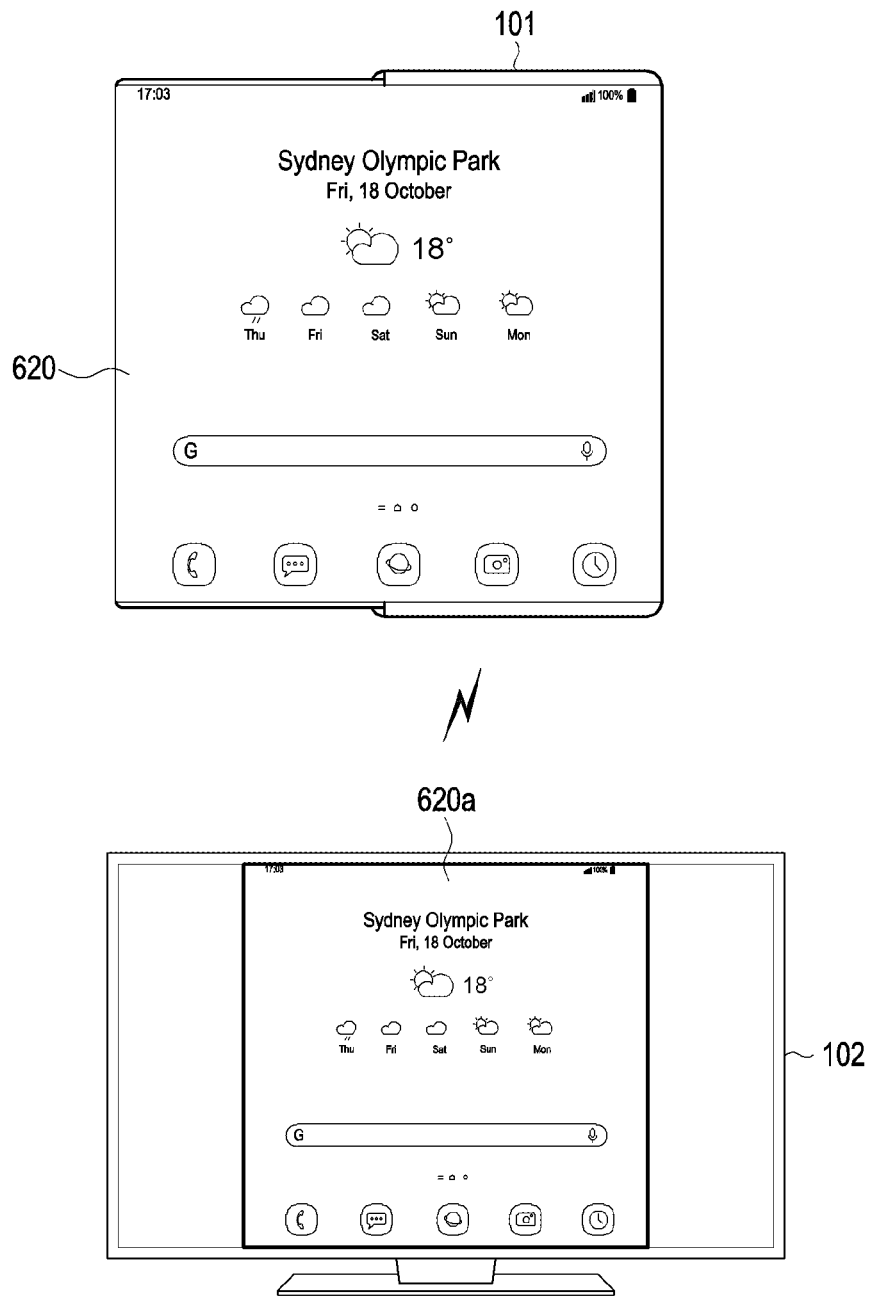

FIGS. 9A and 9B includes a flowchart and example views illustrating a screen displayed on an external electronic device when only a first screen is set to be displayed on an electronic device in a first mode according to various embodiments. FIGS. 9A and 9B illustrate, by way of non-limiting example, a case where a mode for mirroring is selected by the user.

Referring to FIG. 9A, according to an embodiment of the disclosure, in operation 905, the electronic device 101 may display a first screen 620 on the electronic device in a state in which the electronic device 101 and an external electronic device 102 are operably connected with each other. According to an embodiment of the disclosure, the electronic device 101 may display the first screen 620 on the electronic device and a second screen 620a corresponding to the first screen 620 on the external electronic device, as shown in FIG. 6F.

According to an embodiment of the disclosure, in operation 915, the electronic device 101 may detect a sliding event. According to an embodiment of the disclosure, in operation 925, the electronic device 101 may display a second screen corresponding to the first screen 620 extended according to the sliding event on the external electronic device 102. According to an embodiment of the disclosure, when the mode for mirroring is selected by the user, if the first screen 620 is extended as shown in FIG. 9B, the screen displayed on the external electronic device 102 may also be extended and displayed accordingly. According to an embodiment of the disclosure, the extended first screen 620 may include more icons than those on the first screen 620 before extension. According to an embodiment of the disclosure, the position where the graphic object including information, such as character or number, included in the first screen 620 is displayed as the first screen 620 is extended may be gradually/continuously moved to be aligned with the center line of the first screen 620 as the screen is extended.

Figure 10A:
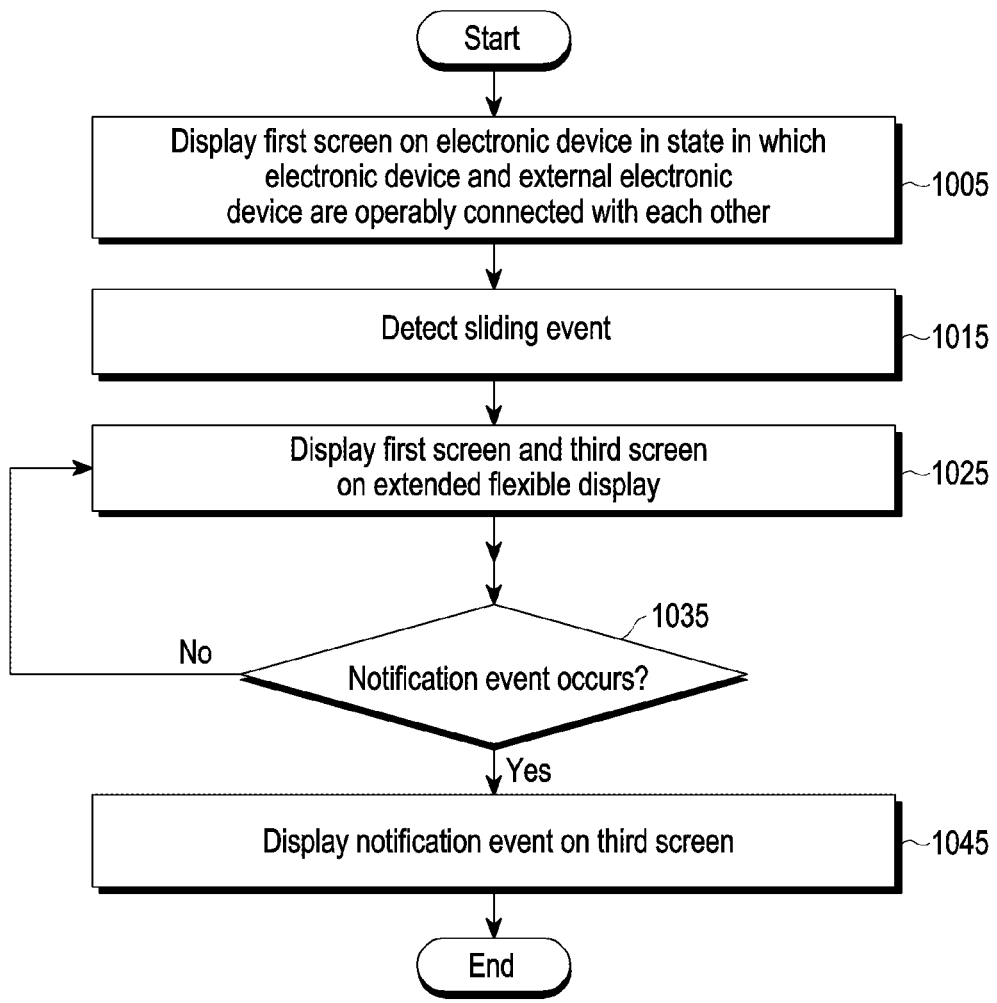
FIGS. 10A, 10B, and 10C include a flowchart and example views illustrating an example function or operation of outputting, through an electronic device, a message indicating that a notification event occurs, when the notification event occurs in a state in which both a first screen and a third screen are displayed on the electronic device, in a first mode according to various embodiments.
Figure 10B:
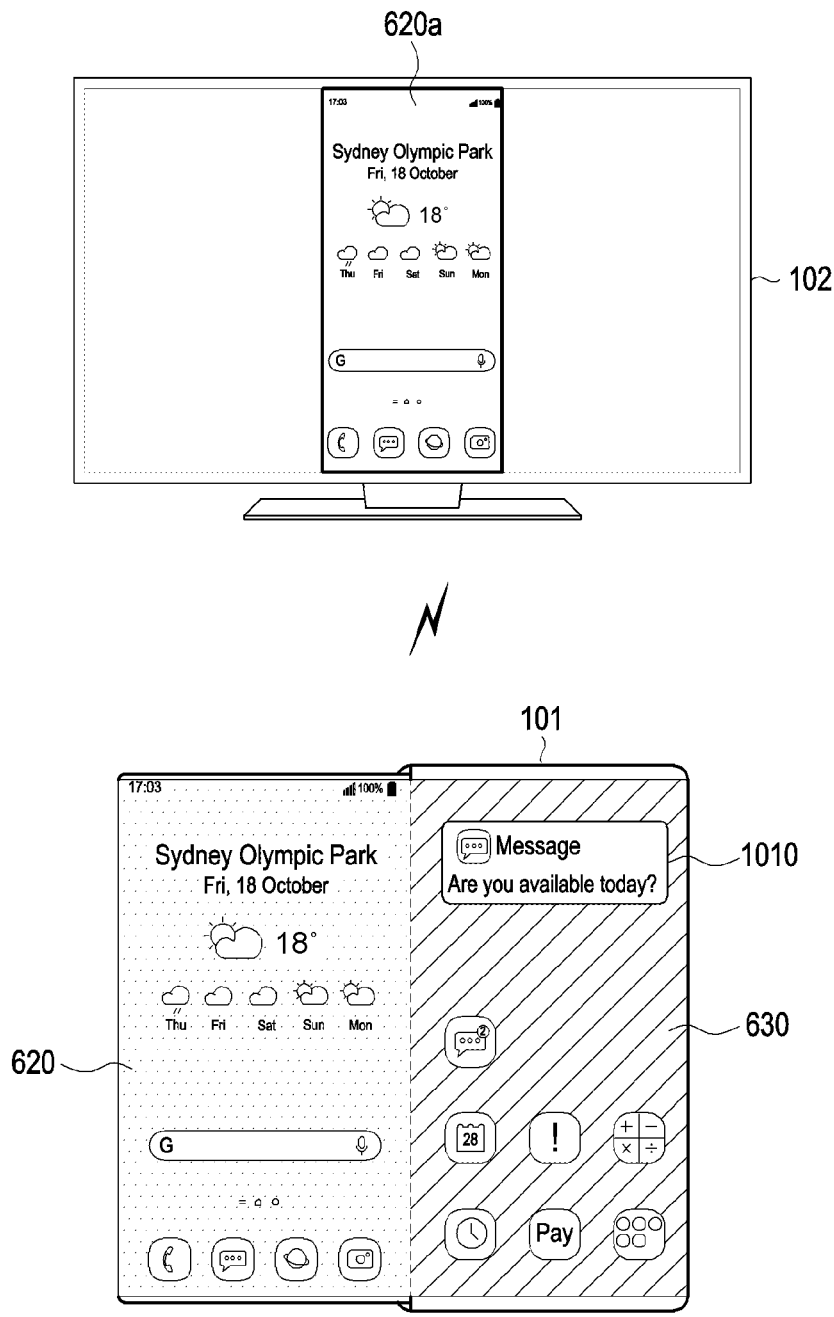
Figure 10C:
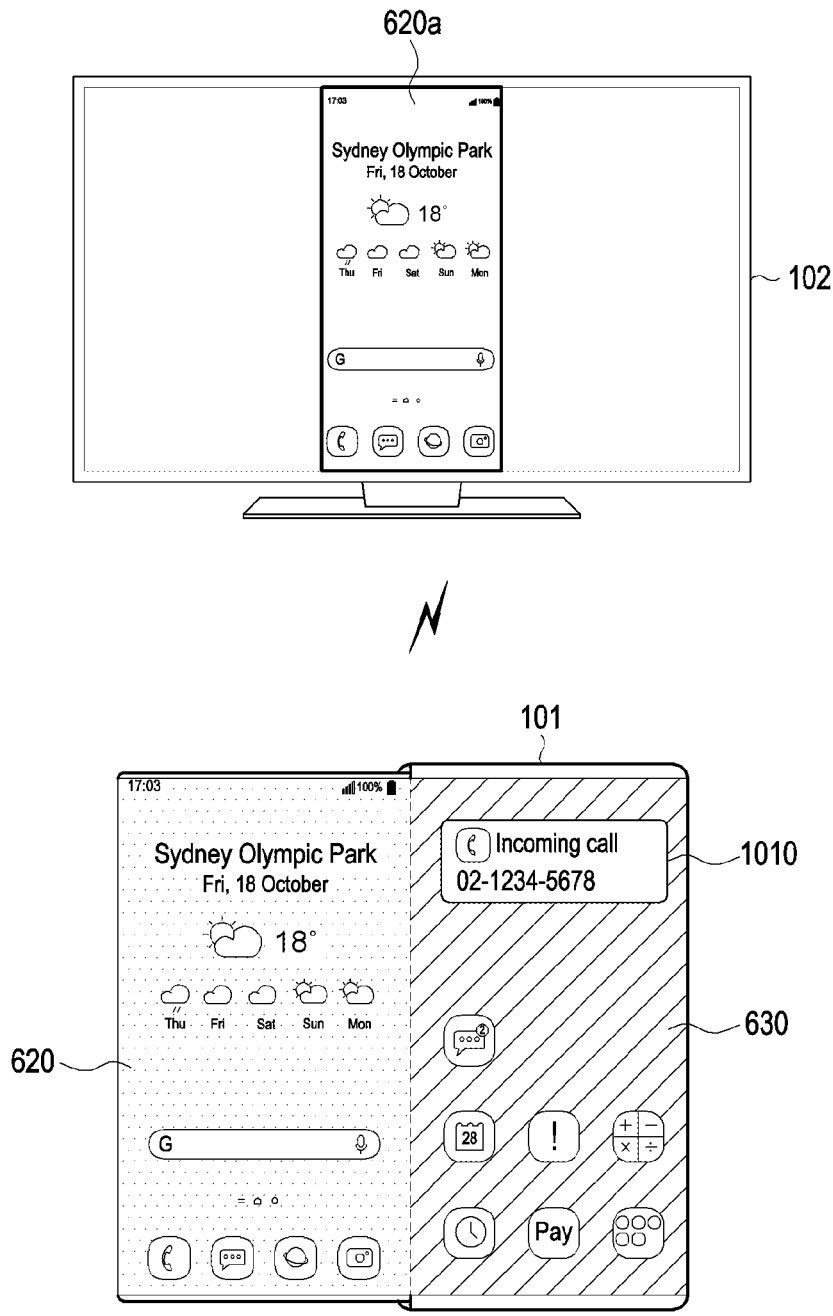

FIGS. 10A, 10B, and 10C include a flowchart and example views illustrating an example function or operation of outputting, through an electronic device, a message indicating that a notification event occurs, when the notification event occurs in a state in which both a first screen and a third screen are displayed on the electronic device in a first mode according to various embodiments.

Referring to FIG. 10A, according to an embodiment of the disclosure, in operation 1005, the electronic device 101 may display a first screen 620 on the electronic device 101 in a state in which the electronic device 101 and an external electronic device 102 are operably connected with each other. According to an embodiment of the disclosure, the electronic device 101 may display the first screen 620 on the electronic device and a second screen 620a corresponding to the first screen 620 on the external electronic device, as shown in FIG. 6F.

According to an embodiment of the disclosure, in operation 1015, the electronic device 101 may detect a sliding event. For example, as shown in FIG. 6G, the electronic device 101 may detect an event of sliding the display to the left.

According to an embodiment of the disclosure, in operation 1025, the electronic device 101 may display the first screen 620 and the third screen 630 on the extended flexible display.

According to an embodiment of the disclosure, in operation 1035, the electronic device 101 may determine whether a notification event (e.g., reception of text message or incoming call) occurs.

According to an embodiment of the disclosure, in operation 1045, the electronic device 101 may display a message 1010 indicating the notification event on the third screen 630 as shown in FIG. 10B. According to an embodiment of the disclosure, the message 1010 indicating the notification event may not be displayed on the external electronic device 102. This may be attributed to the icon corresponding to the message application being positioned on the third screen 630. For example, if the icon corresponding to the text message application is positioned on the first screen 620, the message 1010 indicating the notification event may be displayed on the external electronic device 102. According to an embodiment of the disclosure, in the case of an incoming call as shown in FIG. 10C, although the icon corresponding to the call application is positioned on the first screen 620, the message indicating the notification event (e.g., incoming call) may be displayed on the third screen 630. However, according to an embodiment of the disclosure, when the icon corresponding to the call application is positioned on the first screen 620, the message indicating the notification event (e.g., incoming call) may be displayed on the first screen 620 and the second screen 620a.

Figure 11A:
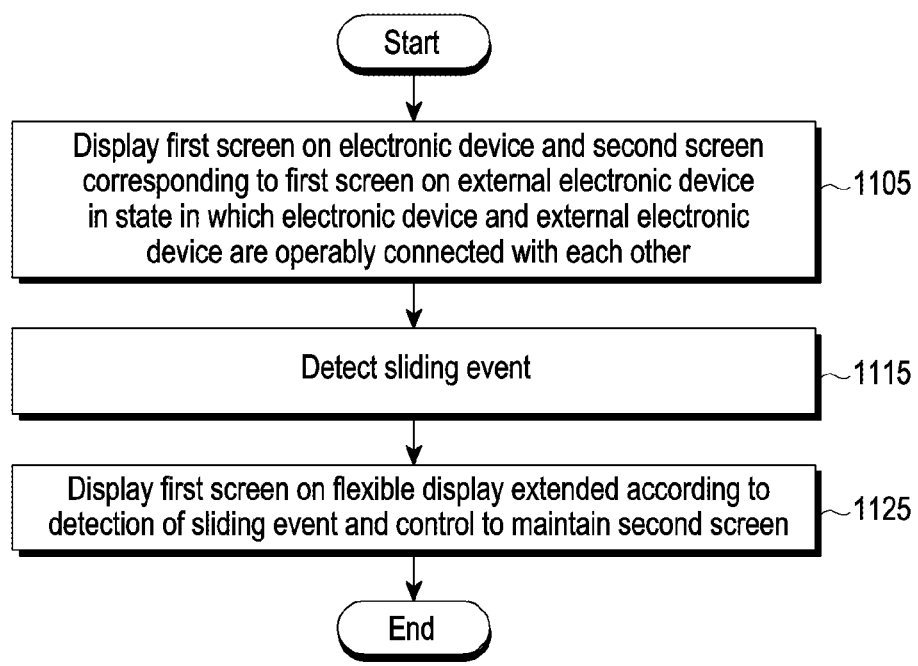
FIGS. 11A, 11B, and 11C include a flowchart and example views illustrating a screen displayed on an electronic device and an external electronic device when a sliding event is detected in a second mode according to various embodiments.
Figure 11B:
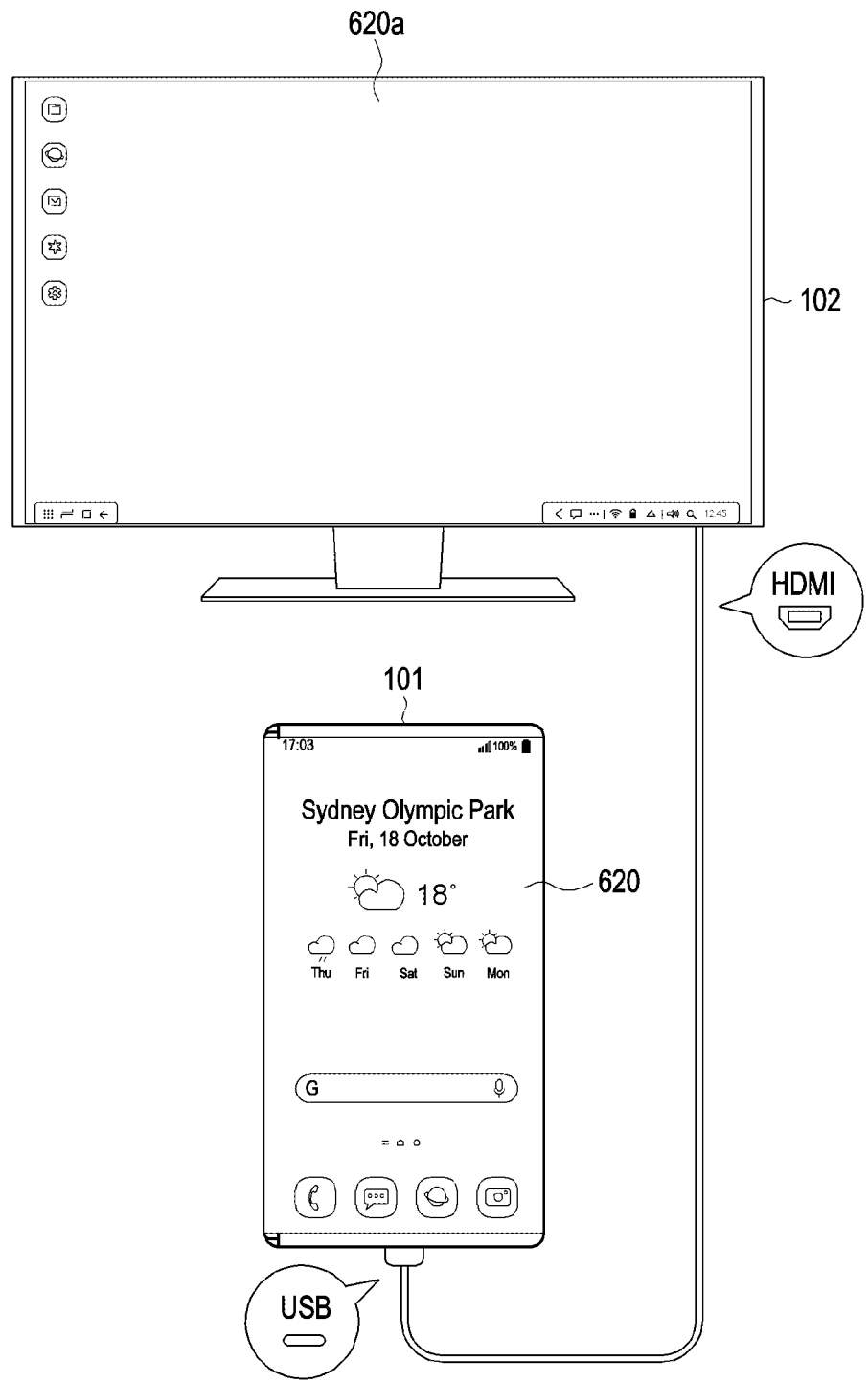
Figure 11C:
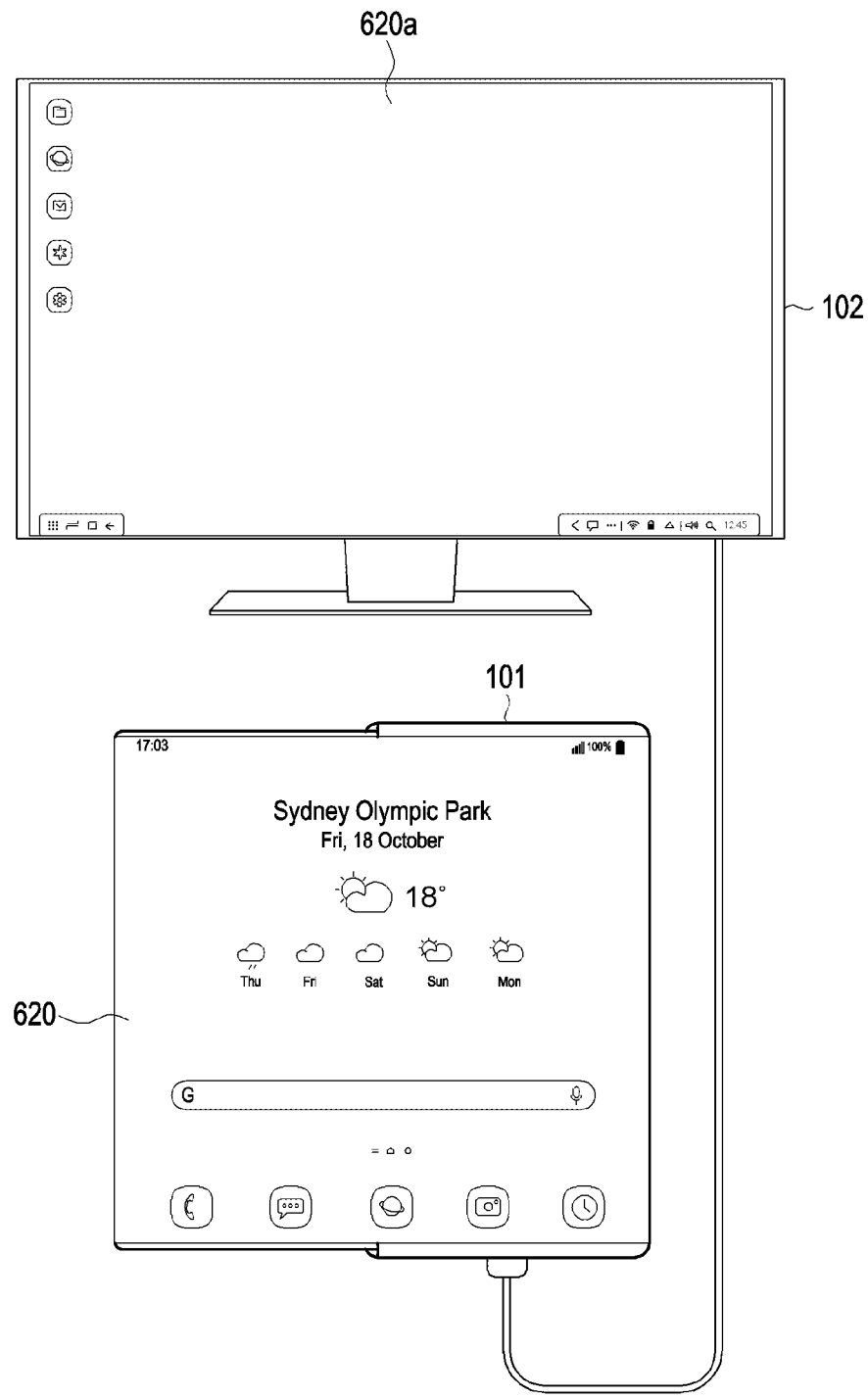

FIGS. 11A, 11B, and 11C include a flowchart and example views illustrating a screen displayed on an electronic device and an external electronic device when a sliding event is detected in a second mode (e.g., a mode in which a screen obtained by changing the attribute of the screen displayed on the smartphone is displayed through another display device) according to various embodiments.

Referring to FIG. 11A, according to an embodiment of the disclosure, in operation 1105, the electronic device 101 may display a first screen 620 on the electronic device 101 in a state in which the electronic device 101 and an external electronic device 102 are operably connected with each other. According to an embodiment of the disclosure, as shown in FIG. 11B, the electronic device 101 and the external electronic device 102 may be wiredly connected to each other through a connector (e.g., USB connector and HDMI connector). However, this is merely and example, and the electronic device 101 and the external electronic device 102 may be connected through wireless communication.

According to an embodiment of the disclosure, in operation 1105, the electronic device 101 may display a second screen 620a corresponding to the first screen 620 on the external electronic device 102. According to various embodiments of the disclosure, the screens displayed on the electronic device 101 and the external electronic device 102 may have different display attributes. According to various embodiments of the disclosure, the display attribute may include at least one of resolution, number of screens, direction of screen, position of displayed obtain on screen, brightness of screen, color of object, shape of object, contrast, or screen size. For example, the electronic device 101 may display with a relatively lower resolution (e.g., 1920×1080) than that of the external electronic device 102, and the external electronic device 102 may display according to a relatively higher resolution (e.g., 3840×2160) than that of the electronic device 101. According to various embodiments of the disclosure, information about the external electronic device 102 connectable with the electronic device 101 may be stored in the memory (e.g., the memory 130 of FIG. 1) of the electronic device 101. According to various embodiments of the disclosure, the electronic device 101 may display a screen having at least one different display attribute from that of the screen displayed on the electronic device 101 on the external electronic device 102 based on the information about the external electronic device 102, stored in the memory 130. According to various embodiments of the disclosure, the memory (e.g., the memory 130 of FIG. 1) of the electronic device 101 may store information about various interfaces defined according to the display attributes. The electronic device 101 may display a screen adapted to the external electronic device 102 on the external electronic device 102 based on the display attribute information obtained according to various embodiments of the disclosure and the information about various user interfaces stored in the memory (e.g., the memory 130 of FIG. 1). According to an embodiment of the disclosure, an icon corresponding to an application installed on the electronic device 101 may be displayed on the second screen 620a or at least one icon alone included in the first screen 620 may be displayed thereon.

According to an embodiment of the disclosure, in operation 1115, the electronic device 101 may detect a sliding event. For example, as shown in FIG. 6G, the electronic device 101 may detect an event of sliding the display to the left.

According to an embodiment of the disclosure, in operation 1125, the electronic device 101 may control to display the extended first screen 620 on the flexible display extended according to detection of a sliding event while maintaining the second screen 620a. Referring to FIG. 11C, according to an embodiment of the disclosure, the electronic device 101 may maintain the display state of the second screen 620a to be the same as that before the flexible display is extended although the flexible display is extended according to detection of the sliding event.

Figure 12A:
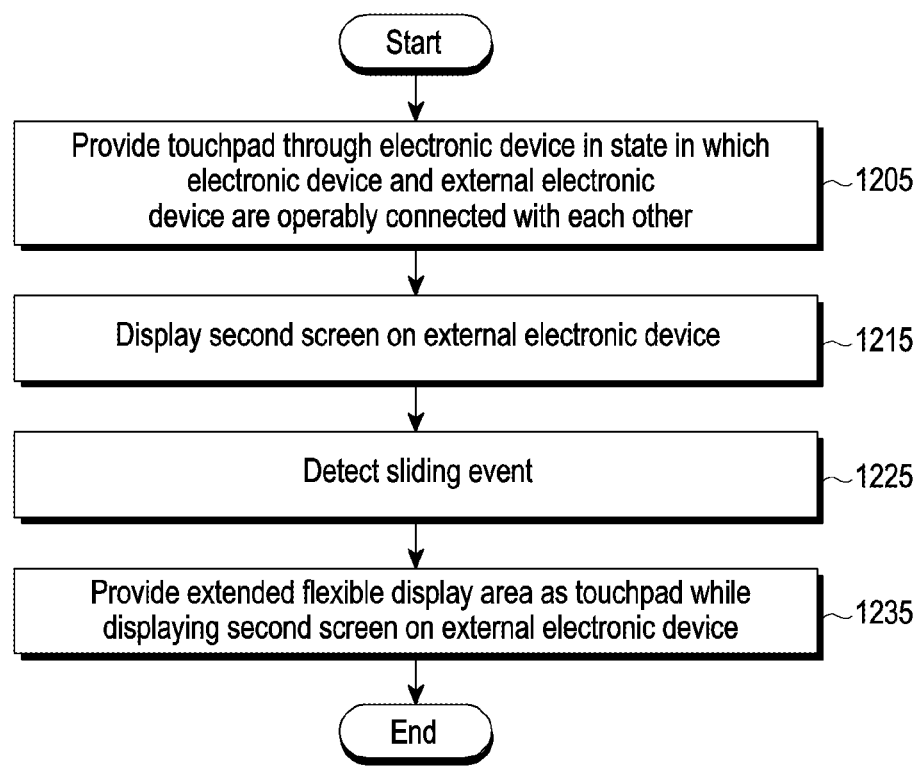
FIGS. 12A, 12B, and 12C include a flowchart and example views illustrating an example function or operation of providing a touchpad area through an electronic device when a sliding event is detected in a second mode according to various embodiments.
Figure 12B:
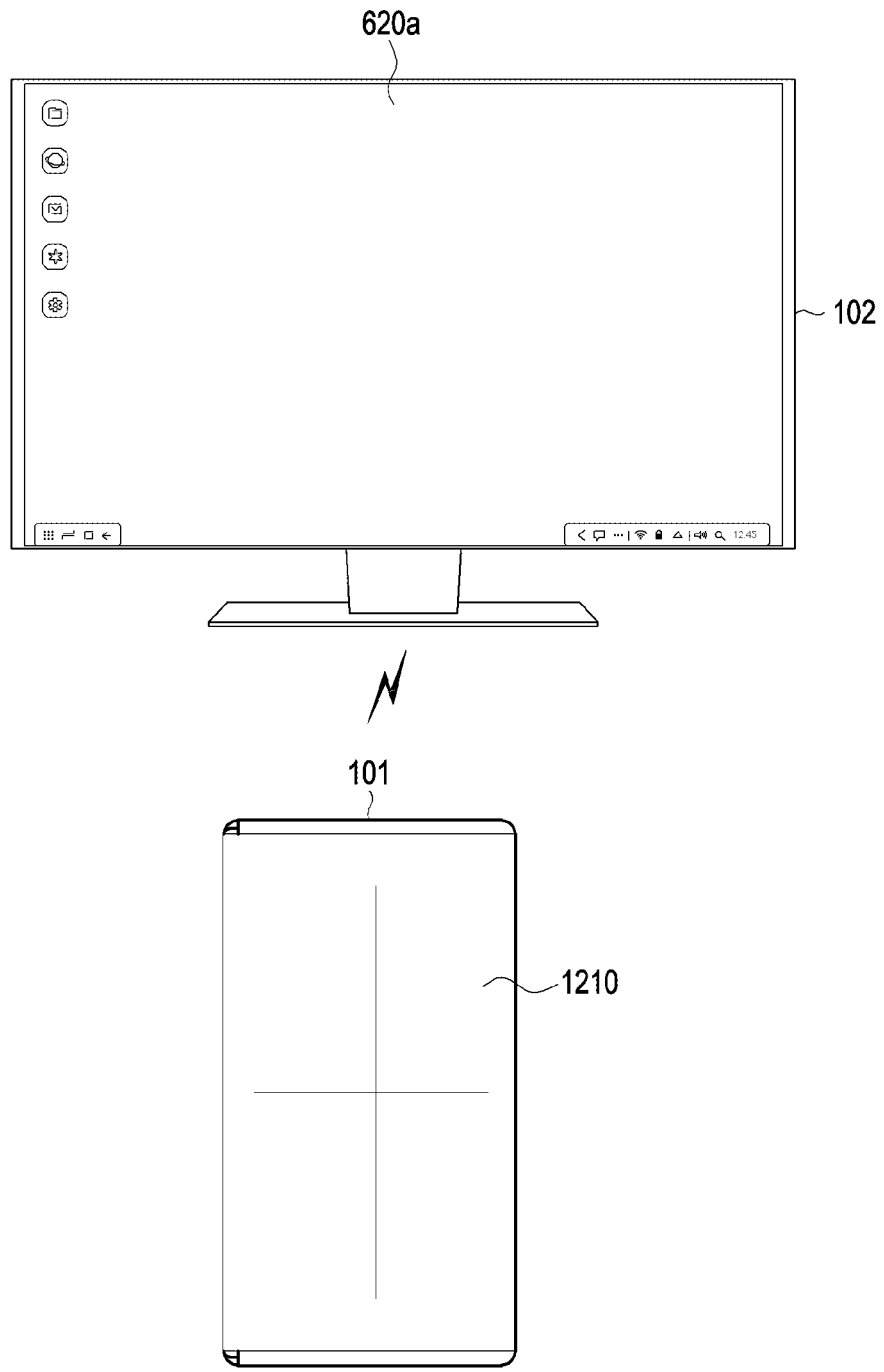
Figure 12C:
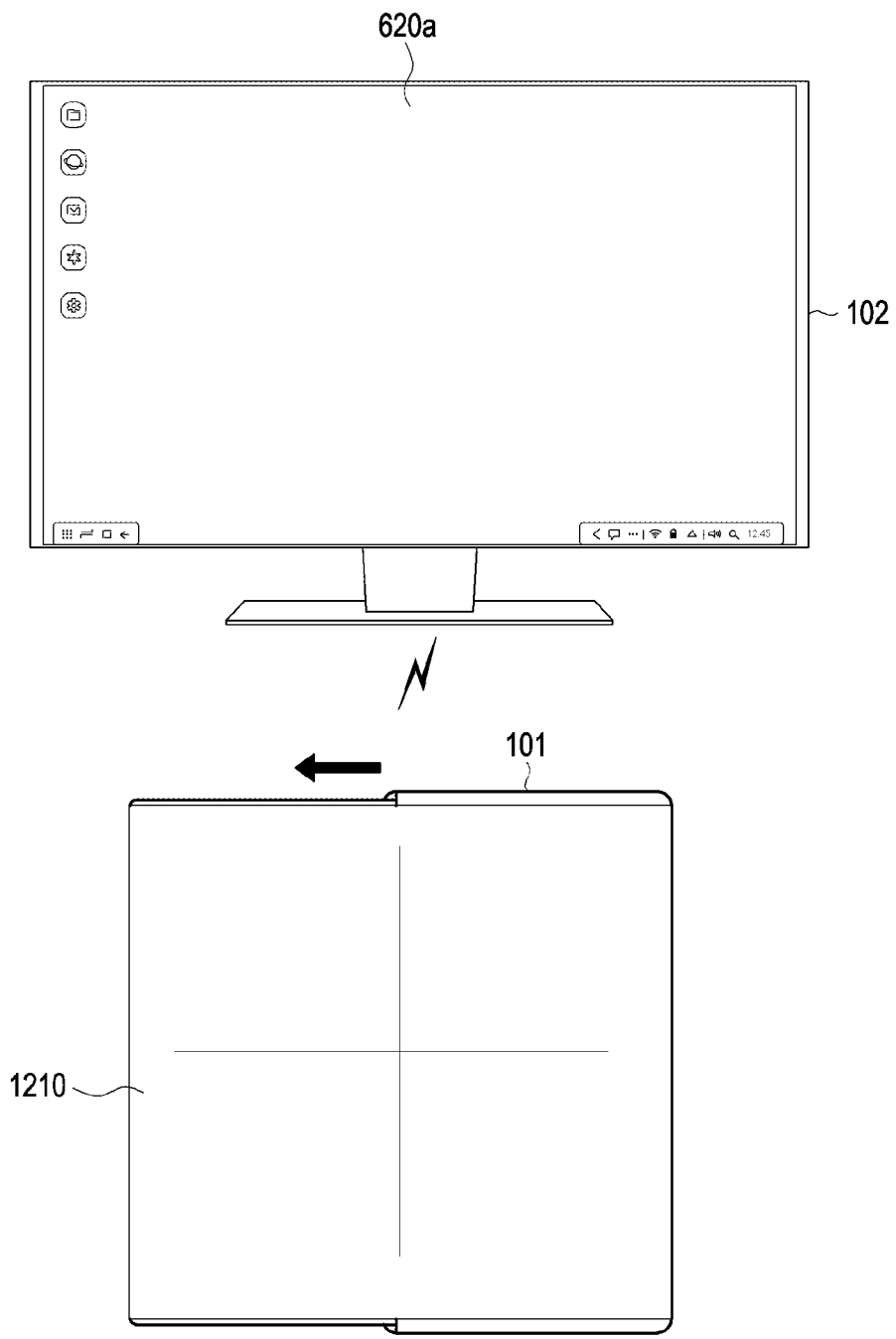

FIGS. 12A, 12B, and 12C include a flowchart and example views illustrating an example function or operation of providing a touchpad area through an electronic device when a sliding event is detected in a second mode (e.g., a mode in which a screen obtained by changing the attribute of the screen displayed on the smartphone is displayed through another display device) according to various embodiments.

Referring to FIG. 12A, according to an embodiment of the disclosure, in operation 1205, the electronic device 101 may provide a fourth screen 1210 (e.g., including a touchpad) through the electronic device 101 in a state in which the electronic device 101 and the external electronic device 102 are operably connected to each other. As shown in FIG. 12B, it is possible to allow the user to control the cursor displayed on the second screen 620a through a user input on the fourth screen by providing the fourth screen 1210 to the user.

According to an embodiment of the disclosure, in operation 1215, the electronic device 101 may display the second screen 620a on the external electronic device 102. According to an embodiment of the disclosure, the electronic device 101 may display the second screen 620a on the external electronic device 102 while providing the fourth screen 1210 through the electronic device 101.

According to an embodiment of the disclosure, in operation 1225, the electronic device 101 may detect a sliding event. For example, as shown in FIG. 6G, the electronic device 101 may detect an event of sliding the display to the left.

According to an embodiment of the disclosure, in operation 1235, the electronic device 101 may provide the extended flexible display area, as the fourth screen 1210, while displaying the second screen 620a on the external electronic device 102 as shown in FIG. 12C. According to an embodiment of the disclosure, the electronic device 101 may maintain the display state of the second screen 620a to be the same as that before the flexible display is extended although the flexible display is extended according to detection of the sliding event.

FIGS. 13A, 13B, 13C, and 13D include a flowchart and example views illustrating a screen displayed on an external electronic device when both a first screen and a third screen are set to be displayed on an electronic device in a second mode according to various embodiments.

Figure 13A:
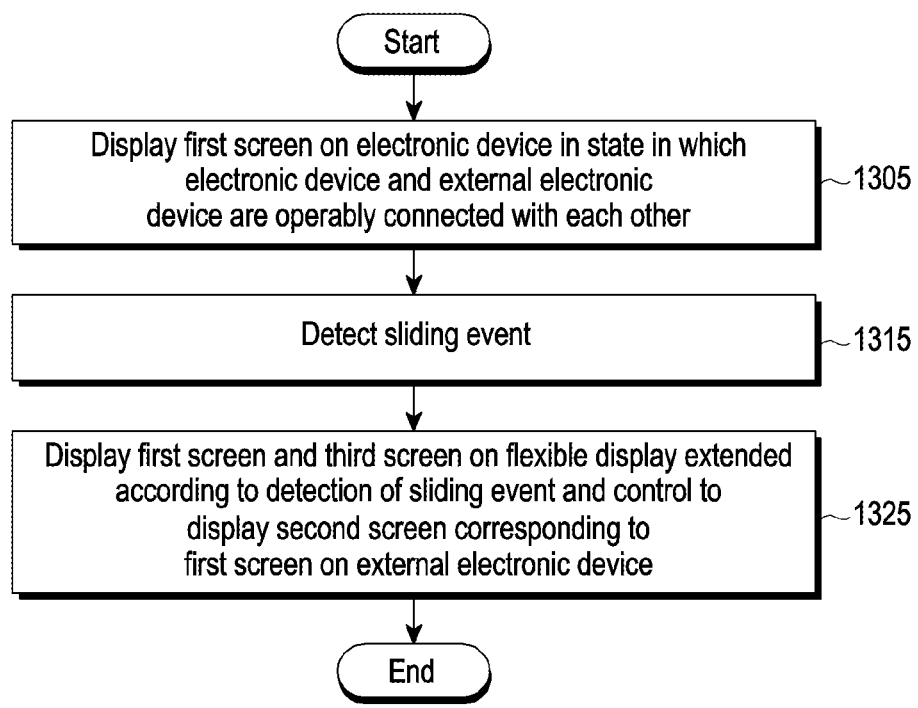
FIGS. 13A, 13B, 13C, and 13D include a flowchart and example views illustrating a screen displayed on an external electronic device when both a first screen and a third screen are set to be displayed on an electronic device in a second mode according to various embodiments.

Referring to FIG. 13A, according to an embodiment of the disclosure, in operation 1305, the electronic device 101 may display a first screen 620 on the electronic device 101 in a state in which the electronic device 101 and an external electronic device 102 are operably connected with each other. According to an embodiment of the disclosure, the electronic device 101 may display the first screen 620 on the electronic device and a second screen 620a corresponding to the first screen 620 on the external electronic device, as shown in FIG. 6F. The setting state of the reference line 710 in FIGS. 13A to 13D may be a first setting state.

According to an embodiment of the disclosure, in operation 1315, the electronic device 101 may detect a sliding event. For example, as shown in FIG. 6G, the electronic device 101 may detect an event of sliding the display to the left.

Figure 13B:
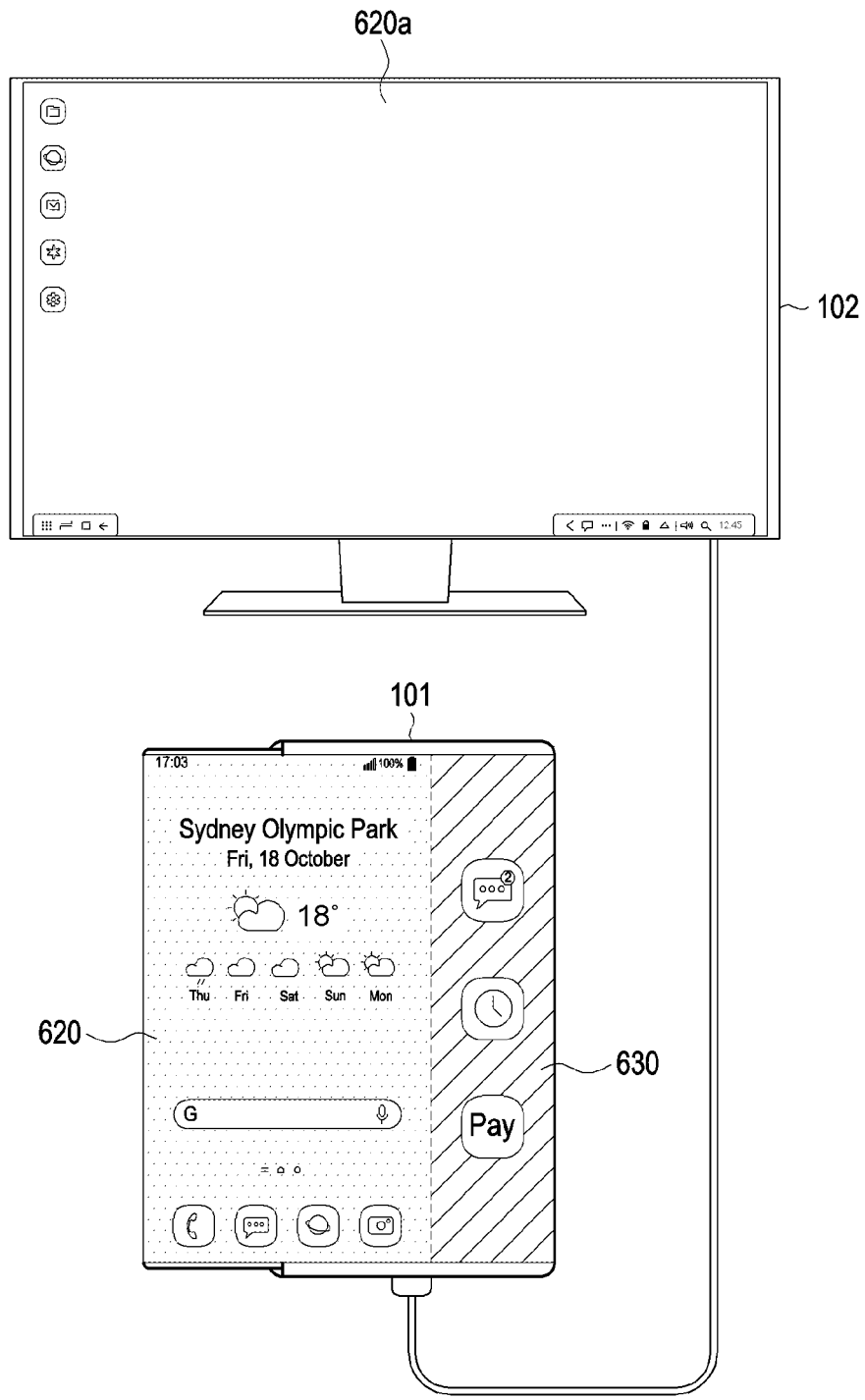
Figure 13C:
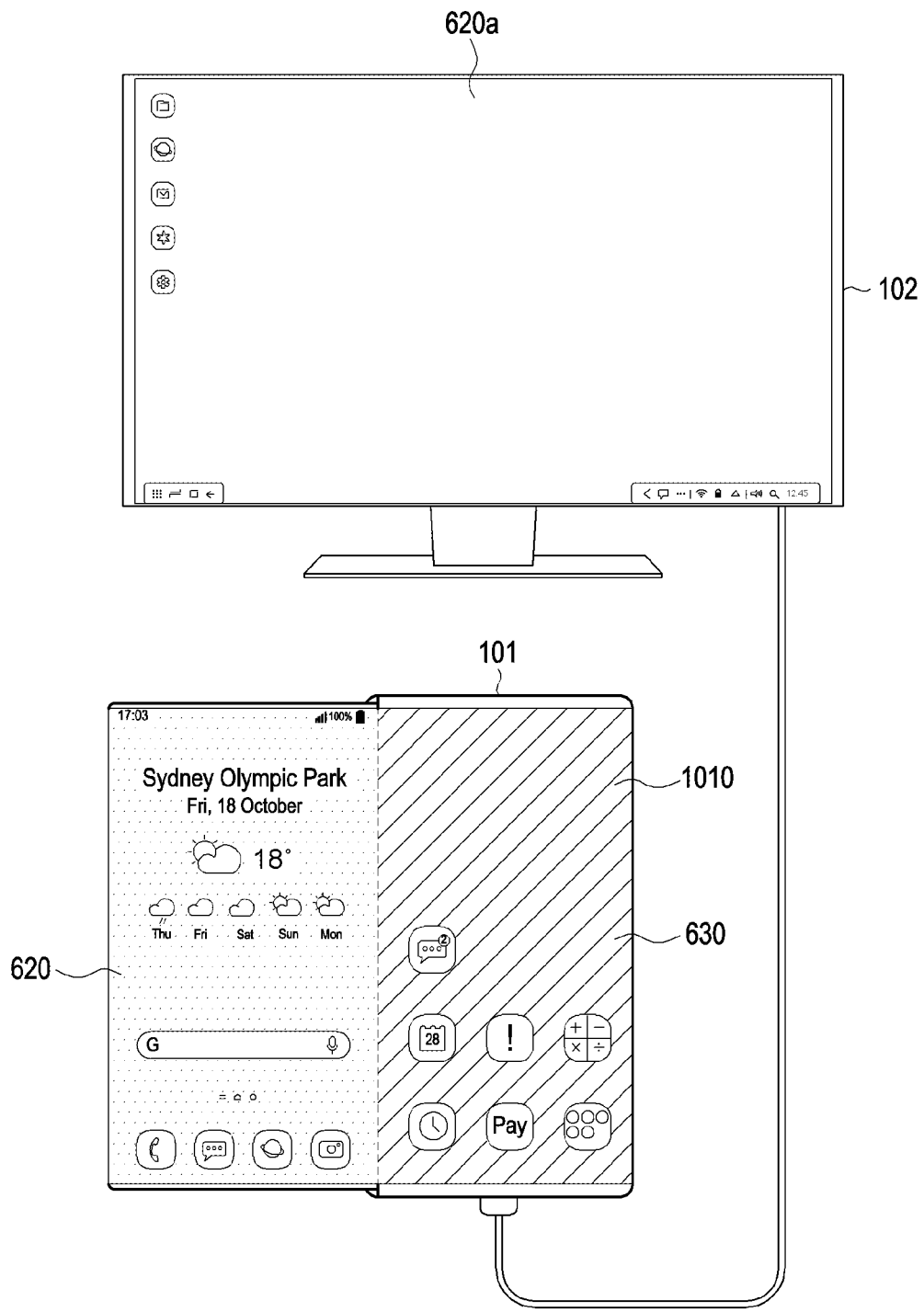
Figure 13D:
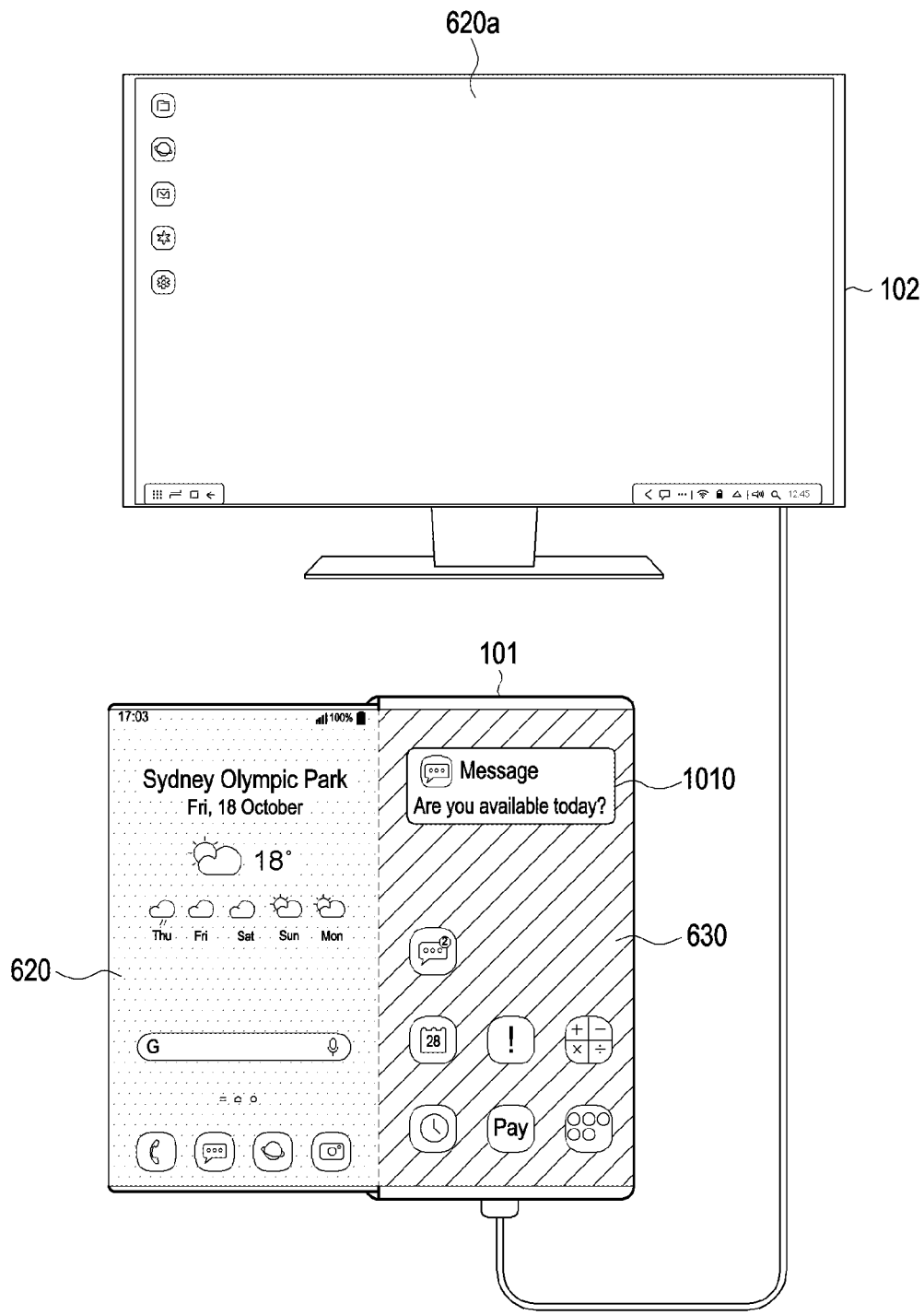

According to an embodiment of the disclosure, in operation 1325, the electronic device 101 may display the first screen 620 and the third screen 630 on the flexible display extended according to detection of the sliding event and control to display the second screen 620a corresponding to the first screen 620 on the external electronic device 102. Referring to FIGS. 13B and 13C, according to an embodiment of the disclosure, the electronic device 101 may display the first screen 620 and the third screen 630 on the display area extended according to the sliding event. In this case, the second screen 620a obtained by changing the attributes of the first screen 620 may be displayed on the external electronic device 102. According to an embodiment of the disclosure, when a notification event occurs in the extended state of the flexible display, a message 1010 indicating that the notification event occurs may be displayed on the third screen 630. In this case, the message 1010 indicating that the notification event occurs may not be displayed on the second screen 620a.

Figure 14A:
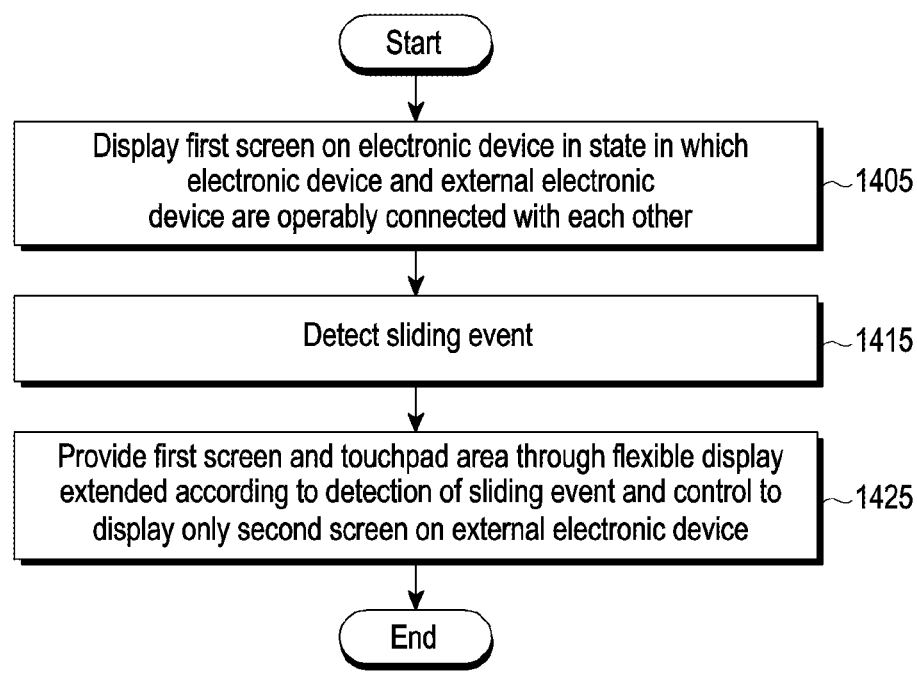
FIGS. 14A, 14B, and 14C include a flowchart and example views illustrating a screen displayed on an external electronic device when a first screen and a touchpad area are set to be provided through an electronic device according to various embodiments.
Figure 14B:
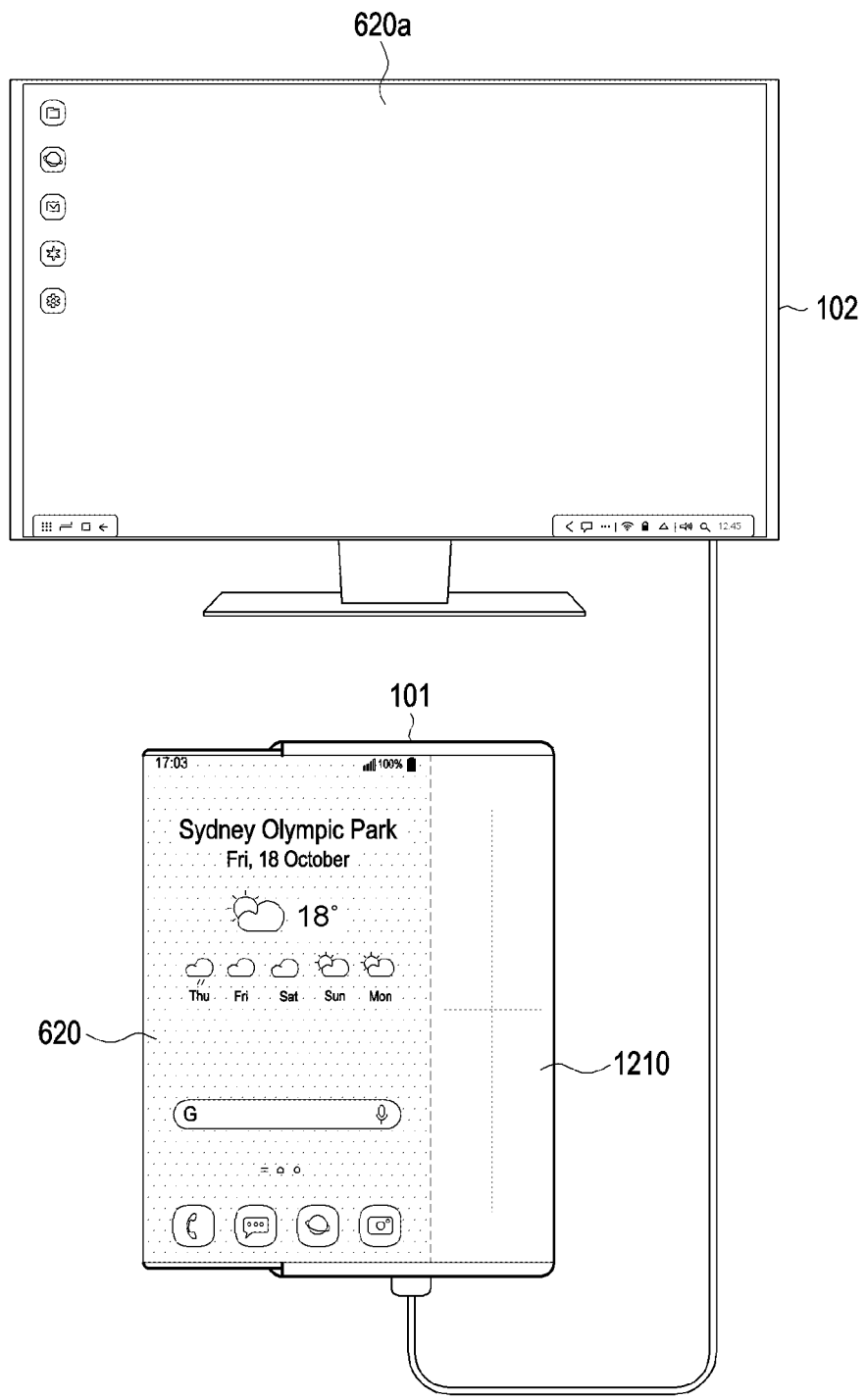
Figure 14C:
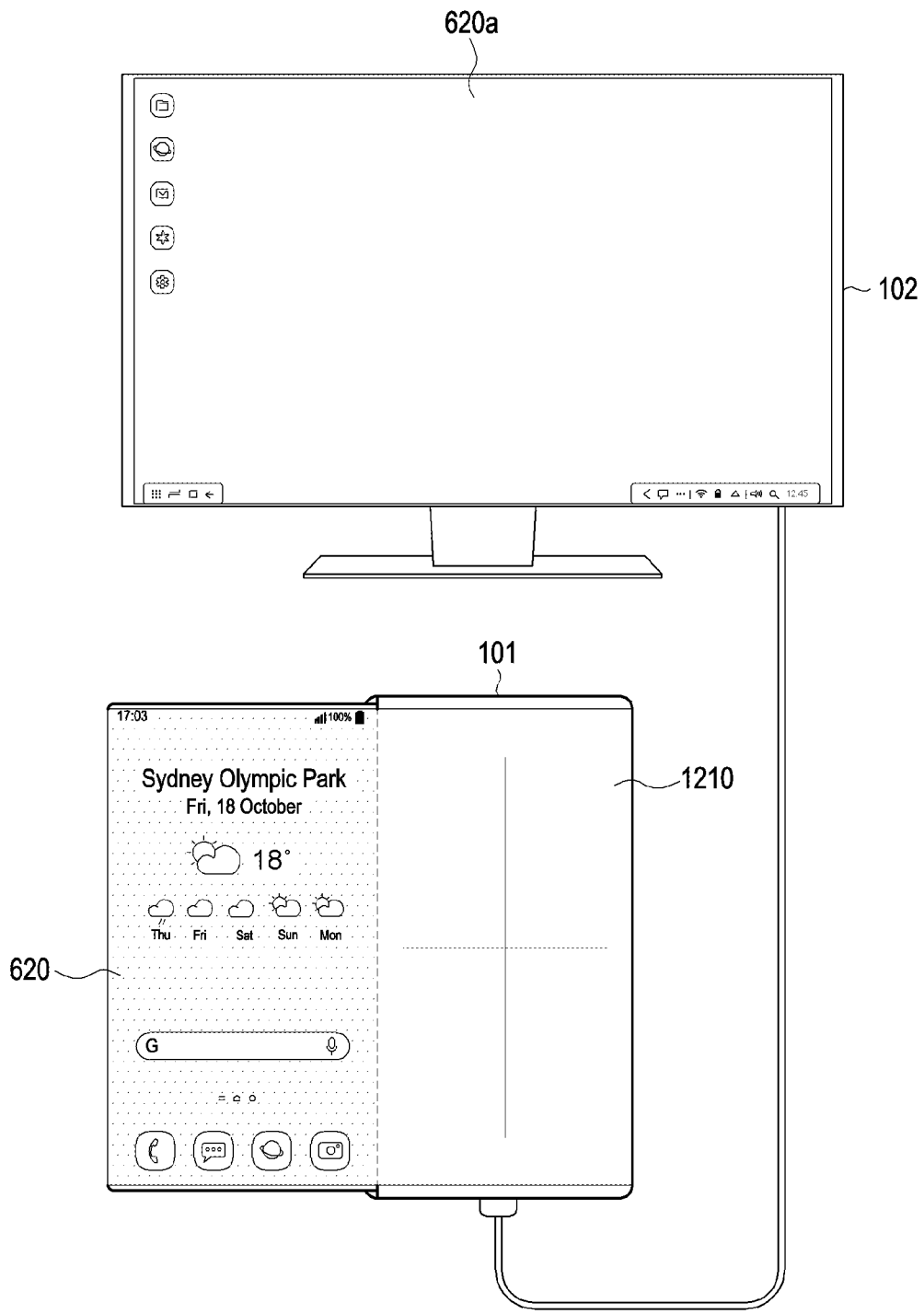

FIGS. 14A, 14B, and 14C include a flowchart and example views illustrating a screen displayed on an external electronic device when a first screen and a touchpad area are set to be provided through an electronic device according to various embodiments.

Referring to FIG. 14A, according to an embodiment of the disclosure, in operation 1405, the electronic device 101 may display a first screen 620 on the electronic device 101 in a state in which the electronic device 101 and an external electronic device 102 are operably connected with each other.

According to an embodiment of the disclosure, in operation 1415, the electronic device 101 may detect a sliding event. For example, as shown in FIG. 6G, the electronic device 101 may detect an event of sliding the display to the left.

According to an embodiment of the disclosure, in operation 1425, the electronic device 101 may provide the first screen 620 and the fourth screen 1210 (e.g., including a touchpad area) through the flexible display extended according to the sliding event and control to display only the second screen 620a on the external electronic device 102 as shown in FIGS. 14B and 14C. In this case, the reference line 710 may be in a state of having been set according to the first setting state. According to an embodiment of the disclosure, when the first screen 620 and the fourth screen 1210 are provided through the electronic device 101, if a notification event occurs, a message 1210 indicating that the notification event occurs may be displayed on the second screen 620a. Or, an occurrence of a notification event may be indicated in a different manner (e.g., flicker of the corresponding application icon). According to an embodiment of the disclosure, a user menu to turn off the notification on the second screen 620a may be provided. The user menu may provide the user with such an effect as if the sub launcher (e.g., the third screen 630) is executed although not needed.

FIGS. 15A, 15B, 15C, 15D, and 15E include a flowchart and example views illustrating a screen displayed on an external electronic device when a first screen, a third screen, and a fourth screen (e.g., a touchpad area) are set to be provided through an electronic device according to various embodiments. According to an embodiment of the disclosure, the fourth screen 1210 may include, e.g., a screen having a black background. According to an embodiment of the disclosure, the electronic device 101 may allow the user to control at least one graphic object (e.g., cursor) displayed on the external electronic device 102 through an input (e.g., input through a stylus pen) on the fourth screen 1210 by providing the fourth screen 1210.

Figure 15A:
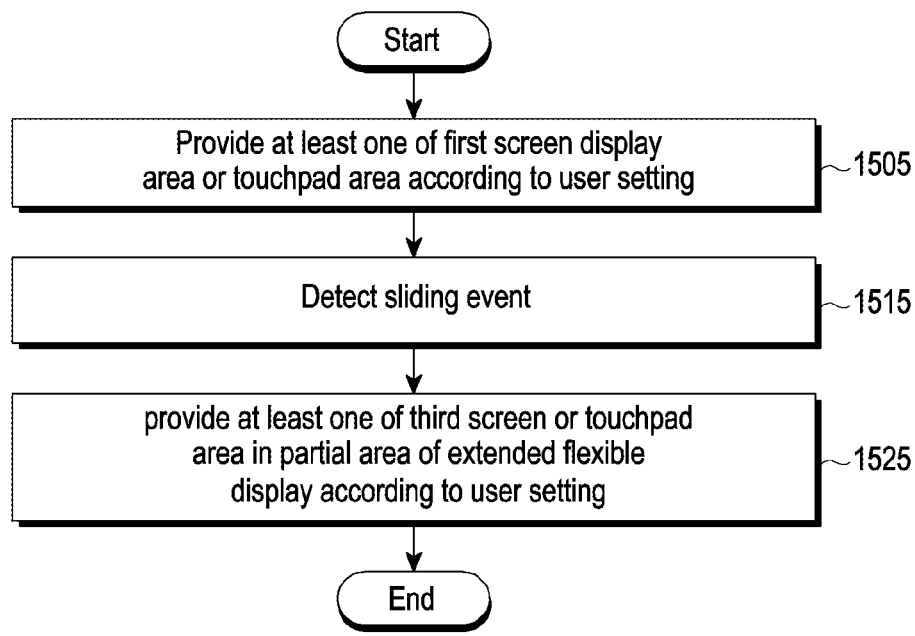
FIGS. 15A, 15B, 15C, 15D, and 15E include a flowchart and example views illustrating a screen displayed on an external electronic device when a first screen, a third screen, and a touchpad area are set to be provided through an electronic device according to various embodiments.
Figure 15B:
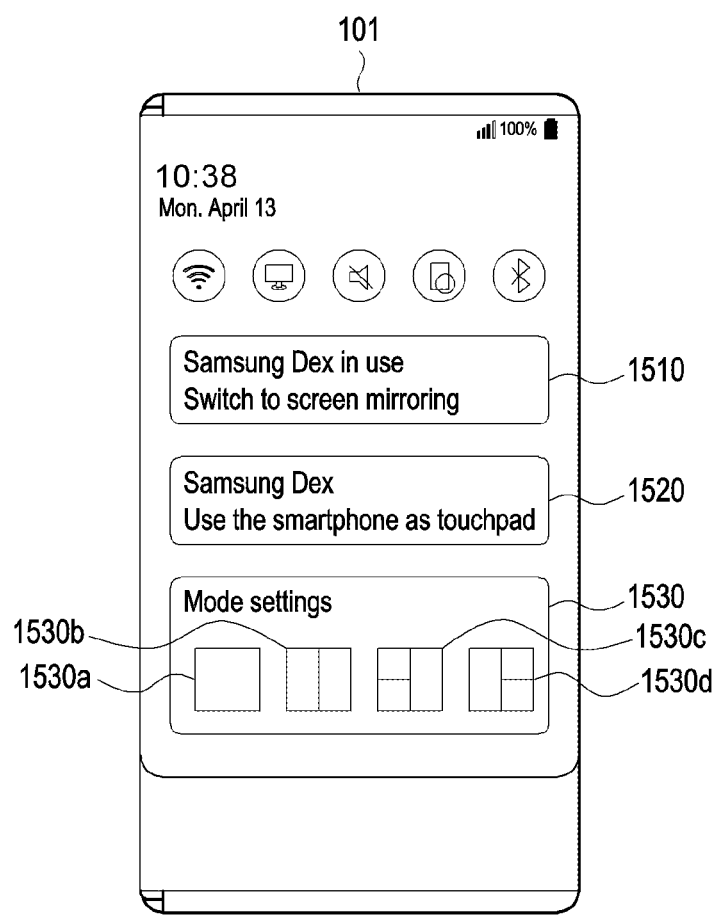
Figure 15C:
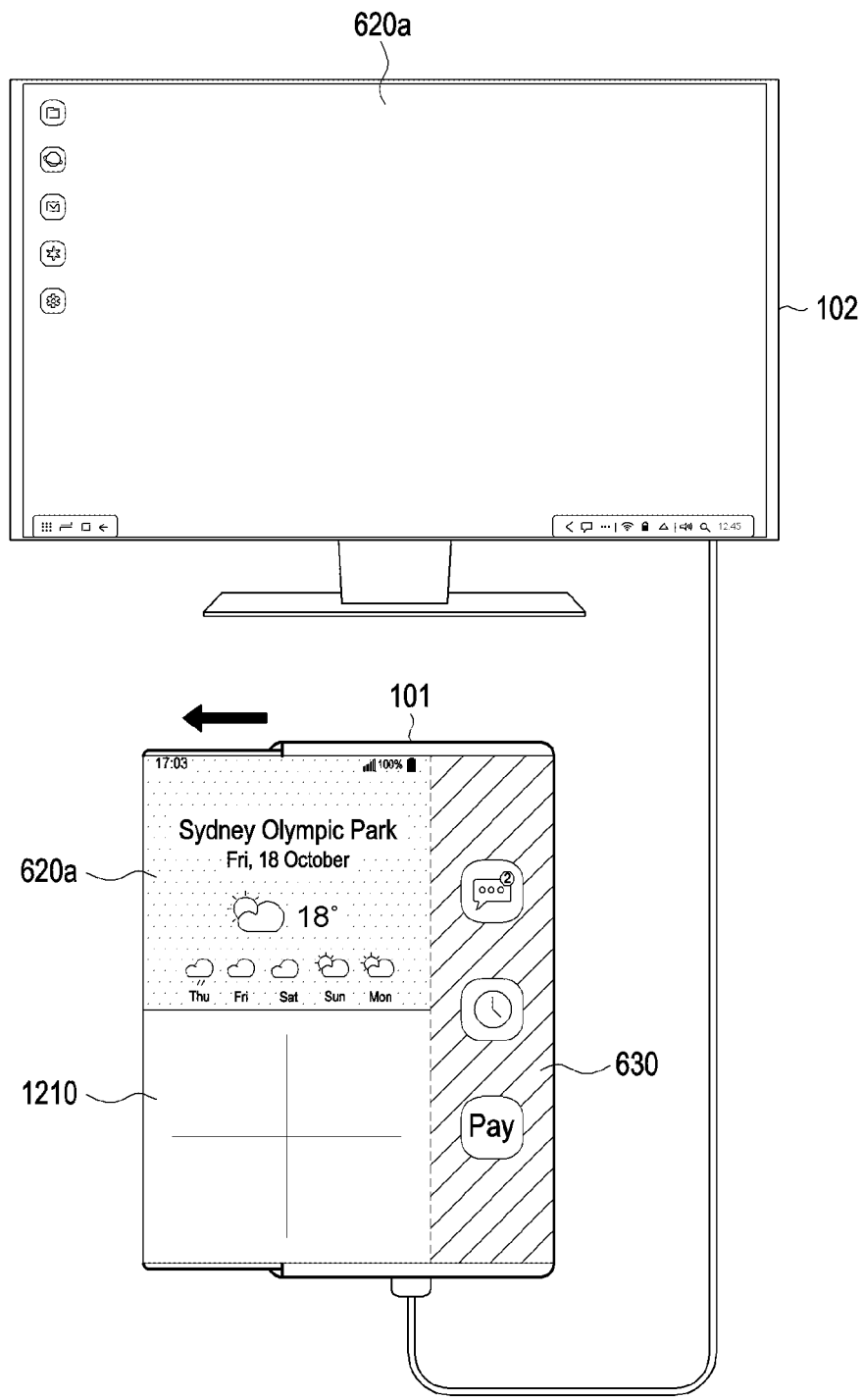

Referring to FIG. 15A, according to an embodiment of the disclosure, in operation 1505, the electronic device 101 may provide at least one of the first screen 620 or the fourth screen 1210 according to a user setting. Referring to FIG. 15B, a menu 1530 for receiving a selection input for the display mode may be displayed in the quick panel area. According to an embodiment of the disclosure, the quick panel area may further include a menu 1510 for switching from the first mode to the second mode (or switching from the second mode to the first mode) and a menu 1520 for using the electronic device 101 as a touchpad. According to various embodiments of the disclosure, the menu 1530 for receiving a selection input for the display mode may include a first icon 1530a for displaying the first screen 620 alone on the electronic device, a second icon 1530b for displaying the first screen 620 and the third screen 630 (or providing the first screen 620 and the fourth screen 1210), and a third icon 1530c and a fourth icon 1530d for providing all of the first screen 620, the fourth screen 1210, and the third screen 630. A display mode may be determined according to the user's selection input on at least one icon among the icons 1530a, 1530b, 1530c, and 1530d. FIG. 15C illustrates an embodiment of displaying the first screen 620, the fourth screen 1210, and the third screen 630 on the electronic device 101 under the assumption that the third icon 1530c is selected by the user.

According to an embodiment of the disclosure, in operation 1515, the electronic device 101 may detect a sliding event. For example, as shown in FIG. 6G, the electronic device 101 may detect an event of sliding the display to the left.

Figure 15D:
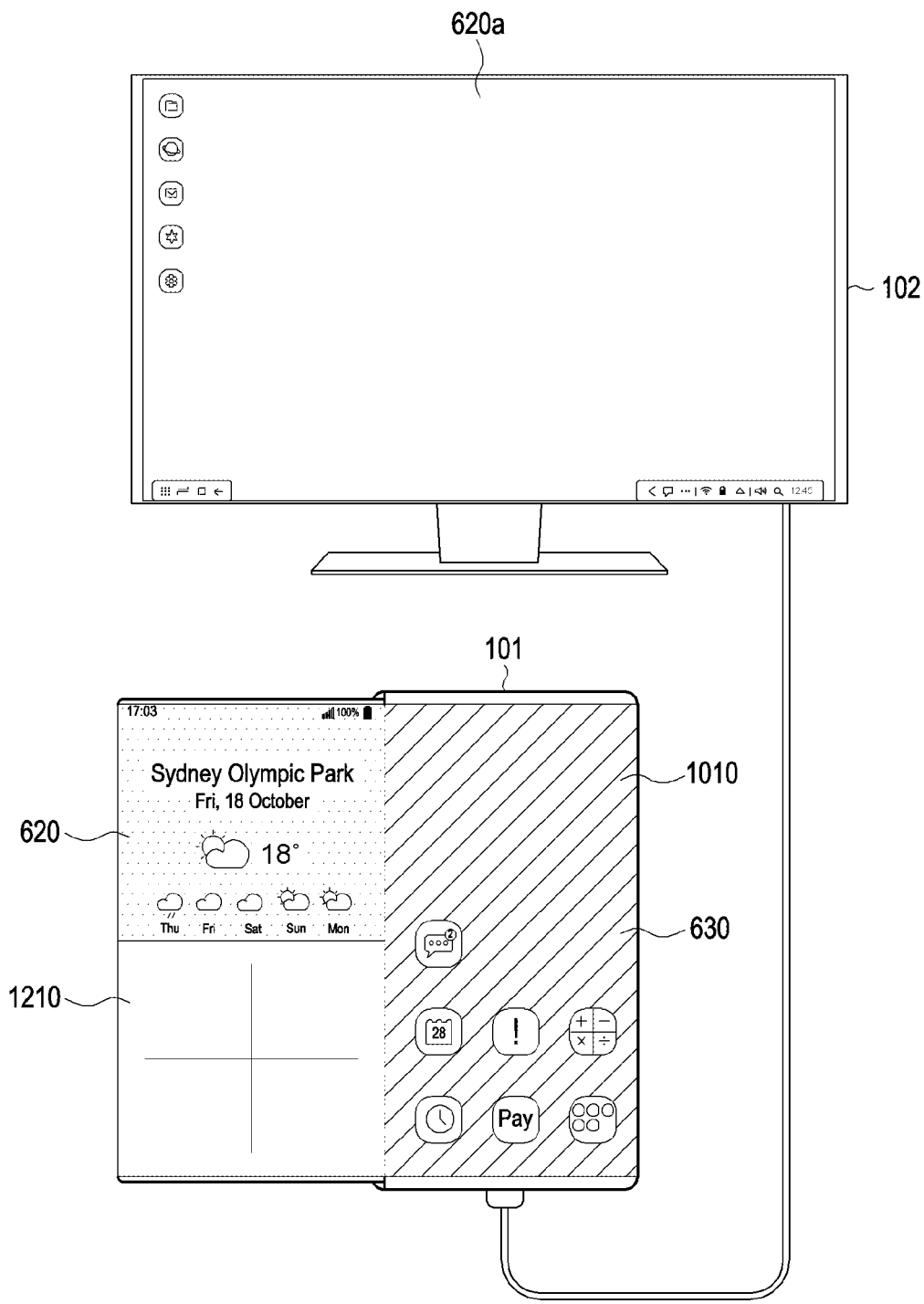
Figure 15E:
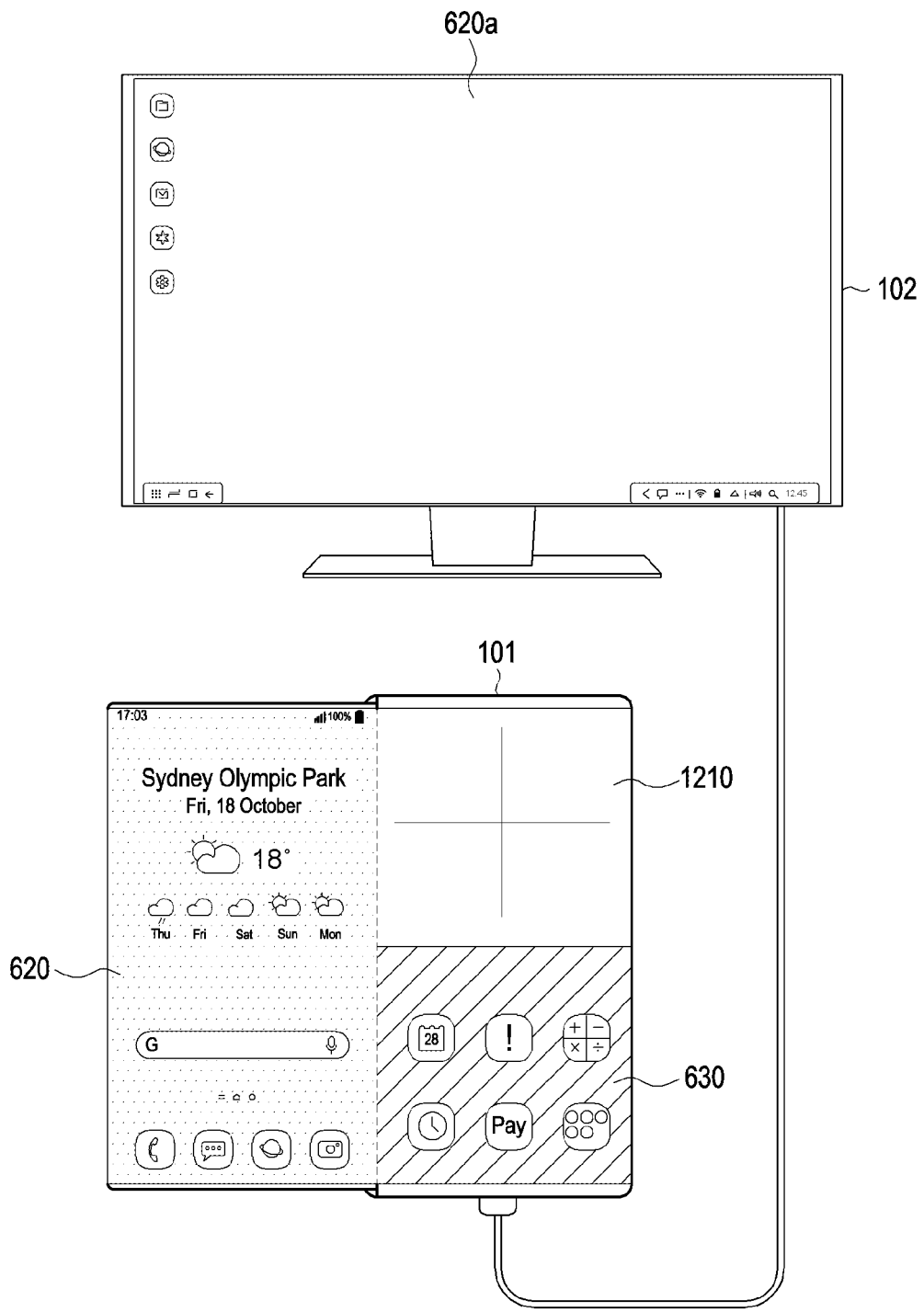

According to an embodiment of the disclosure, in operation 1525, the electronic device 101 may provide at least one of the third screen 630 or the fourth screen 1210 (e.g., including a touchpad) in a partial area of the extended flexible display according to the user setting. For example, as shown in FIGS. 15C and 15D, the third screen 630 may be displayed in an area on one side (e.g., right side) of the virtual reference line 710, and the first screen 620 and fourth screen 1210 may be provided in an area on the other side (e.g., left side) of the virtual reference line 710 according to the user's setting. Alternatively, according to the user's setting (e.g., when the fourth icon 1530d is selected by the user), as shown in FIG. 15E, the first screen 620 may be displayed in the area on one side (e.g., left side) of the virtual reference line 710, and the fourth screen 1210 and the third screen 630 may be provided in the area on the other side (e.g., right side) of the virtual reference line 710.

Figure 16A:
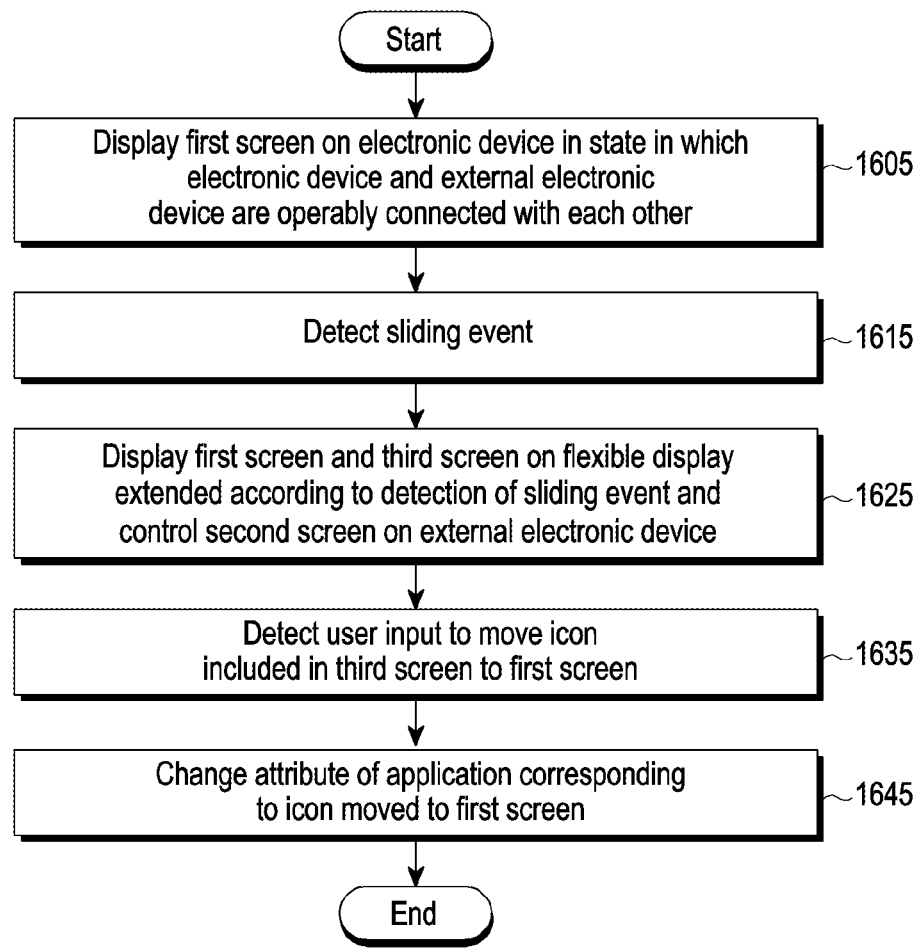
FIGS. 16A, 16B, and 16C include a flowchart and example views illustrating an example function or operation of changing an attribute of an application corresponding to an icon according to movement of the icon according to various embodiments.
Figure 16B:
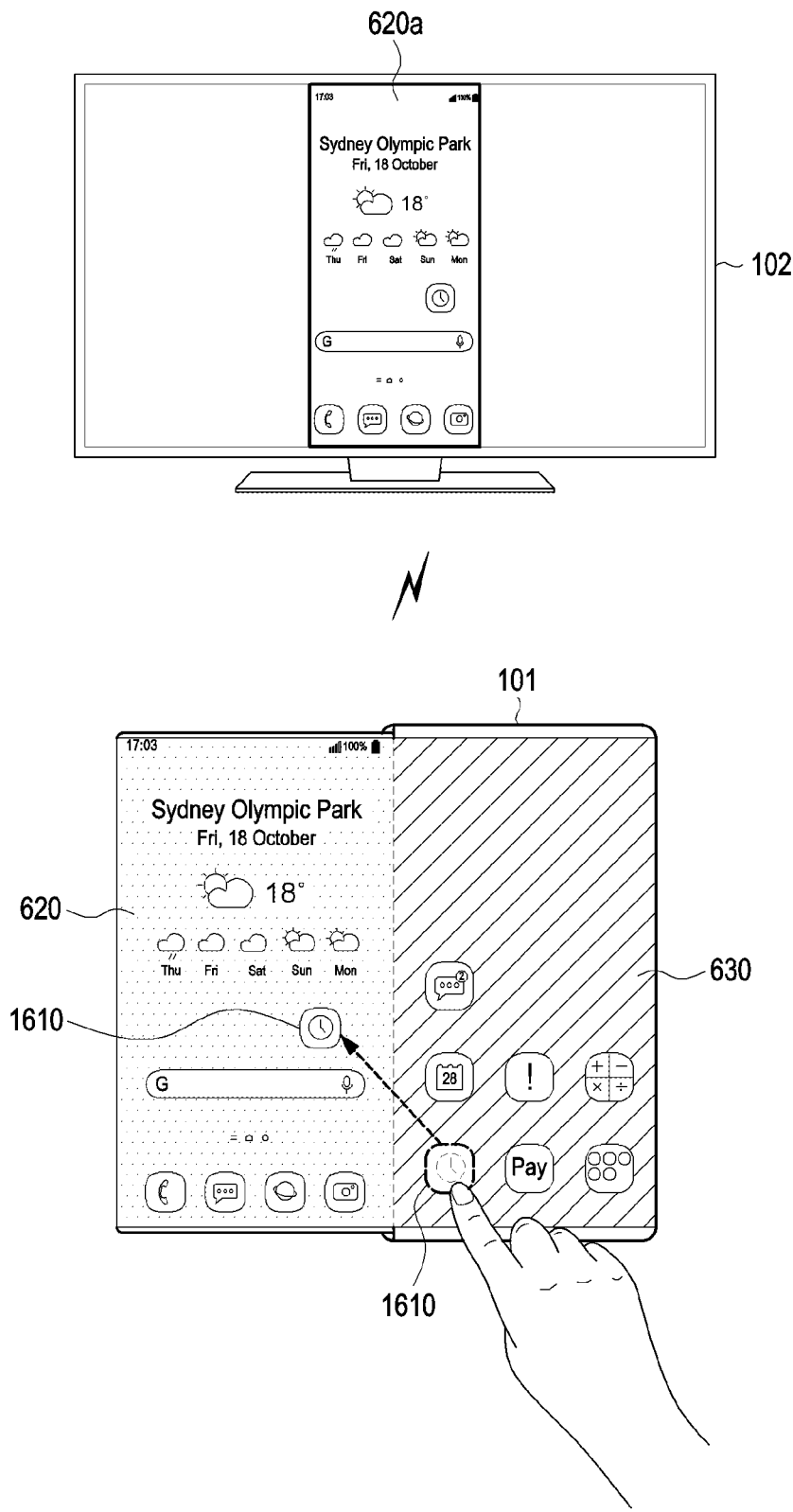
Figure 16C:
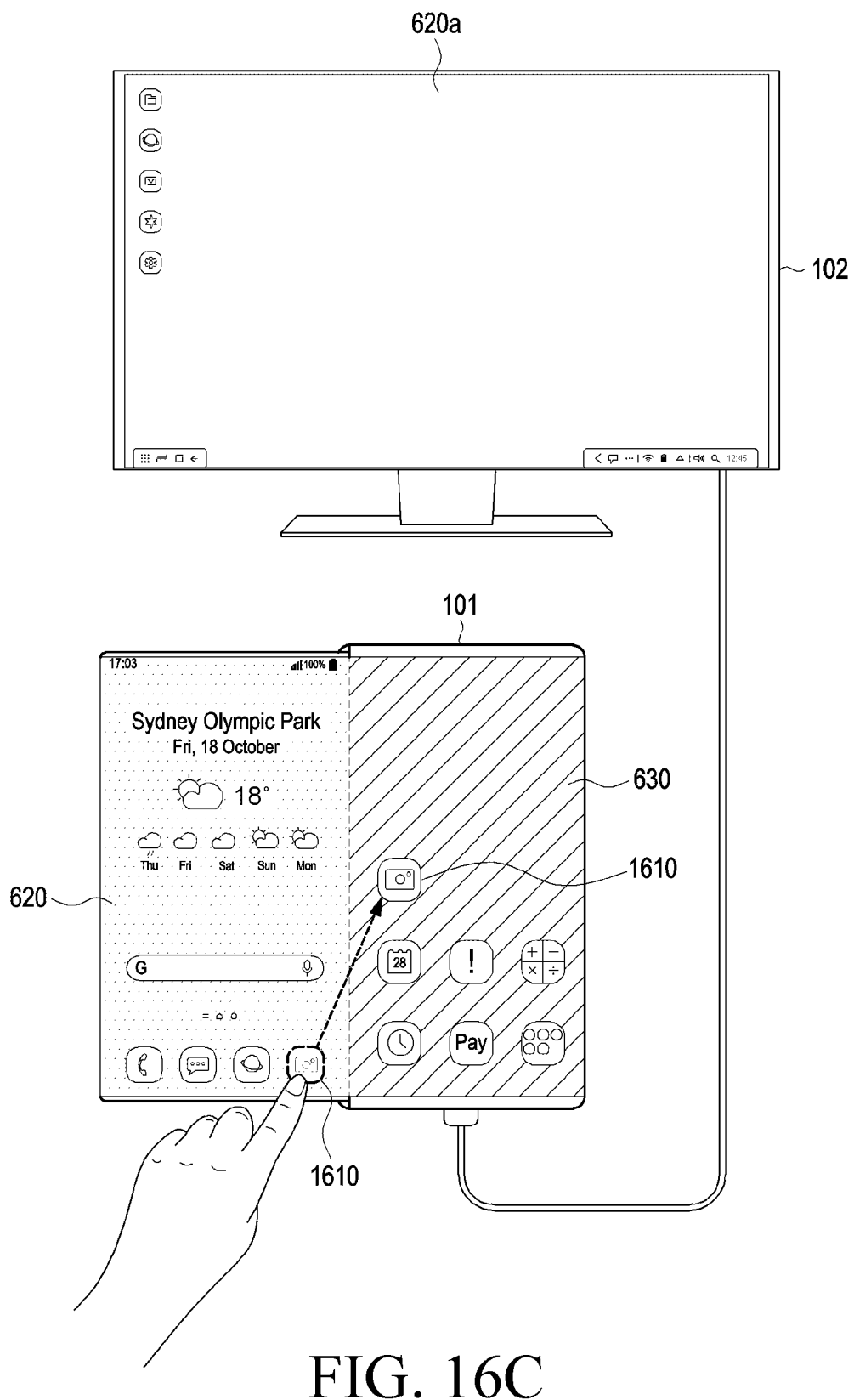

FIGS. 16A, 16B, and 16C include a flowchart and example views illustrating an example function or operation of changing an attribute of an application corresponding to an icon according to movement of the icon according to various embodiments.

Referring to FIG. 16A, according to various embodiments of the disclosure, in operation 1605, the electronic device 101 may display a first screen 620 on the electronic device in a state in which the electronic device 101 and an external electronic device 102 are operably connected with each other.

According to various embodiments of the disclosure, in operation 1615, the electronic device 101 may detect a sliding event. For example, as shown in FIG. 6G, the electronic device 101 may detect an event of sliding the display to the left.

According to various embodiments of the disclosure, in operation 1625, the electronic device 101 may display the first screen 620 and the third screen 630 on the flexible display extended according to detection of the sliding event and control to display the second screen 620a alone on the external electronic device 102.

According to an embodiment of the disclosure, in operation 1635, the electronic device 101 may detect a user input to move the icon 1610 included in the third screen 630 to the first screen 620. According to an embodiment of the disclosure, the user input may include a drag input as shown in FIG. 16B. According to an embodiment of the disclosure, operation 1635 may be replaced with the operation of moving the icon 1610 from the first screen 620 to the third screen 630 as shown in FIG. 16C. According to various embodiments of the disclosure, when 50% or more of the display area of the icon 1610 is included, over the reference line, in another screen, the electronic device 101 may move the icon 1610 from the current screen to the other screen.

According to an embodiment of the disclosure, in operation 1645, the electronic device 101 may change the attribute of the application corresponding to the icon 1610 moved to the first screen 620. For example, when the icon is moved from the third screen 630 to the first screen 610 as shown in FIG. 16B, the attribute of the application corresponding to the icon 1610 may be changed from "private" to "public." In other words, when a notification event for the application corresponding to the icon 1610 moved to the first screen 620 occurs, the message 1010 indicating the occurrence of the notification event may be displayed on the second screen 620a as well as on the first screen 620. Further, the icon 1610 moved to the first screen 620 may also be displayed on the second screen 620a. In contrast, when the icon 1610 is moved from the first screen 620 to the third screen 630 as shown in FIG. 16C, the attribute of the application corresponding to the icon may be changed from the "public" attribute to the "private" attribute. In other words, when a notification event for the application corresponding to the icon 1610 moved to the third screen 630 occurs, the message 1010 indicating the occurrence of the notification event may be displayed only on the third screen 630. Further, the icon 1610 moved to the third screen 630 may be displayed only on the third screen 630.

Figure 17:
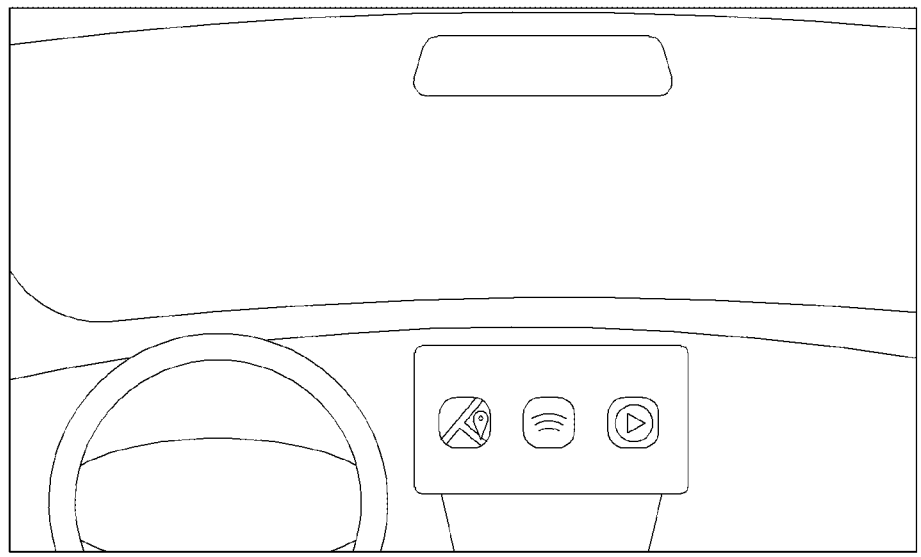
FIG. 17 is a diagram illustrating an example function or operation of customizing a first screen when an electronic device is connected with an external electronic device according to various embodiments.
Figure 17:
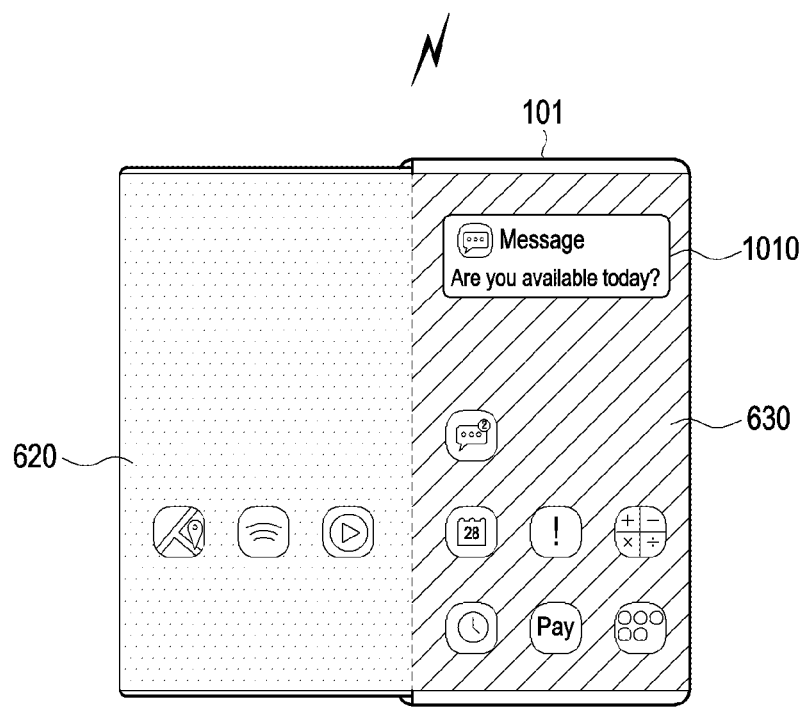

FIG. 17 is diagram illustrating an example function or operation of customizing a first screen when an electronic device is connected with an external electronic device according to various embodiments.

Referring to FIG. 17, when the electronic device 101 is connected to a vehicle in the extended state (e.g., a state in which the first screen 620 and the third screen 630 both are displayed on the electronic device 101), the first screen 620 of the electronic device 101 may be customized according to a predesignated format. For example, as shown in FIG. 17, only icons may be included in the first screen 620. Further, when a notification event occurs in a state in which the electronic device 101 is connected to the vehicle, the message 1010 indicating that the notification event occurs is not displayed on the external electronic device 102 (e.g., display for the vehicle) but may be displayed only on the third screen 630.

FIGS. 18A, 18B, 18C, and 18D are diagrams illustrating example views illustrating an example function or operation of displaying a keypad on an electronic device when the electronic device is connected with an external electronic device according to various embodiments.

Figure 18A:
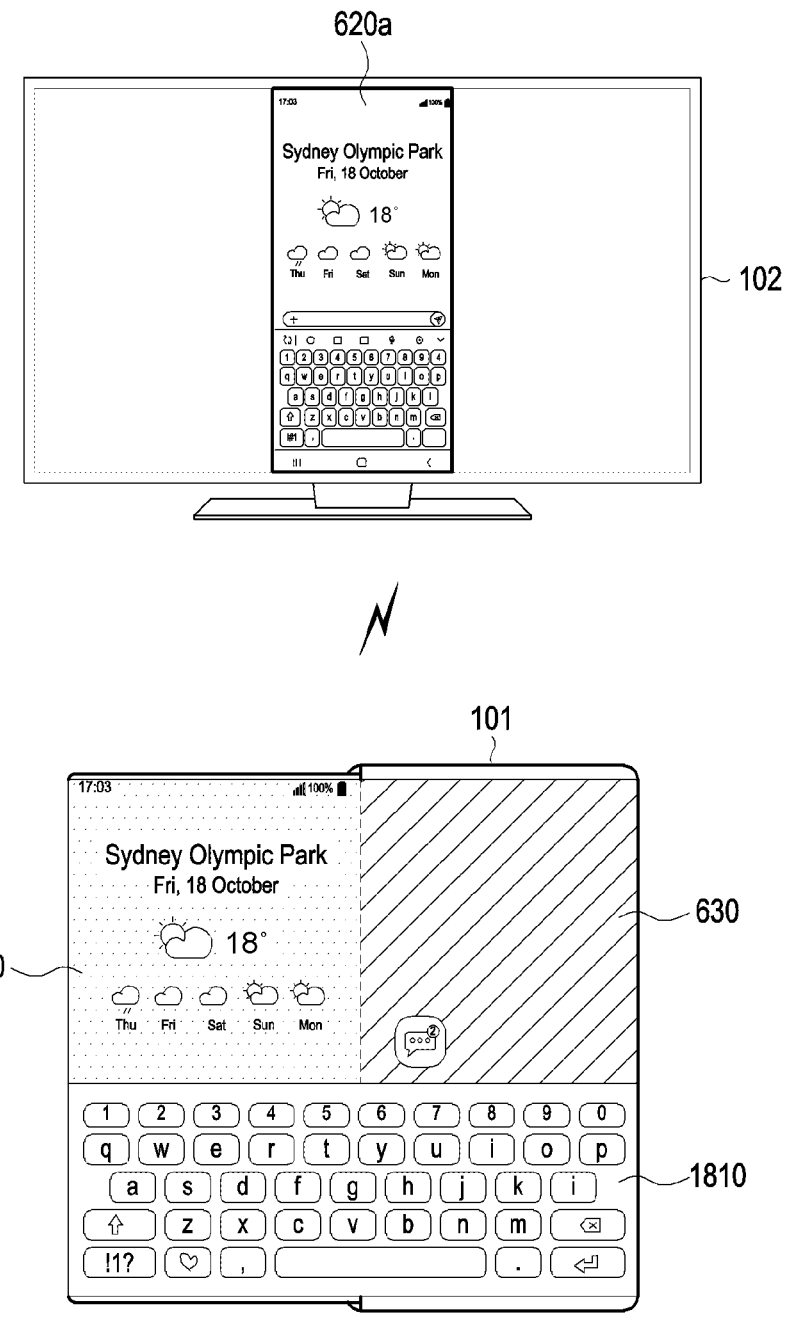
FIGS. 18A, 18B, 18C, and 18D are diagrams illustrating an example function or operation of displaying a keypad on an electronic device when the electronic device is connected with an external electronic device according to various embodiments.

Referring to FIG. 18A, according to an embodiment of the disclosure, the electronic device 101 may display a keypad 1810 on the first screen 620 and the third screen 630 according to a keypad invoke command in the first mode (e.g., mirroring mode) and the extended state (e.g., a state in which both the first screen 620 and the third screen 630 are displayed on the electronic device 101). In this case, the whole or part (e.g., part of the keypad 1810, displayed on the first screen 620) of the keypad 1810 may be displayed on the second screen 620a displayed on the external electronic device 102.

Figure 18B:
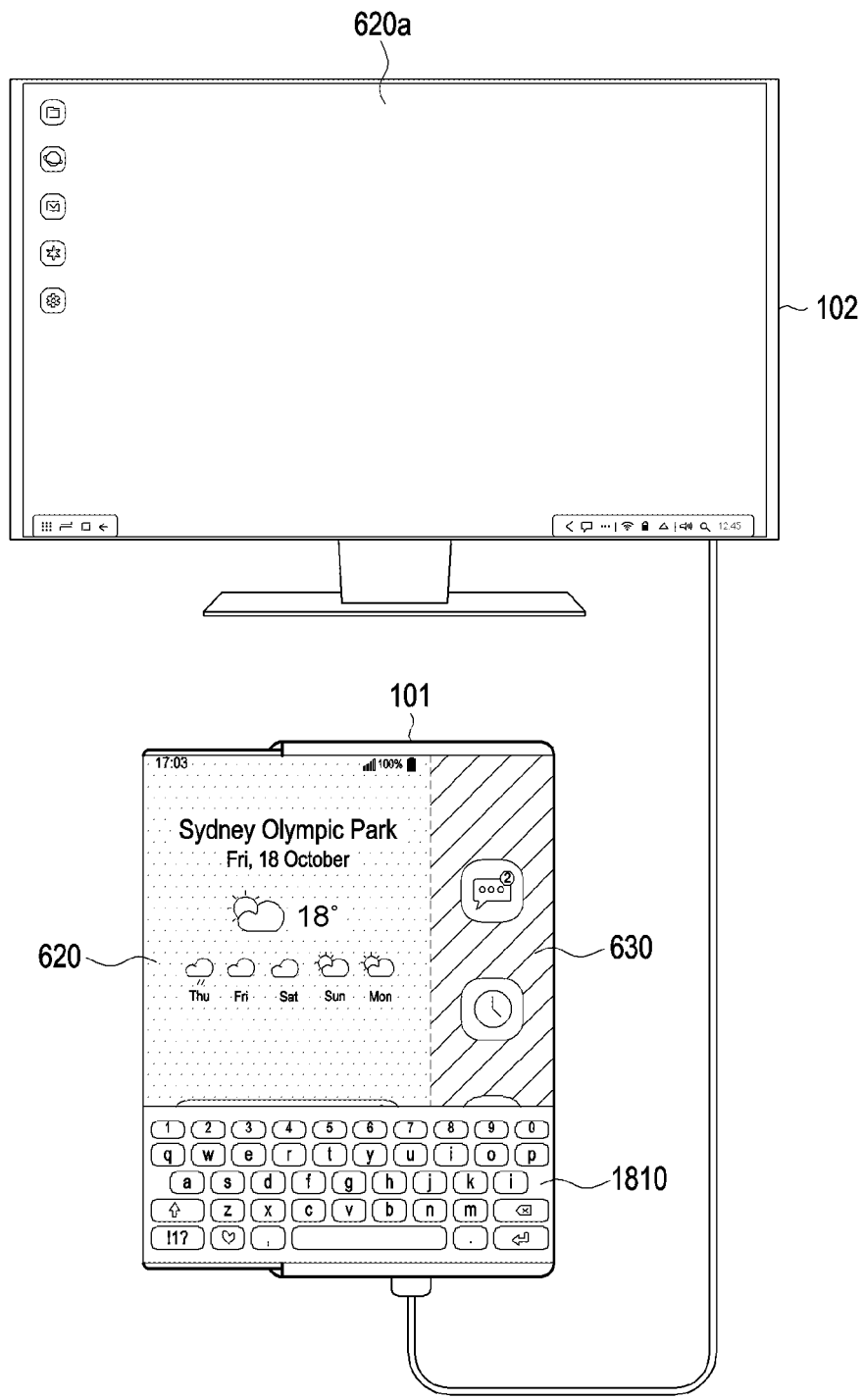
Figure 18C:
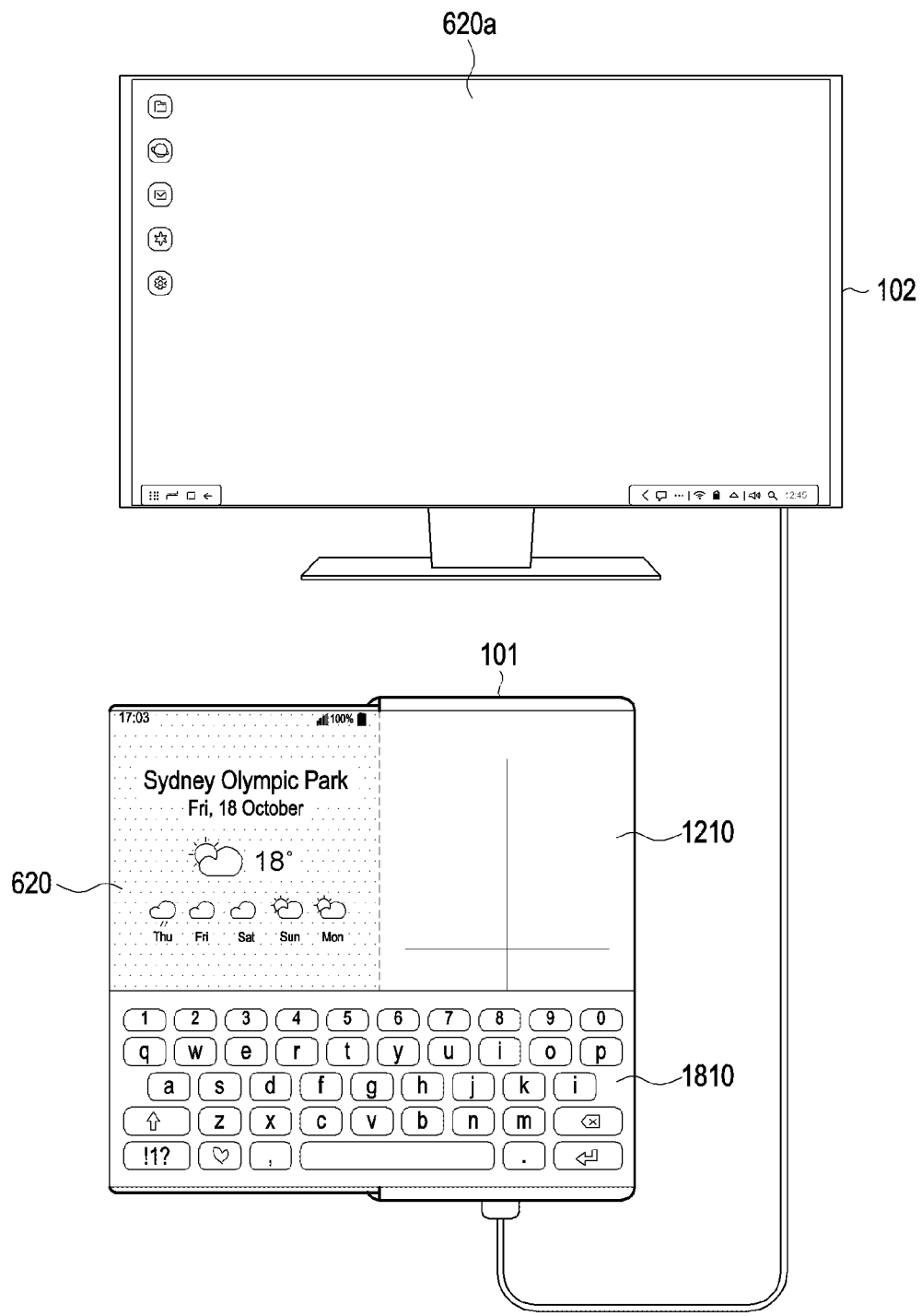
Figure 18D:
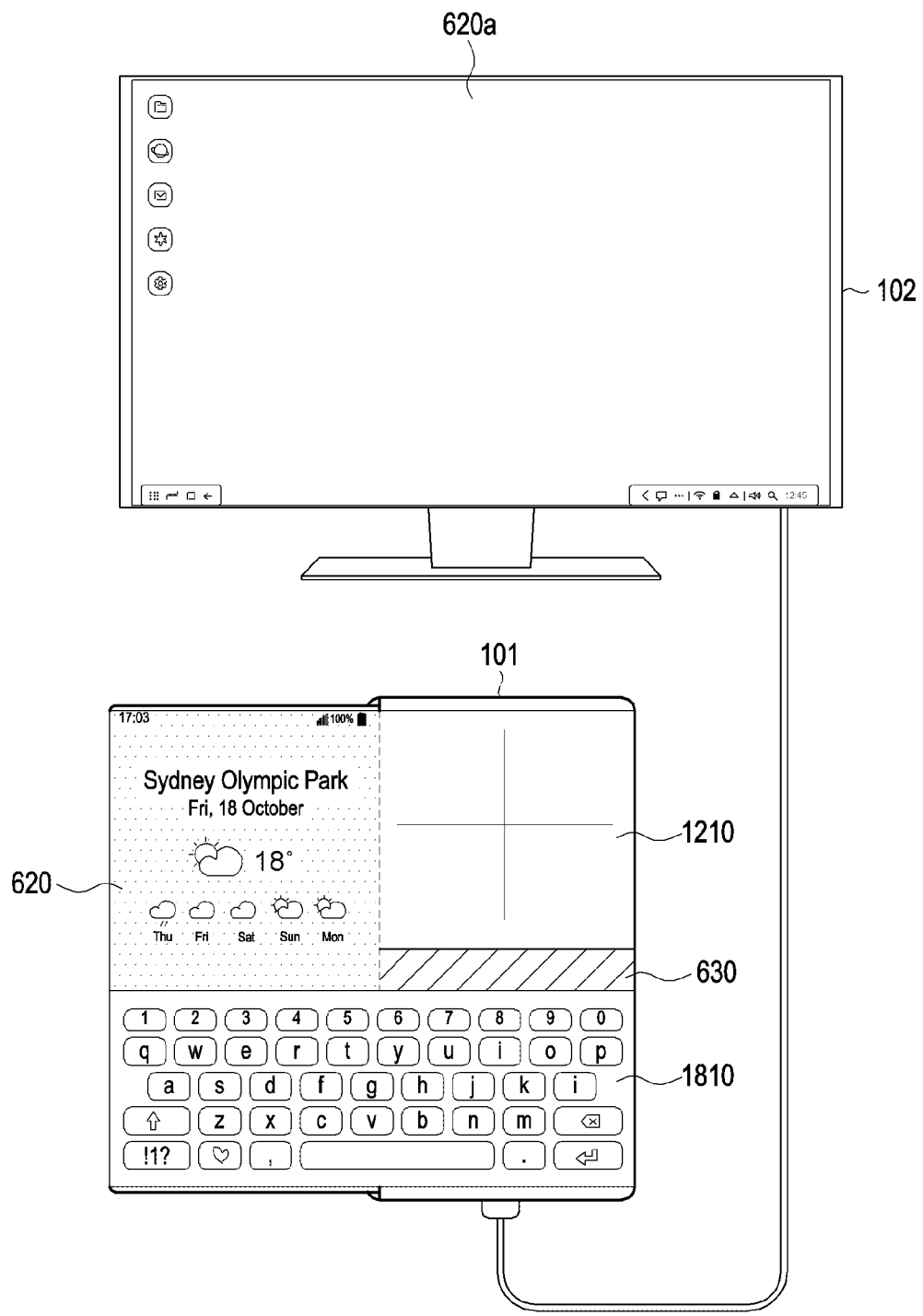

Referring to FIGS. 18B, 18C, and 18D, according to an embodiment of the disclosure, the electronic device 101 may display the keypad 1810 according to a keypad invoke command in the second mode (e.g., a mode of displaying a screen obtained by changing the attribute of the screen displayed on the smartphone through another display device) and the extended state (e.g., a state in which at least two or more of the first screen 620, the third screen 630, and the fourth screen 1210 (e.g., including a touchpad) are displayed on the electronic device 101). In this case, the keypad 1810 may not be displayed on the second screen 620a displayed on the external electronic device 102.

According to an embodiment of the disclosure, when the flexible display is switched from the extended state back to the shrunken state, the above-described operations according to various embodiments of the disclosure may be performed in the opposite order. For example, according to an embodiment of the disclosure, when a display shrink event occurs, the electronic device 101 may reduce the area where the third screen 630 is displayed and determine whether the reference line 710 is exposed to the front surface or upper surface. According to an embodiment of the disclosure, upon determining that the reference line 710 is not exposed to the front surface or upper surface according to the display shrink event, the electronic device 101 may not display the third screen 630 but may display the first screen 620 on the electronic device 101. The above-described embodiments of the disclosure may be likewise applied to rollable electronic devices, out-folding electronic devices, or in-folding electronic devices, as well as slidable electronic devices.

FIGS. 19A, 19B, 19C, and 19D include a flowchart and example views illustrating that the disclosure is applicable to a rollable device according to various embodiments.

Figure 19A:
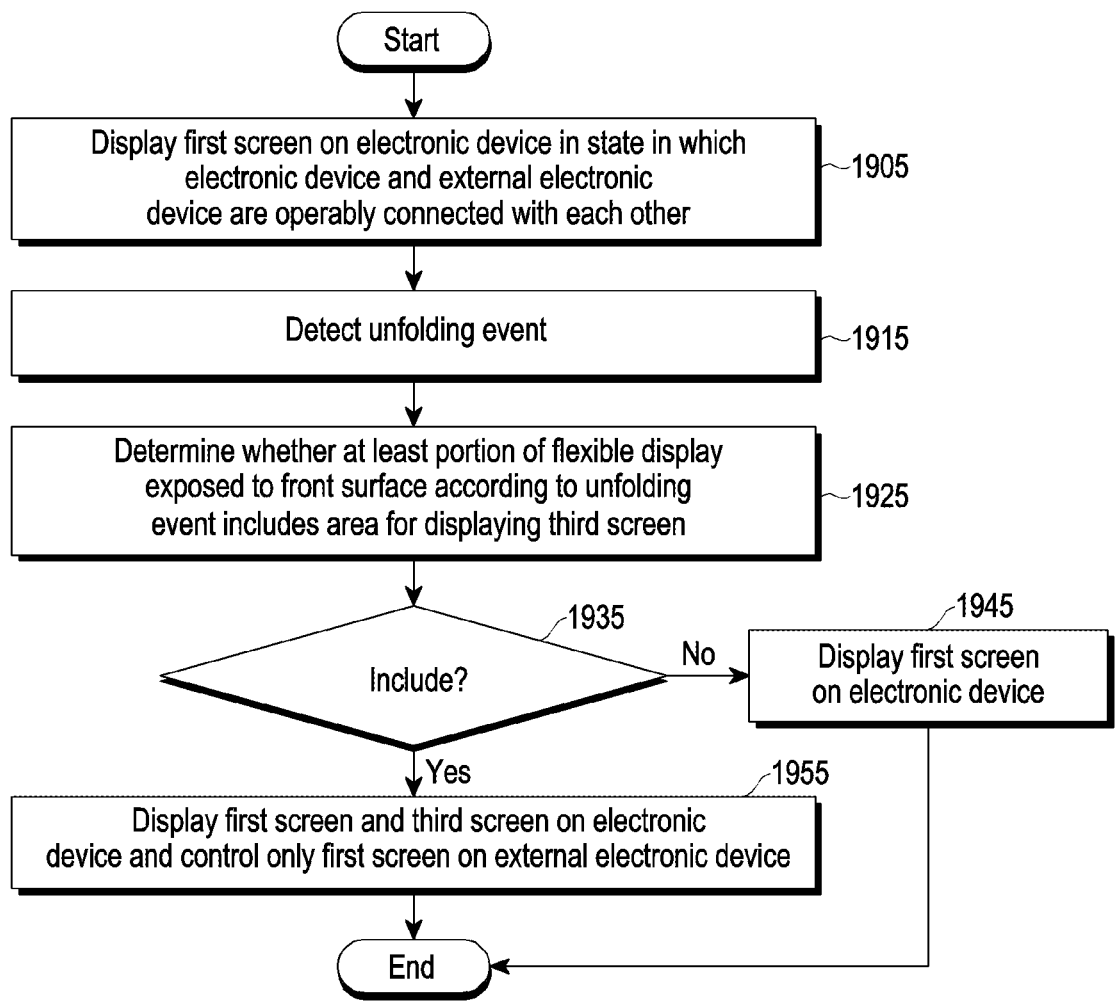
FIGS. 19A, 19B, 19C, and 19D include a flowchart and example views illustrating that various embodiments of the disclosure are applicable to another type of device (e.g., rollable device) according to various embodiments.
Figure 19B:
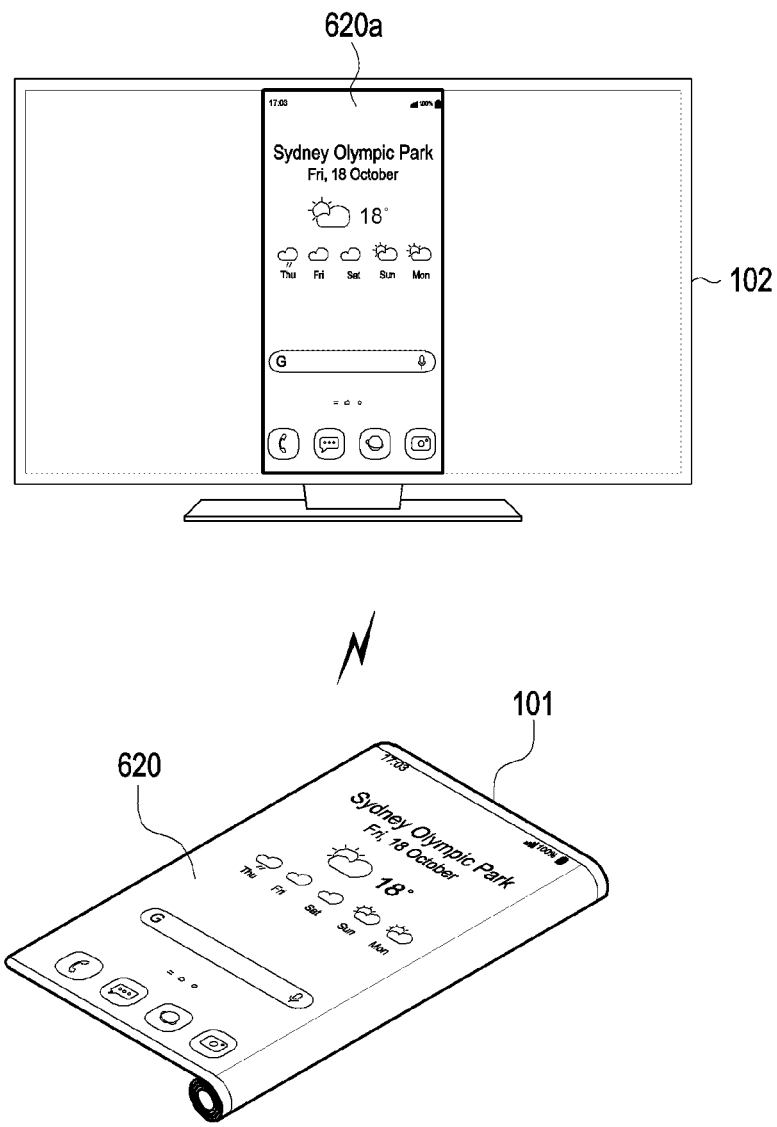

Referring to FIG. 19A, according to an embodiment of the disclosure, in operation 1905, the electronic device 101 may display a first screen on the electronic device 101 in a state in which the electronic device 101 and an external electronic device are operably connected with each other. According to an embodiment of the disclosure, the electronic device 101 may display the first screen 620 on the electronic device 101 as shown in FIG. 19B.

Figure 19C:
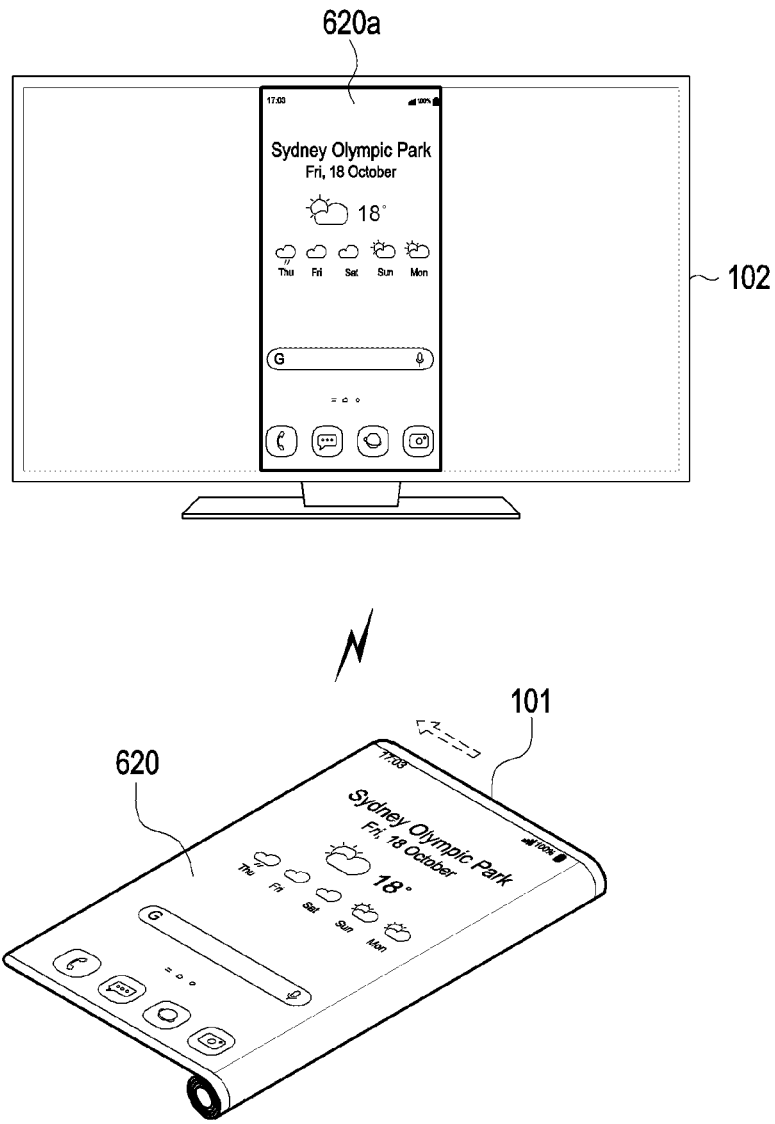

According to an embodiment of the disclosure, in operation 1915, the electronic device 101 may detect an unfolding event. For example, as shown in FIG. 19C, the electronic device 101 may detect an unfolding event to change the rolled flexible display into a flat state.

Figure 19D:
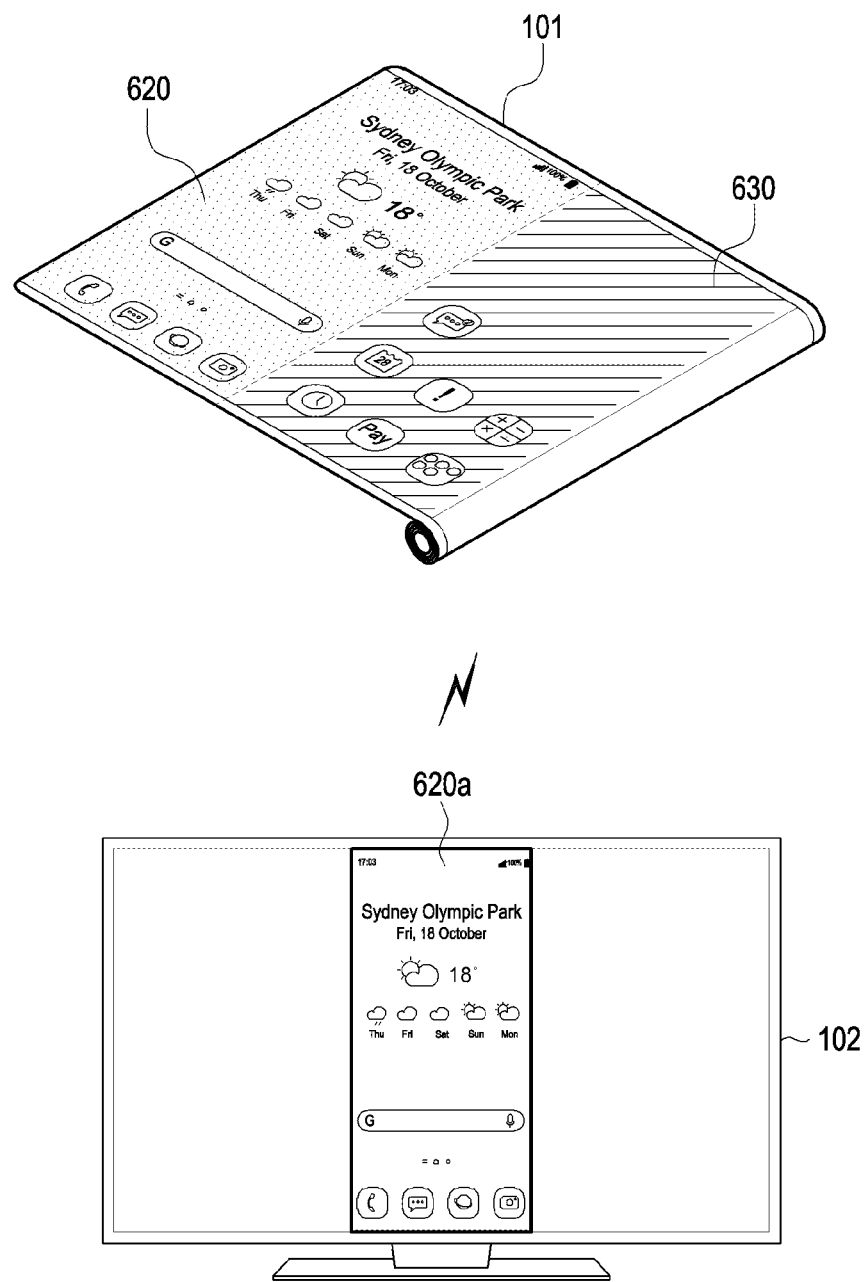

According to an embodiment of the disclosure, in operation 1925, the electronic device 101 may determine whether at least a portion of the flexible display exposed to the front surface according to the unfolding event includes the area for displaying the third screen 630. According to an embodiment of the disclosure, the electronic device 101 may determine whether the area for displaying the third screen 630 is included based on whether the virtual reference line is positioned on the flexible display exposed to the front surface or upper surface. According to an embodiment of the disclosure, the reference line 710 may be predesignated as described above, or may be set by the user as shown in FIG. 7B. For example, according to an embodiment of the disclosure, the electronic device 101 may store information about the area in which the first screen 620 is displayed according to the reference line set by the user. According to an embodiment of the disclosure, when the electronic device 101 is unfolded in a size equal to or larger than the area in which the first screen 620 is displayed according to the user's unfolding event, the electronic device 101 may determine that the virtual reference line is positioned on the flexible display exposed to the front surface or upper surface. According to an embodiment of the disclosure, in operation 1955 (yes in operation 1935), when at least a portion of the flexible display exposed to the front surface according to the unfolding event includes the area for displaying the third screen 630, the electronic device 101 may display the first screen 620 and the third screen 630 on the electronic device 101 and control to display only the second screen 620a corresponding to the first screen 620 on the external electronic device. Referring to FIGS. 19B and 19C, the electronic device 101 may extend and display the first screen 620 according to the detected unfolding event. According to an embodiment of the disclosure, the electronic device 101 may display the extended first screen 620 on the external electronic device 102. According to an embodiment of the disclosure, when the reference line 710 is positioned on the front surface according to the unfolding event, the electronic device 101 may display the first screen 620 on the left side of the reference line 710 and third screen 630 on the right side of the reference line 710. In this case, only the second screen 620a corresponding to the first screen may be displayed on the external electronic device 101 as shown in FIG. 19D. According to an embodiment of the disclosure, in operation 1945 (no in operation 1935), when at least a portion of the flexible display exposed to the front surface according to the unfolding event does not include the area for displaying the third screen, the electronic device 101 may display the first screen 620 on the electronic device 101.

FIGS. 20A, 20B, 20C, and 20D include a flowchart and example views illustrating that the disclosure is applicable to a foldable device according to various embodiments.

Figure 20A:
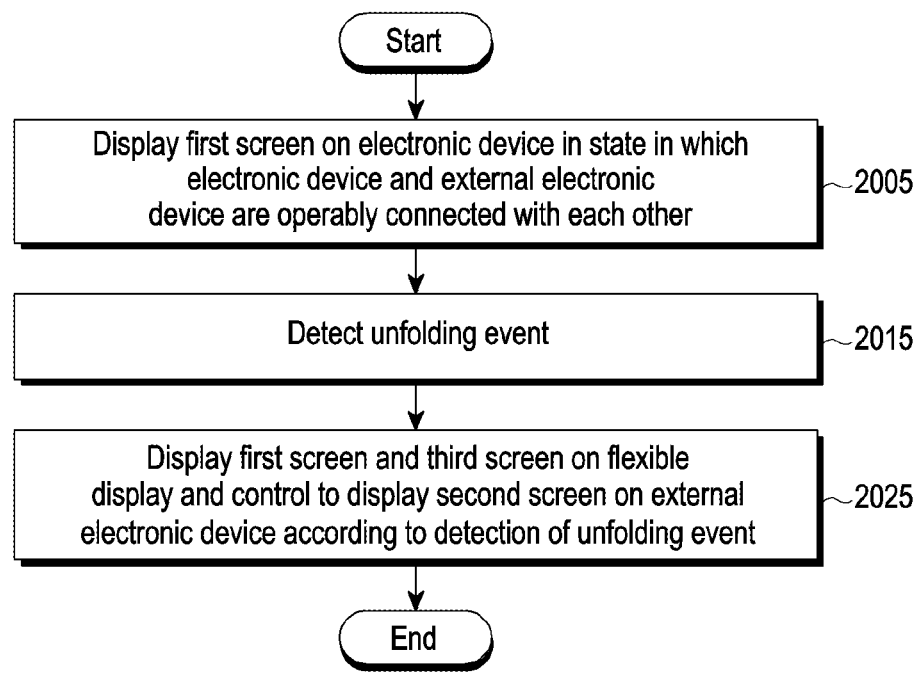
FIGS. 20A, 20B, 20C, and 20D include a flowchart and example views illustrating that various embodiments of the disclosure are applicable to another type of device (e.g., foldable device) according to various embodiments.
Figure 20B:
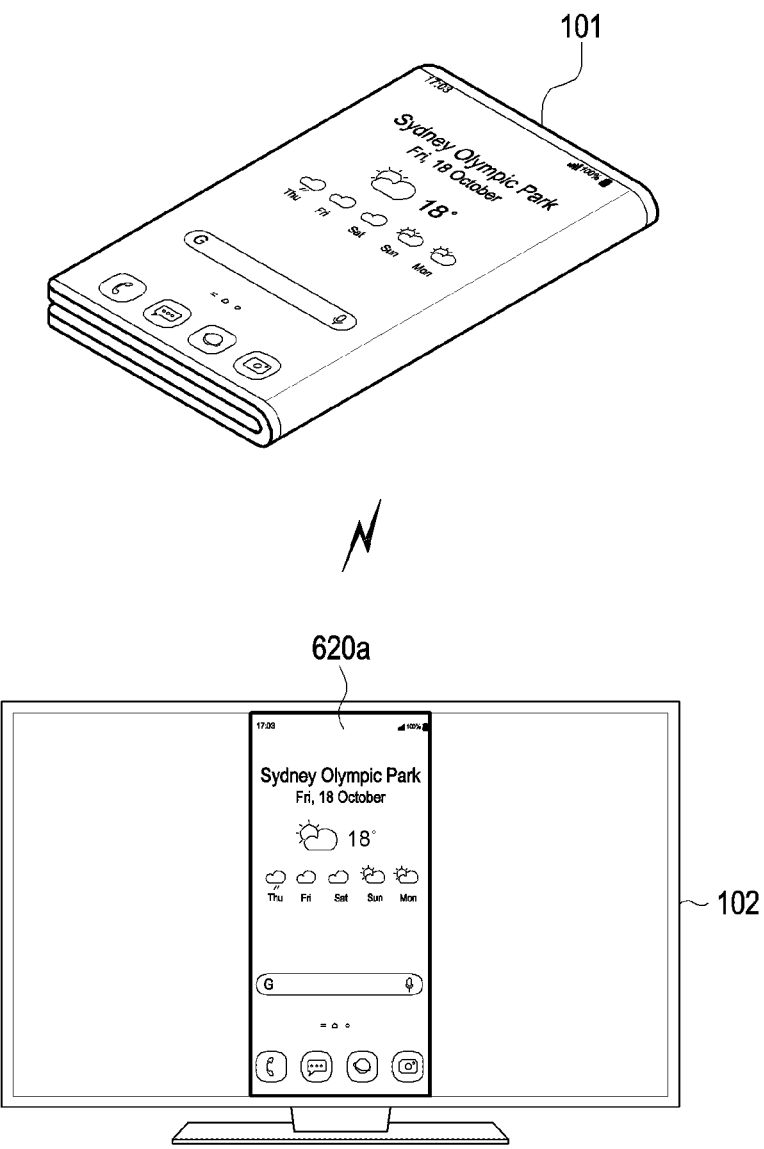

Referring to FIG. 20A, according to an embodiment of the disclosure, in operation 2005, the electronic device 101 may display a first screen 620 on the electronic device in a state in which the electronic device 101 and an external electronic device 102 are operably connected with each other. According to an embodiment of the disclosure, the electronic device 101 may display the first screen 620 on the electronic device and a second screen 620a corresponding to the first screen on the external electronic device 102, as shown in FIG. 20B.

Figure 20C:
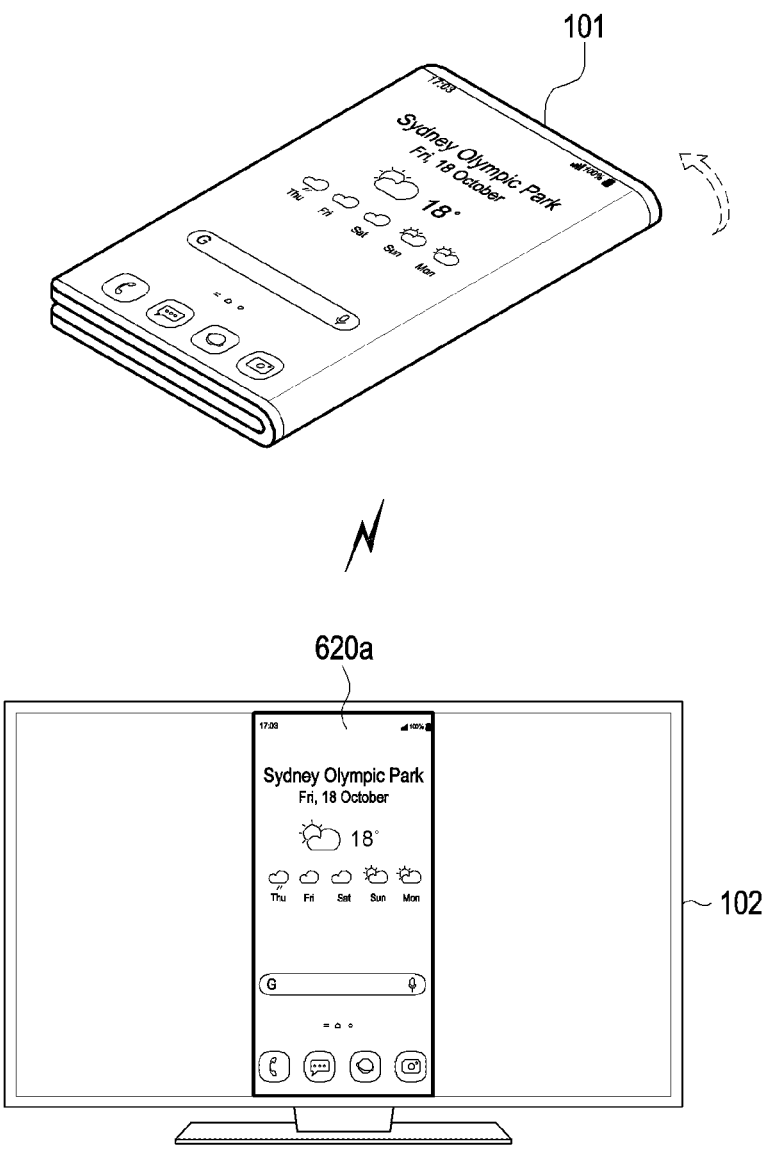
Figure 20D:
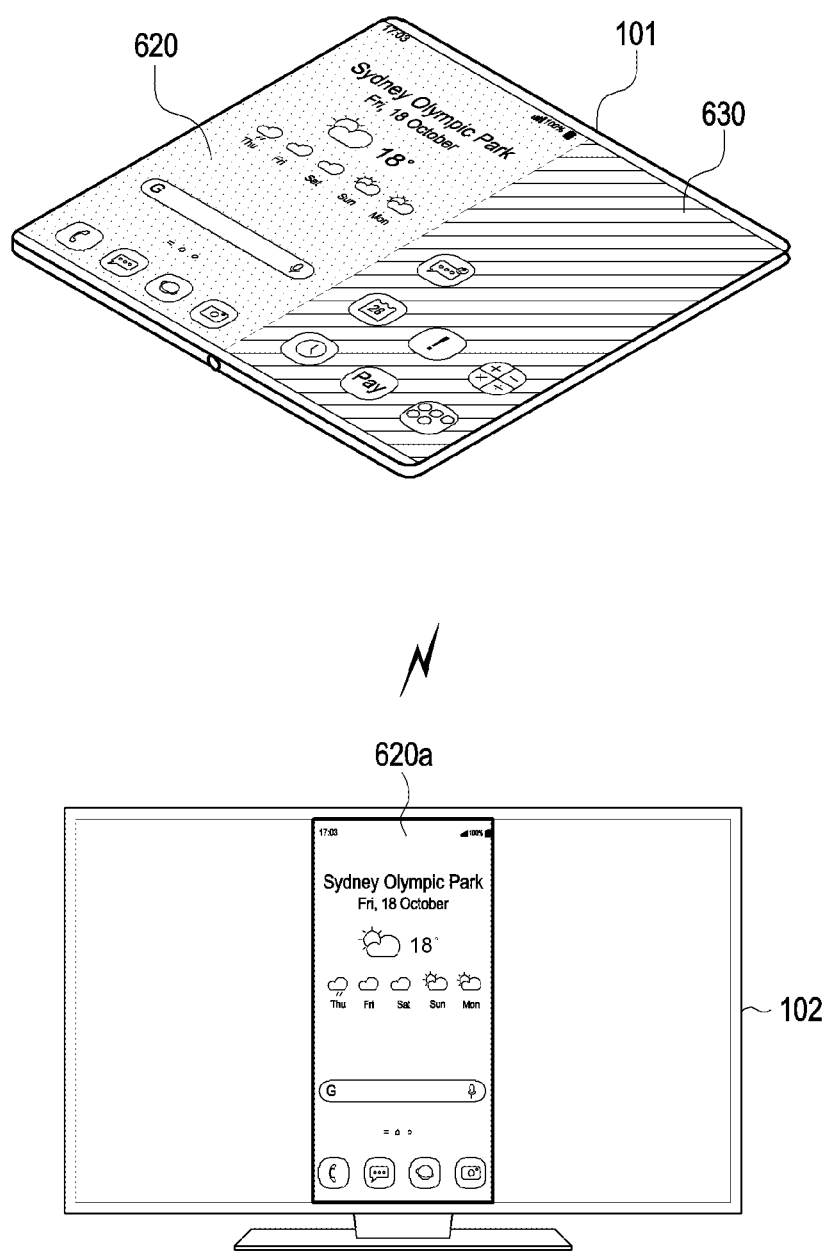

According to an embodiment of the disclosure, in operation 2015, the electronic device 101 may detect an unfolding event. For example, as shown in FIG. 20C, the electronic device 101 may detect an event of unfolding the folded electronic device 101.

According to an embodiment of the disclosure, in operation 2025, the electronic device 101 may display the first screen 620 and the third screen 630 on the flexible display according to detection of the unfolding event and control to display the second screen 620a alone on the external electronic device 102. For example, the electronic device 101 may display the first screen 620 on the left side of the center line of the flexible display and the third screen 630 on the right side and control to display the first screen 620 alone on the external electronic device 102.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a communication module comprising communication circuitry;
   a flexible display; and
   at least one processor configured to:
   control the flexible display to display a first screen on the flexible display in a state in which the electronic device and an external electronic device are operably connected to each other through the communication module, wherein a second screen corresponding to the first screen is displayed on the external electronic device;
   detect an occurrence of a first event to extend the flexible display; and
   display both the first screen and a third screen different from the first screen on the extended flexible display and control the external electronic device to display only the second screen on the external electronic device, based on the detection of the occurrence of the first event.

2. The electronic device of claim 1, wherein the first screen and the third screen are separated by a specified reference line or a reference line.

3. The electronic device of claim 1, wherein the at least one processor is further configured to detect an occurrence of a notification event in a state in which the first screen and the third screen are displayed on the flexible display.

4. The electronic device of claim 3, wherein the at least one processor is further configured to control to display a message indicating the occurrence of the notification event on the third screen while refraining from displaying the message on the first screen and the second screen based on the notification event being detected.

5. The electronic device of claim 1, wherein the third screen includes a launcher screen including at least one icon corresponding to an application or an execution screen of the application.

6. The electronic device of claim 1, wherein the electronic device includes at least one of a slidable device, a rollable device, or a foldable device.

7. The electronic device of claim 6, wherein the electronic device includes a slidable display, and wherein the first event includes a sliding event.

8. The electronic device of claim 1, wherein the at least one processor is further configured to detect a second event to shrink the extended flexible display in a state in which the flexible display is extended based on the first event.

9. The electronic device of claim 8, wherein the at least one processor is further configured to control the display to display only the first screen while refraining from displaying the third screen based on the detection of the second event.

10. A method for controlling an electronic device, the method comprising:

displaying a first screen on a flexible display of the electronic device and a second screen corresponding to the first screen on an external electronic device in a state in which the electronic device and the external electronic device are operably connected to each other through a communication module of the electronic device;

detecting an occurrence of a first event to extend the flexible display; and displaying both the first screen and a third screen different from the first screen on the extended flexible display and controlling the external electronic device to display only the second screen on the external electronic device, based on the detection of the occurrence of the first event.

11. The method of claim 10, wherein the first screen and the third screen are separated by a specified reference line or a reference line.

12. The method of claim 10, further comprising detecting an occurrence of a notification event in a state in which the first screen and the third screen are displayed on the flexible display.

13. The method of claim 12, further comprising displaying a message indicating the occurrence of the notification event on the third screen while refraining from displaying the message on the first screen and the second screen based on the notification event being detected.

14. The method of claim 10, wherein the third screen includes a launcher screen including at least one icon corresponding to an application or an execution screen of the application.

15. The method of claim 10, wherein the electronic device includes at least one of a slidable device, a rollable device, or a foldable device.

* * * * *